United States Patent
Pedersen

(10) Patent No.: US 8,648,855 B2
(45) Date of Patent: Feb. 11, 2014

(54) METHODS FOR CREATING DEVELOPABLE SURFACES

(75) Inventor: Hans Kohling Pedersen, Las Vegas, NV (US)

(73) Assignee: Daedal Doodle, LLC, Las Vegas, NV (US)

( * ) Notice: Subject to any disclaimer, the term of this patent is extended or adjusted under 35 U.S.C. 154(b) by 590 days.

(21) Appl. No.: 13/005,384

(22) Filed: Jan. 12, 2011

(65) Prior Publication Data

US 2011/0169828 A1  Jul. 14, 2011

Related U.S. Application Data

(60) Provisional application No. 61/335,902, filed on Jan. 12, 2010.

(51) Int. Cl.
| | |
|---|---|
| G06T 15/00 | (2011.01) |
| G06T 15/30 | (2011.01) |
| G06T 17/20 | (2006.01) |
| G06T 15/10 | (2011.01) |
| G06T 15/20 | (2011.01) |
| G09G 5/00 | (2006.01) |
| G06F 19/00 | (2011.01) |

(52) U.S. Cl.
USPC ........... 345/423; 345/419; 345/427; 345/619; 700/97; 700/103; 700/117; 700/180

(58) Field of Classification Search
USPC ......... 345/418–427, 441–443, 470, 619–622, 345/958, 960; 700/95–98, 103, 117–119, 700/180–185; 703/1–2; 715/788, 790
See application file for complete search history.

(56) References Cited

U.S. PATENT DOCUMENTS

| | | | |
|---|---|---|---|
| 4,718,017 A | 1/1988 | Hutton | |
| 5,602,943 A | 2/1997 | Velho | |
| 5,831,633 A | 11/1998 | Van Roy | |
| 6,285,372 B1 * | 9/2001 | Cowsar et al. | ................ 345/420 |
| 6,347,995 B1 | 2/2002 | Igarashi | |
| 6,804,573 B2 | 10/2004 | Goldman | |
| 6,819,966 B1 | 11/2004 | Haeberli | |

(Continued)

OTHER PUBLICATIONS

Yong-Jin Liu, Yu-Kun Lai, and Shimin Hu, Stripification of Free-Form Surfaces With Global Error Bounds for Developable Approximation, 2009, IEEE Transactions on Automation Science and Engineering, 6(4):700-709.*

(Continued)

*Primary Examiner* — Aaron M Richer
*Assistant Examiner* — Michael J Cobb
(74) *Attorney, Agent, or Firm* — Lumen Patent Firm

(57) ABSTRACT

Developable surfaces are generated by interactively evolving curves on a 2D surface embedded in 3D space using an iterative process to produce a model for the construction of a stylized three dimensional sculpture. Each iteration includes tessellating loops formed by the curves on the surface and unfolding the resulting tessellated strips onto a 2D plane. Collisions between the unfolded tessellated strips in 2D and between the loops in 3D are resolved, and the rendered evolved curve in 3D and tessellated strips in 2D are displayed simultaneously during the evolution. A graphical user interface allows the curve network, tessellated strips, and curve evolution parameters to be modified by a user. 2D textures may be mapped to the unfolded tessellated strips, and a set of tool paths may be output for cutting a 2D material.

13 Claims, 59 Drawing Sheets

(56) References Cited

U.S. PATENT DOCUMENTS

| | | | |
|---|---|---|---|
| 6,968,255 B1 | 11/2005 | Dimaridis | |
| 7,250,944 B2 * | 7/2007 | Anderson et al. | 345/419 |
| 2008/0088626 A1 * | 4/2008 | Habe et al. | 345/427 |
| 2008/0297514 A1 | 12/2008 | Pedersen | |
| 2011/0187720 A1 * | 8/2011 | Pedersen | 345/442 |

OTHER PUBLICATIONS

Fady Massarwi, Craig Gotsman, Gershon Elber, Papercraft Models using Generalized Cylinders, 2007, 15th Pacific Conference on Computer Graphics and Applications, PG '07, pp. 148-157.*

Jun Mitani, Hiromasa Suzuki, Making Papercraft Toys from Meshes using Strip-based Approximate Unfolding, 2004, ACM Transactions on Graphics (TOG)—Proceedings of ACM SIGGRAPH 2004, 23(3):259-263.*

Lakshminarasimhan Raghupathi, Towards Robust Animation of Complex Objects in Interaction, 2006, Dissertation, Institut National Polytechnique de Grenoble, Grenoble, France.*

A. Sheffer, E. de Sturler, Parameterization of Faceted Surfaces for Meshing using Angle-Based Flattening, 2001, Engineering with Computers, 17:326-337.*

Etienne Vouga, Mathias Hobinger, Johannes Wallner, Helmut Pottmann, Design of Self-Supporting Surfaces, 2012, ACM Transactions on Graphics, 31(4):87.1-87.11.*

* cited by examiner

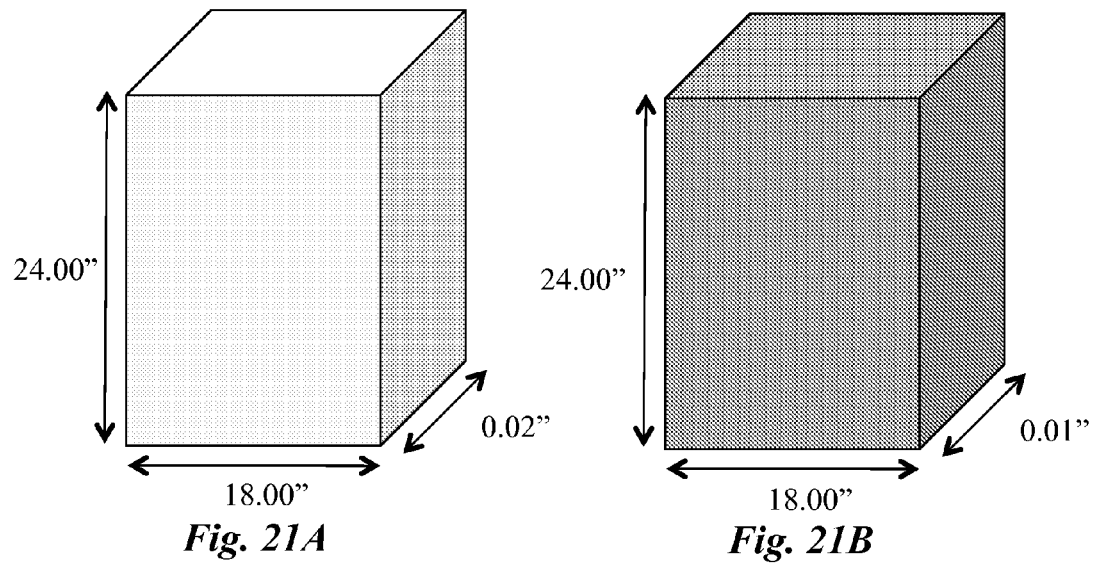
*Fig. 21A*  *Fig. 21B*
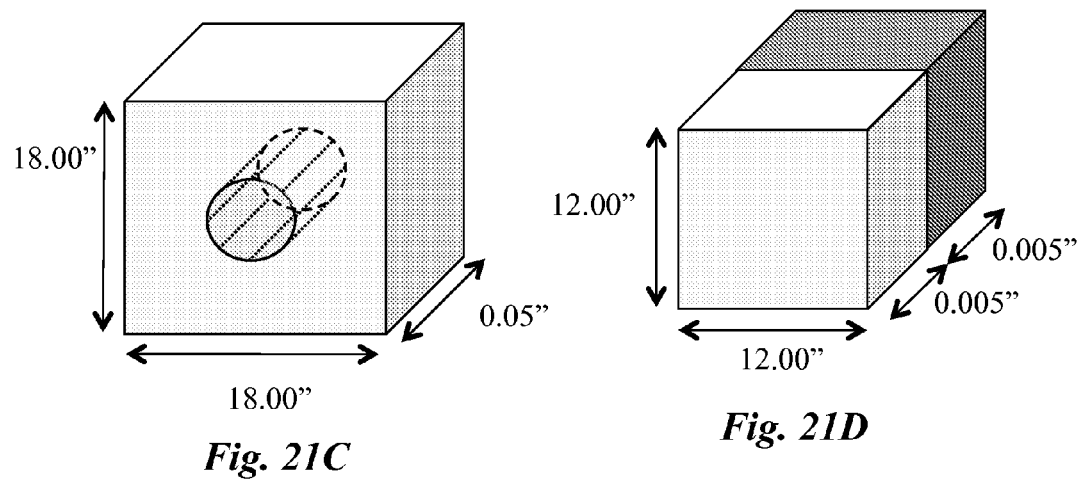
*Fig. 21C*  *Fig. 21D*

Fig. 25A
2500: 3d loop "11"
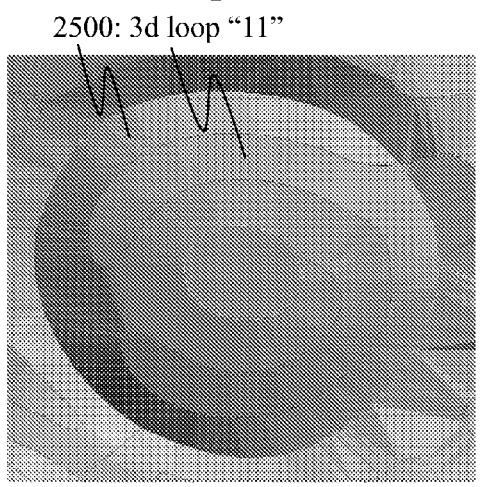
Fig. 25B
2502: 2d loop "11"  2508  2509
2504  2506  2507
2505
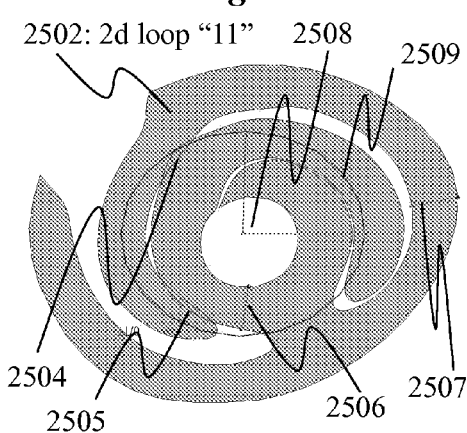
2514
2510:
Material sheet 0
2512:
Material sheet 1
2520
2516
2518
2514
Fig. 25C
Fig. 25D

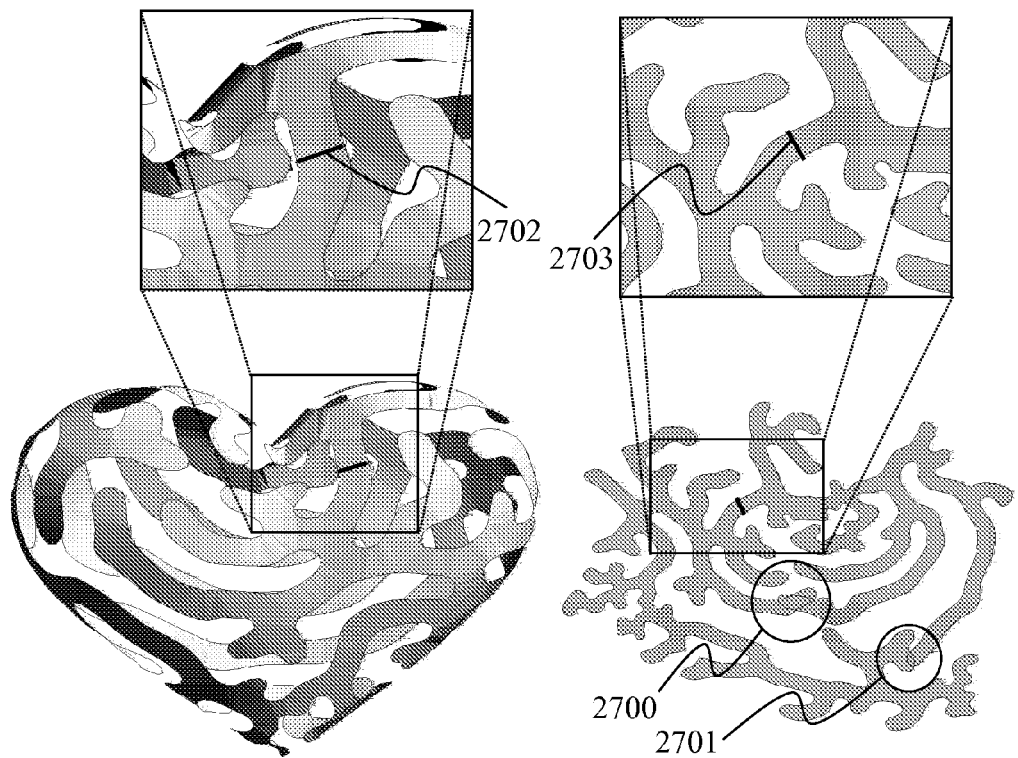
*Fig. 27A*   *Fig. 27B*
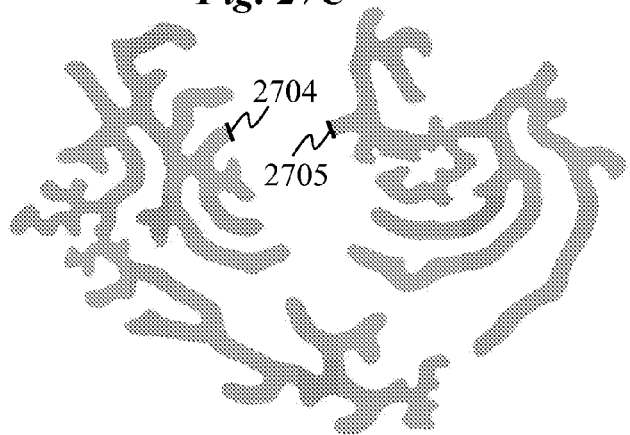
*Fig. 27C*

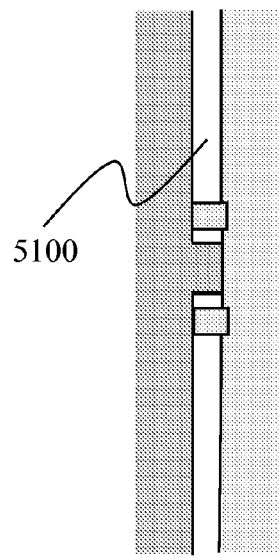
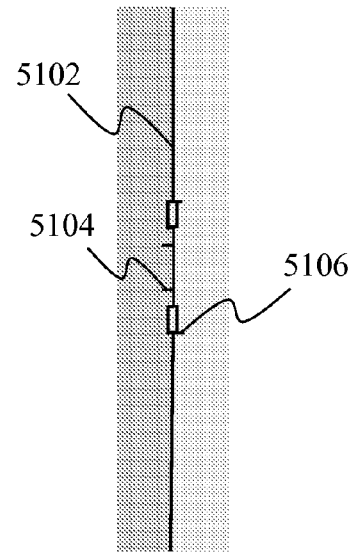
*Fig. 51A*  *Fig. 51B*
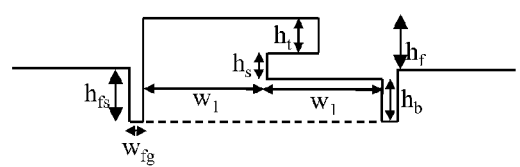
*Fig. 52*

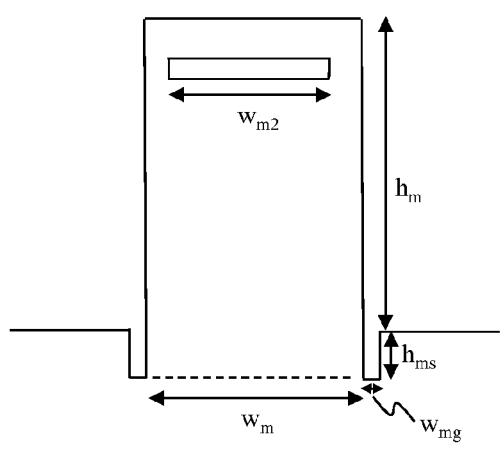
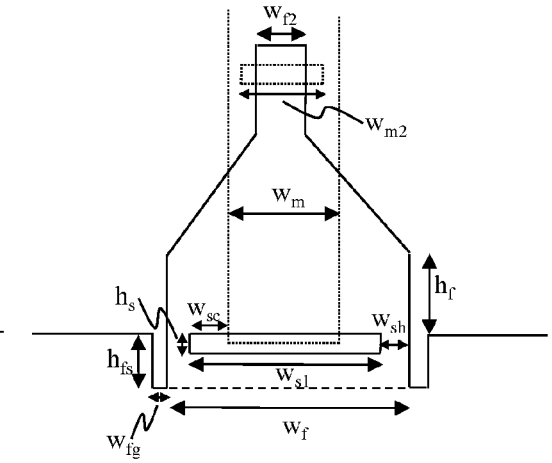
*Fig. 53A*      *Fig. 53B*
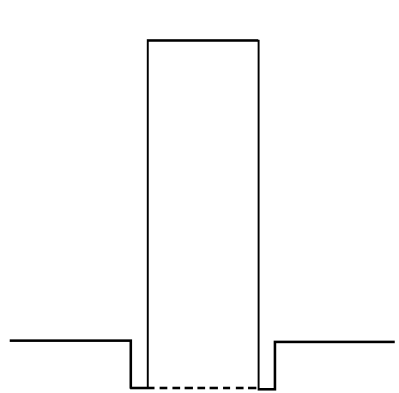
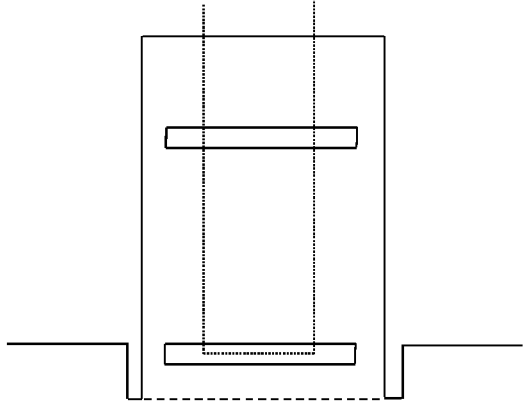
*Fig. 54A*      *Fig. 54B*

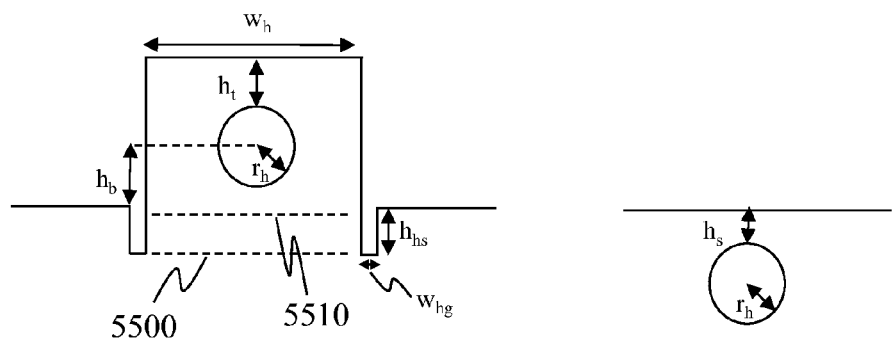
*Fig. 55A*  *Fig. 55B*
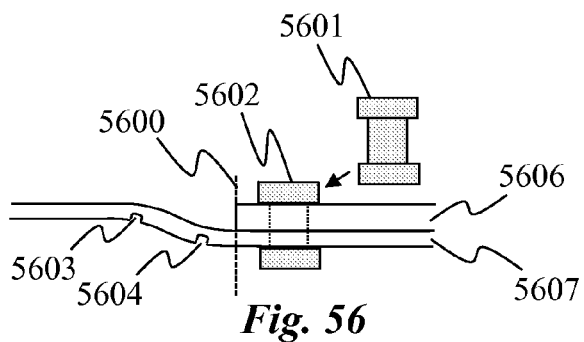
*Fig. 56*
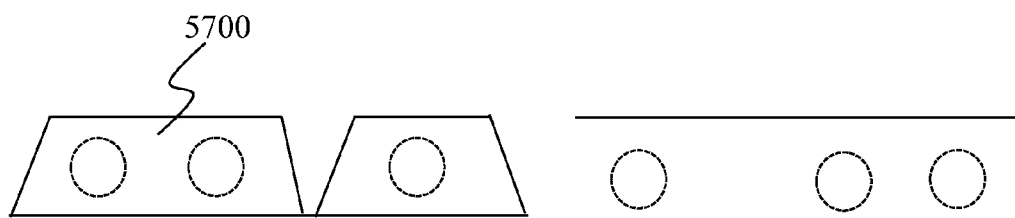
*Fig. 57A*  *Fig. 57B*

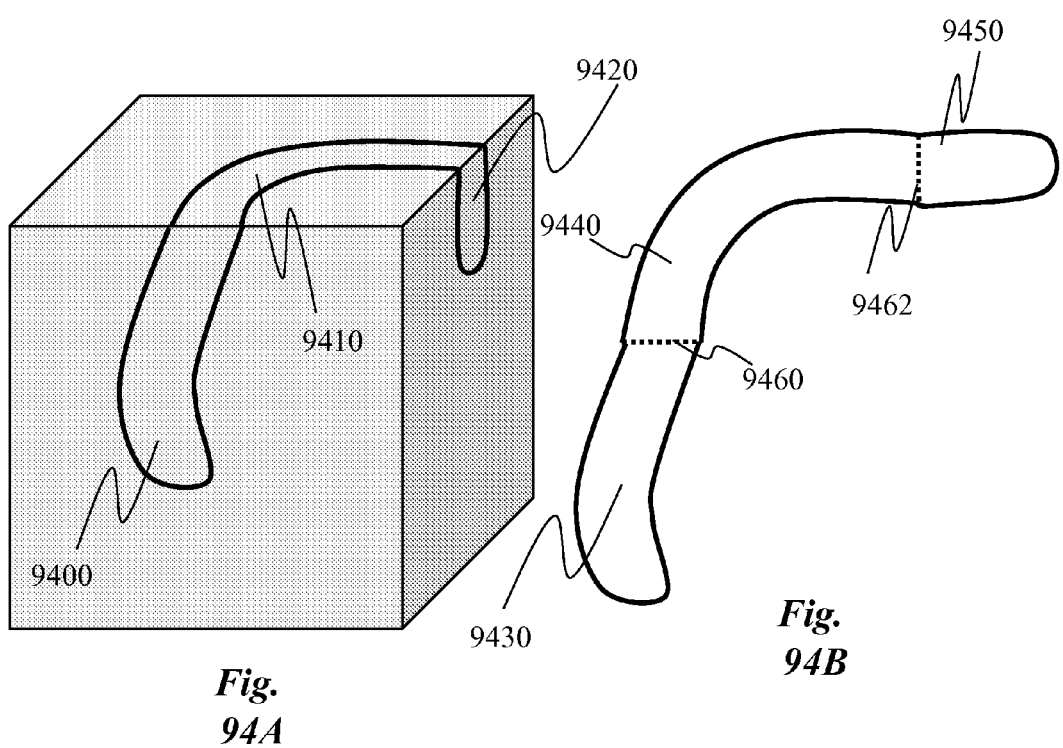

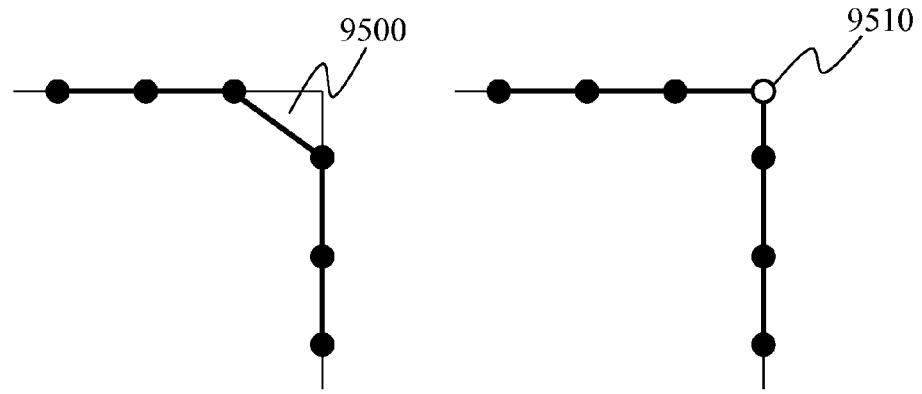
*Fig. 95A*  *Fig. 95B*
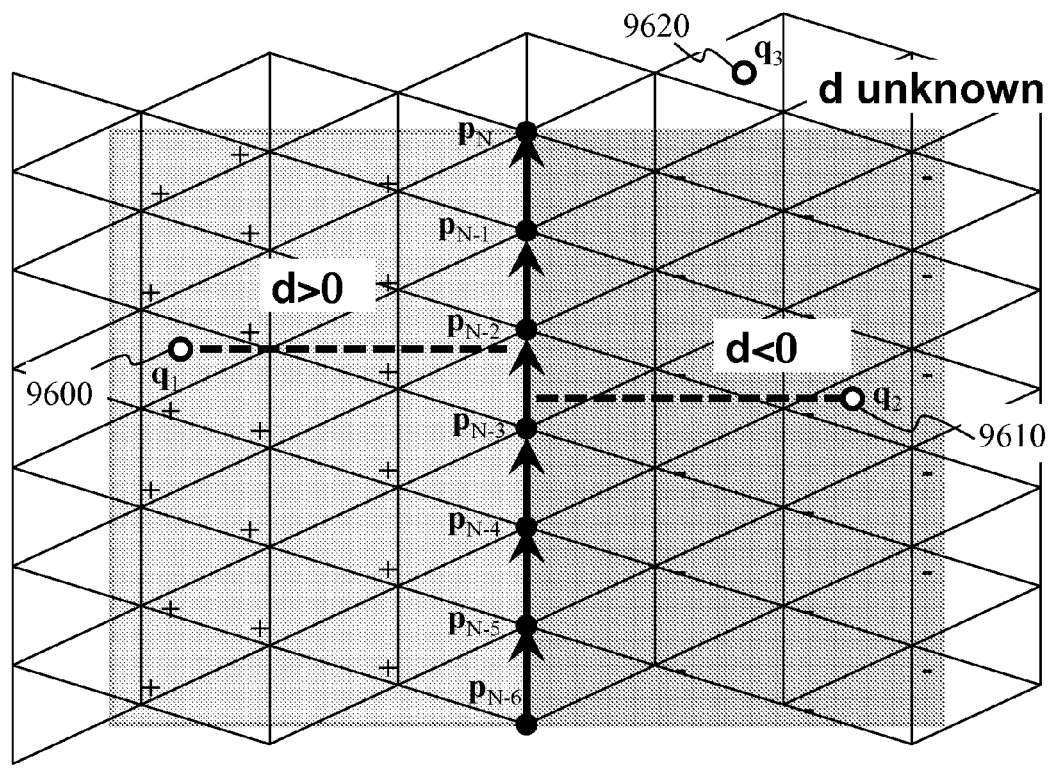
*Fig. 96*

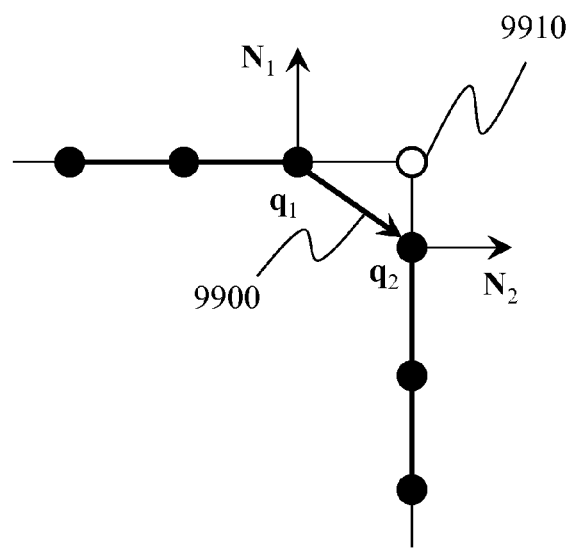
*Fig. 99A*
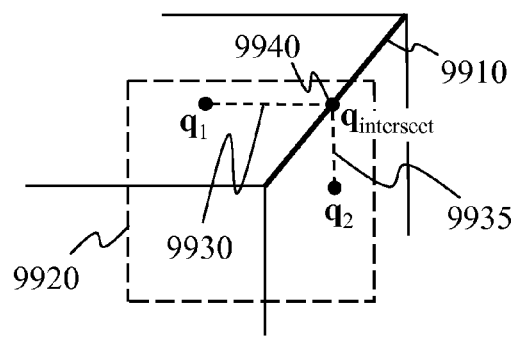 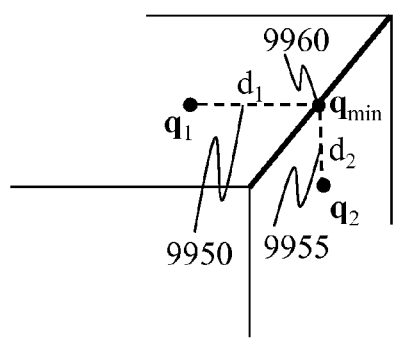
*Fig. 99B*  *Fig. 99C*

METHODS FOR CREATING DEVELOPABLE SURFACES

CROSS-REFERENCE TO RELATED APPLICATIONS

This application claims priority from U.S. Provisional Patent Application 61/335,902 filed Jan. 12, 2010, which is incorporated herein by reference.

FIELD OF THE INVENTION

The present invention relates generally to computer graphics and computer assisted design techniques. More specifically, it relates to interactive computer-implemented methods for generating digital developable surface models and associated articles of manufacture.

BACKGROUND OF THE INVENTION

Developable surfaces are three-dimensional (3D) objects formed from two-dimensional (2D) surfaces that can be flattened to a plane without stretching the surface material; simple examples include the cylinder, the cone, and ruled surfaces. Developable surfaces are important in manufacturing because they can be created from pre-fabricated flat materials, such as paper, textiles, or sheet metal. They have been ubiquitous in engineering applications for centuries and there is an immense body of literature on them across the engineering sciences. The focus of the present work is on applications of developable surfaces for modeling primarily organic 3D shapes, taking perceptual factors related to assembly and visual appearance into account.

A number of existing techniques make it possible to approximate organic 3D shapes with developable surfaces. However, their scope is limited due to several factors, including tedious assembly and detracting visual artifacts in the assembled 3D object. On one hand, a 3D object made as a developable surface has to be sufficiently interesting and detailed to justify the effort and resources needed to assembly. On the other, the cost of the manufacturing generally increases with the complexity of the geometry.

Whereas the bulk of existing work addresses the creation of developable surface patches with little or no attention to assembly of physical models, U.S. Pat. No. 6,819,966 describes a general method for creating developable surface hardcopies from planar materials. The patent focuses how general cost functions can be used for automatic creation of triangulations for closed curve loops. Unfolding the triangulations into the plane yields developable strips that define the surface. It covers this particular problem in depth, but it does not discuss any details how the curves are created, how to avoid self-intersections in the unfolded triangle strips, and several of the other limitations discussed in the background section. The patent does list a number of assembly techniques based on protruding tabs that are either glued to corresponding (marked) areas on the matching surface with an adhesive or bent and tied together with wire. The use of protruding tabs is a general idea that has been used for decades in paper crafts, assembly of tin toys, and many other areas, but it often needs glue, tape, wires, or other foreign parts. The techniques described and depicted in U.S. Pat. No. 6,819,966 require too much tedious manual work to be practical for assembly of models of the geometric complexity that would be required to make the output models sufficiently appealing to be feasible to produce on a larger scale.

Other existing work focuses on the approximating the organic geometry with developable pieces subject to some error bounds. The organic 3D model is analyzed and divided into pieces that can be approximated by developable surface patches. The resulting developable primitives can be piecewise planar, such as triangular or quadrilateral mesh strips, or higher order surfaces such as cone splines or NURBS surfaces. Many such solutions have been proposed, but they suffer from the following shortcomings:

Limited control over the number of developable surfaces.
Limited control over the shape of the developable surfaces.
Limited control over the regularity of the developable surfaces.
Lack of attention to the ease-of-assembly of the developable surfaces.
Lack of attention to perceptual aspects of the aesthetics of the developable surfaces.
Most existing developable surface techniques aimed at organic shapes represent surfaces as infinitely thin manifolds, ignoring the fact that real-world materials have a non-zero thickness.

In terms of the output surfaces, there is an important tradeoff:

Short developable surface strips are problematic because:
   They produce a large number of developable surfaces that complicate the assembly.
   Short strips make it difficult or impossible to create stylized developable surfaces where seams appear as long, flowing curves.
Long developable strips lead to two problems:
   Self-intersections occur after unfolding them into a plane, making it impossible to manufacture strips in one piece.
   Irregular shapes may be difficult to pack optimally into a piece of planar material.
Combinations of long, short, small, and large developable surfaces will not appear visually attractive unless careful attention is paid to the overall structure of the network of developable patches.

In summary, a cohesive solution that addresses all these limitations remains an open problem. As a result, developable surfaces have seen limited use in the manufacturing of organic 3D geometry.

SUMMARY OF THE INVENTION

To address the above-mentioned problems, this document presents a fundamentally new approach to designing organic developable surfaces. Rather than segmenting the input surface into locally fitted developable patches, the developable surfaces are grown in an optimization process that takes place in 2D and 3D simultaneously. Specifically:

The number of developable surfaces is greatly reduced compared to existing techniques. Many interesting shapes can be represented by a dozen or less developable surfaces, far fewer than would be possible with existing techniques.
The developable surfaces have a uniform, regular structure everywhere.
The developable surfaces are specifically designed with ease-of-assembly in mind.
The shape of each developable surface is inspired by the anatomy of the human visual cortex in order to make it visually appealing. Specifically, in contrast to existing techniques, the Fourier transform of the developable surface boundaries in frequency domain resembles the distribution of receptors on the retina. The actual 3D objects look pleasing to the eye.

The resulting surfaces are designed to be manufactured from many bendable real-world materials, such as paper, cloth, leather, vinyl, wood, or sheet metal.

In one aspect, the present invention provides several techniques that allow developable surfaces to be constructed and assembled faster and cheaper, thus facilitating the construction of 3D models that are significantly more valuable than what is achievable with existing state-of-the-art techniques. Whereas the seams between the developable surface parts have been a weakness of existing techniques, a new approach allows the surface geometry to be stylized intentionally for visual appeal: the seams are an integral, desirable part of the final 3D object. Adding further appeal to the output models, textures, such as photos from a digital camera, can be placed on the 3D shape independently of the developable surface boundaries. The combined contribution of these complementary techniques provides unprecedented customization of the appearance of developable surfaces.

The present invention provides several improvements upon Pedersen et al., US PG Publication No. 20080297514, "Interactive labyrinth curve generation and applications thereof", which is incorporated herein by reference. That document presents a perceptually motivated computational technique for approximating organic 3D shapes with visually pleasing developable surfaces. Embodiments of the present invention improve and extend that existing approach with the following contributions:

1. A technique for preventing self-intersections when unfolding developable surfaces onto the plane.
2. A technique to facilitate easy assembly without the need for glue, adhesives, or external parts. The resulting manufactured objects are self-supporting, held together purely by natural forces.
3. A technique for adding textures, such as digital photos, to the developable surfaces.

The new techniques are integrated into a significantly modified workflow compared to that described in the above patent application. A modified workflow has been selected to support low cost experimentation over multiple design cycles. The workflow can be fully automated, but, since aesthetics of the output models is a priority, a graphical user interface for enhanced control and instructive feedback is an integral part of the system.

In one aspect, a computer-implemented method for generating a developable surface is provided. The method includes initializing by a computer curve evolution parameters and a curve network, where the curve network includes a curve embedded in an evolution space. The initializing includes defining a set of 2D textures defined on the evolution space, where the evolution space is a 2D non-Euclidean space embedded in a 3D Euclidean space, where the curve includes a linearly ordered set of sample points in the evolution space, and where the curve evolution parameters include real-valued functions defined on the evolution space. The method also includes evolving by the computer the curve using an iterative process, where the curve evolves in accordance with the curve evolution parameters and user input during the iterative process to produce an evolved curve having an increased geometric complexity, where the evolved curve represents a model for the construction of a stylized three dimensional sculpture, and where the evolved curve forms loops separating regions of the evolution space. Each iteration of the iterative process includes: tessellating the loops with polygons to generate tessellated strips in 3D, unfolding the tessellated strips onto a 2D plane, resolving collisions between the unfolded tessellated strips in 2D and between the loops in 3D, rendering by the computer the evolved curve and tessellated strips, displaying simultaneously on a display the rendered evolved curve in 3D and tessellated strips in 2D, and providing a graphical user interface allowing the curve network, tessellated strips, and the curve evolution parameters to be modified by a user. The method also includes mapping the 2D textures to the unfolded tessellated strips, and outputting a set of tool paths lined up with the 2D textures for creating a 2D material shaped to the unfolded tessellated strips.

Preferably, the evolved curve is attracted to feature markers during the iterative process. The method may further include automatically cutting with a machine a 2D material in accordance with the set of tool paths to produce an article of manufacture. Prior to evolving the curve using an iterative process, the method may include analyzing a geometry and topology of the curve network using a set of heuristics, and predicting locations where assembly of the developable surface is likely to be difficult. The method may also include evaluating an error metric between an evolution mesh and tessellated strips; and, when an error is larger than a predetermined threshold, automatically refining loops corresponding to the tessellated strips. In some embodiments, the curve evolves using a 2D attraction force that attracts the unfolded tessellated strips to shape of a predetermined figural curve.

The method may also include creating assembly devices along boundaries of the unfolded tessellated strips, and automatically optimizing placement of the assembly devices along the boundaries of the unfolded tessellated strips through the use of a mechanical analysis. A graphical user interface may be provided by which a user may edit the assembly devices. The method may also include adding textured polygons outside the unfolded tessellated strip to avoid blank spots in a texture on the developable surface.

Mapping the 2D textures to the unfolded tessellated strips may include mapping the 2D textures using a map generated by compositing ordered layers of textures. Resolving collisions between the unfolded tessellated strips in 2D and between the loops in 3D may include breaking an unfolded tessellated strip by creating a separator joining two sample points along a boundary of the unfolded tessellated strip. Resolving collisions between the unfolded tessellated strips in 2D and between the loops in 3D may include removing intersecting parts of boundaries of the unfolded tessellated strips. Each iteration of the iterative process may include applying attraction-repulsion forces between the unfolded tessellated strips in 2D and between the loops in 3D. Each iteration of the iterative process may include applying attraction-repulsion forces between the unfolded tessellated strips and material boundaries in 2D.

In preferred embodiments, an input to the system includes:
An evolution space, such as a trimmed surface or a bounded volumetric region.
A network of curves embedded in the evolution space. The curves will grow to become the boundaries of developable surface strips.
A set of textures defined on the evolution space.
The output of the system may include:
A set of textures to be applied on one or more sheets of physical 2D materials.
A set of tool paths lined up with the 2D textures. The tool paths specify how to align, score, and cut the materials into planar pieces that can be assembled to a physical embodiment of the evolution space.

The workflow in one embodiment starts with initialization of evolution parameters and a network of curves constrained during evolution to a surface, i.e., a 2D evolution space. The curves are assumed to be arbitrary curves which are sampled discretely as piecewise linear curves, or polylines. Optionally, attributes and dimensions of the output material(s) may be specified as well. The user is allowed to edit the curves and parameters. The curve network may define bounded regions on the evolution surface, which will henceforth be referred to as loops. The loops may approximate parts of the surface(s). In some embodiments, some curves (or portions of curves) may not be constrained to the evolution surface and may float unconstrained in 3D space. Since the generalization to curve networks comprising both constrained and unconstrained curves is straightforward, we will, without loss of generality, refer to curves on a surface as if all its points were constrained. One or more curve loops may be tessellated to form tessellated loops (or strips). The tessellation may be performed using triangles and/or quadrilaterals, possibly connected by planar polygons at junctions between branches, where the polygons have five or more sides. The tessellation is subsequently developed (i.e., unrolled) onto a plane, yielding an unfolded tessellation with the same number of polygons, the same angles and areas of the polygons, and the same topology (i.e., the same shared edges between the polygons). Once a loop is specified, it can be assigned material properties. If the loops are to be manufactured in materials of different colors, for example, they should be marked as such and assigned to a material sheet with these properties. The term "material sheet" will be used to refer to an individual piece of flat material that is used to manufacture one or more developable strips. If an unfolded loop overlaps itself, other loops, or the boundaries of its material sheet, it can not be manufactured in one piece. The method detects overlaps between loops and unfolded loops (i.e., in both 3D and 2D) and eliminates them during evolution. In post-evolution processing a set of loops are prepared for manufacturing by adding appropriate devices to enable the assembly of the manufactured surfaces, as well as support for textural information. Finally, the finished data is evaluated prior to manufacturing. The workflow enables the user to go back at any time and continue the curve evolution and editing. Data added during post-evolution processing will generally persist during such iterations.

BRIEF DESCRIPTION OF THE DRAWINGS

FIG. 21A-D are diagrams illustrating material sheets with different properties.

FIG. 25A-D are diagrams illustrating how a loop can be divided into multiple loop pieces, according to an embodiment of the present invention.

FIG. 27A-C are diagrams illustrating how collisions in the plane can be eliminated by splitting a loop into multiple loop pieces, according to an embodiment of the present invention.

FIG. 51A-B are diagrams illustrating a top view of artifacts due to material thickness resulting from joining the assembly devices shown in FIG. 48A-B, according to an embodiment of the present invention.

FIG. 52 is a diagram illustrating a different assembly device which interlocks with a mirrored copy of itself, according to an embodiment of the present invention.

FIGS. 53A-B and 54A-B are diagrams illustrating alternative pairs of assembly devices utilizing multiple slits, according to an embodiment of the present invention.

FIG. 55A-B are diagrams illustrating an alternative pair of assembly devices that lock together when an external pin is inserted, according to an embodiment of the present invention.

FIG. 56 is a diagram illustrating a side view of the assembly devices in FIG. 55A-B after joining these with an external pin, according to an embodiment of the present invention.

FIG. 57A-B are diagrams illustrating alternative assembly devices aimed at textiles, according to an embodiment of the present invention.

FIGS. 94A-B show a cube having a strip on its surface and the unfolded strip, respectively, according to an embodiment of the invention.

FIGS. 95A-B show a side view of a sampled curve across an edge of a cube, where the curve fails to sample the edge of the cube in FIG. 95A and an additional sample point is added in FIG. 95B, according to an embodiment of the invention.

FIG. 96 shows a feature curve comprising points coincident with mesh vertices, according to an embodiment of the invention.

FIGS. 99A-C show aspects of a technique for handling intersections of a curve segment with a feature curve, according to an embodiment of the invention.

DETAILED DESCRIPTION

Figure 1:
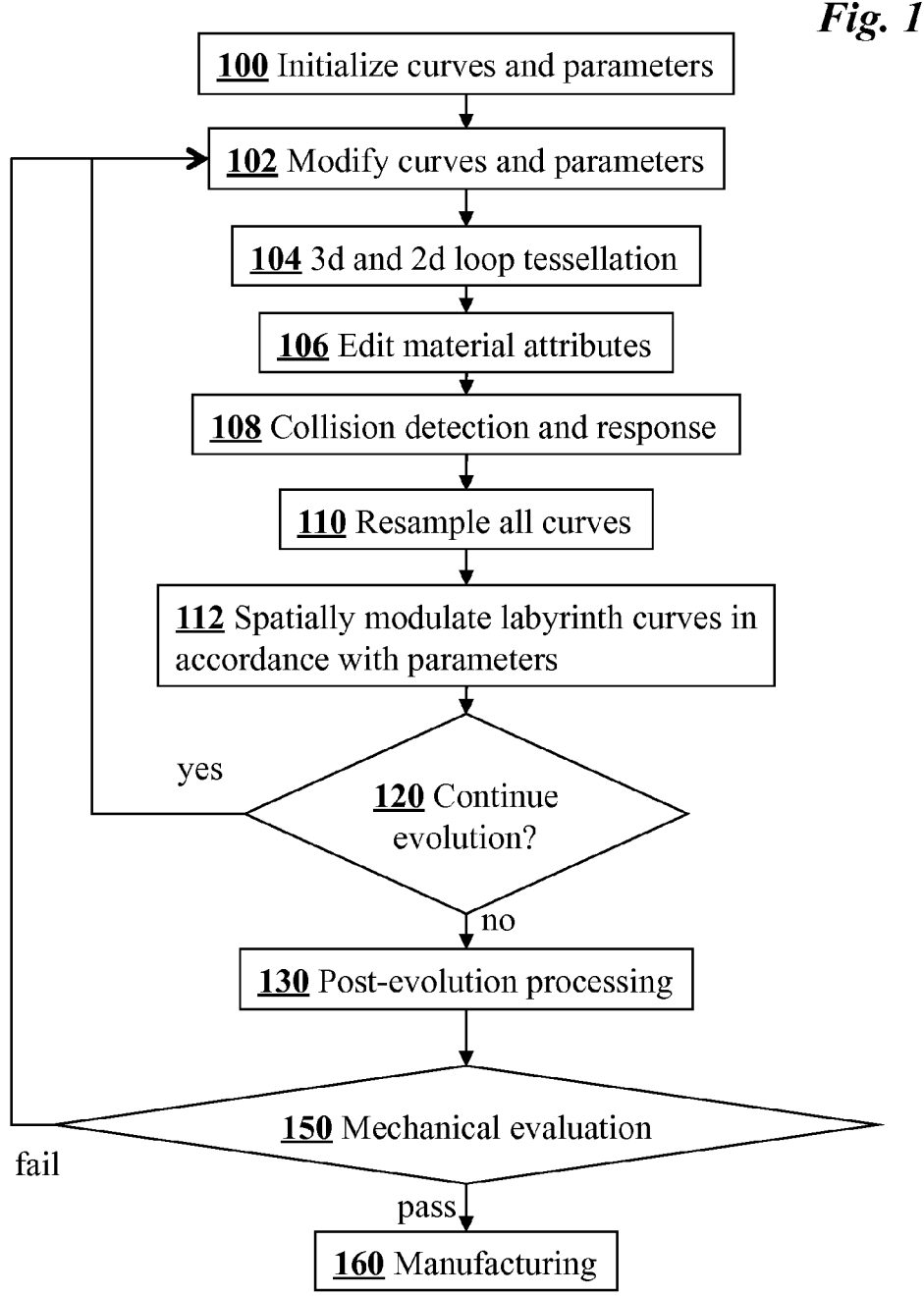
FIG. 1 is a flow chart illustrating main steps of a method for creating self-supporting, easy-to-assemble, textured 3D model, according to an embodiment of the present invention.
Figure 18:
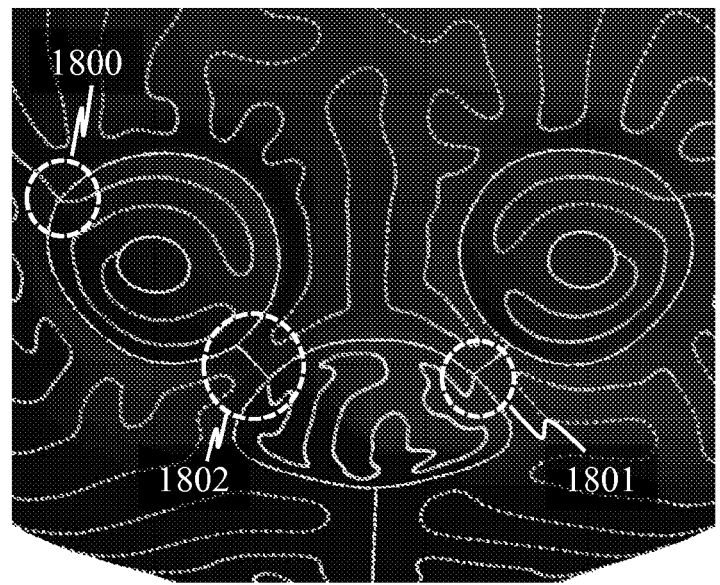
FIG. 18-19 are diagrams illustrating several problems with how the input curves are configured in 3D and how these problems can be addressed, according to an embodiment of the present invention.
Figure 19:
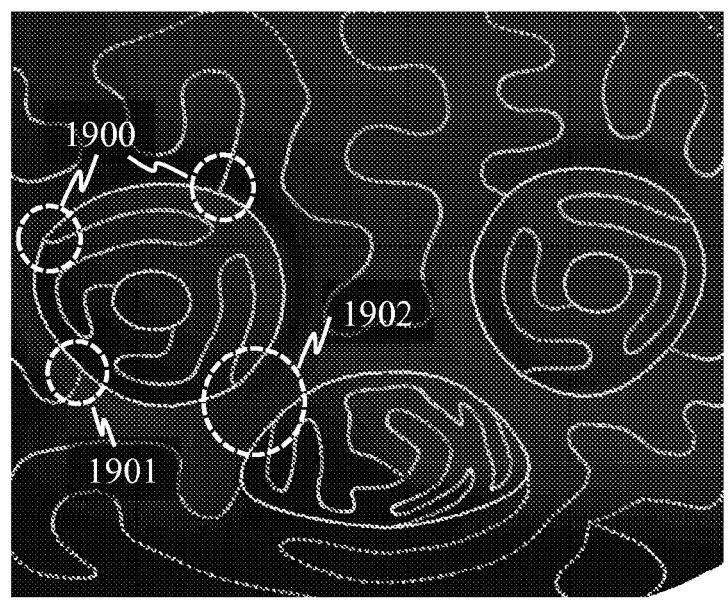

Main steps of a method for generating textured developable surface sculptures according to an embodiment of the present invention are shown in FIG. 1. The process starts with the initialization of curves and parameters, step 100, which is shown in more detail in FIG. 2. First, the evolution space/manifold is initialized in step 200. In addition to a geometric description, the evolution space may comprise texture information. These textures may be stored in the form of 2D texture maps associated with the evolution space, 2D texture maps associated with other texture surfaces, or 3D textures, including procedural textures defined on volumetric regions containing the evolution space. In step 202, the boundaries and boundary gap segments, which are explained in more detail in US PG Publication No. 20080297514, are initialized. In a preferred embodiment, the system analyzes the curve network and gives preliminary recommendations for changes that might improve the strength of the final 3D model or make its assembly easier. FIG. 18 shows an evolution surface with a curve network after curve evolution. Note that several curve junctions have four developable surface strips meeting in a single point 1800, 1801. Further, the junctions are located on geometric features shaped as sharp cusps. Whenever possible, it is preferable to offset the junctions relative to each other as shown in FIG. 19 1900, 1901. This spreads the shear strain over a larger area and also simplifies the assembly process that will be described later. Further, FIG. 18 shows a short boundary curve 1802 connecting two oval-shaped features. The problem here is that shear will tend to pull the surface apart during the assembly: the model will not be self-supporting until all the surrounding features are put in place. FIG. 19 shows an alternative configuration of the curve junctions. Here, the strength of the material will hold the partially assembled 3D model together at the critical spot 1902. The junctions have been moved to locations that are less vulnerable to strain. These are examples of useful, easily implemented heuristics that can be applied at the very beginning of the system, saving the user time by anticipating problems that are likely to occur downstream in the workflow.

Figure 20A:
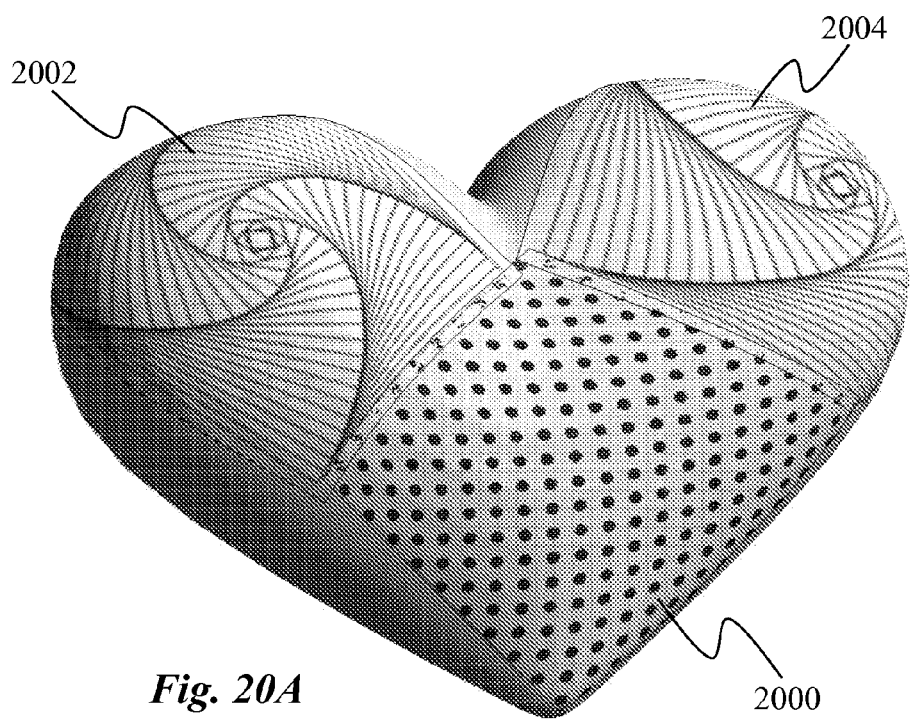
FIG. 20A-C are diagrams illustrating 2D texture maps on a evolution surface in 3D.
Figure 20B:
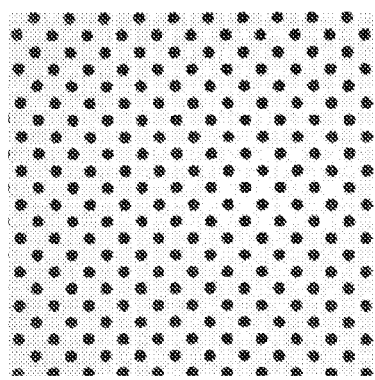
Figure 20C:
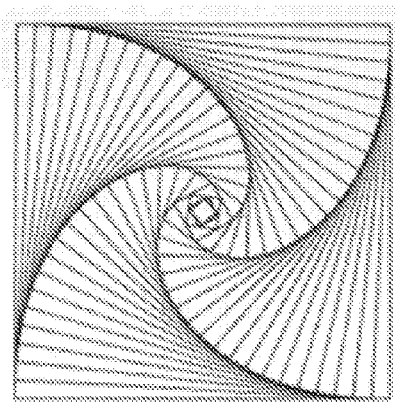

The material sheets, which represent the physical materials that will be used in the manufacturing, are initialized in step 204. Textures associated with the evolution space can also be specified at this point. FIGS. 20A-C show an example of textures associated with an evolution space in the form of a surface embedded in 3D. The image texture in FIG. 20B is mapped to the surface of FIG. 20A once in region 2000 and the texture in FIG. 20C is mapped to the surface of FIG. 20A twice in regions 2002 and 2004. In addition to the material attributes, a geometric description of each piece of physical material, including width, height, and thickness, may be specified. The geometric material sheet description may also comprise trim curves, inaccessible regions, or boundaries between adjoining areas with different properties. Several examples of material sheet descriptions are shown in FIG. 21A-D. The material sheets in FIG. 21A and FIG. 21B have the same width and height but different color and thickness. FIG. 21C shows a rectangular material sheet with a hole through it. FIG. 21D shows a material sheet composed of two layers with separate colors in the depth direction. During the manufacturing, such layered sheets can be removed selectively, causing the colors of different layers to be visible across the surface. Steps 206-212 are described in US PG Publication No. 20080297514 and will not be discussed further here.

After the initialization in step 100 of FIG. 1 is completed, the flowchart enters the first iterative curve evolution cycle comprising steps 102 to 120. Any of these steps can be skipped in any iteration.

Figure 3:
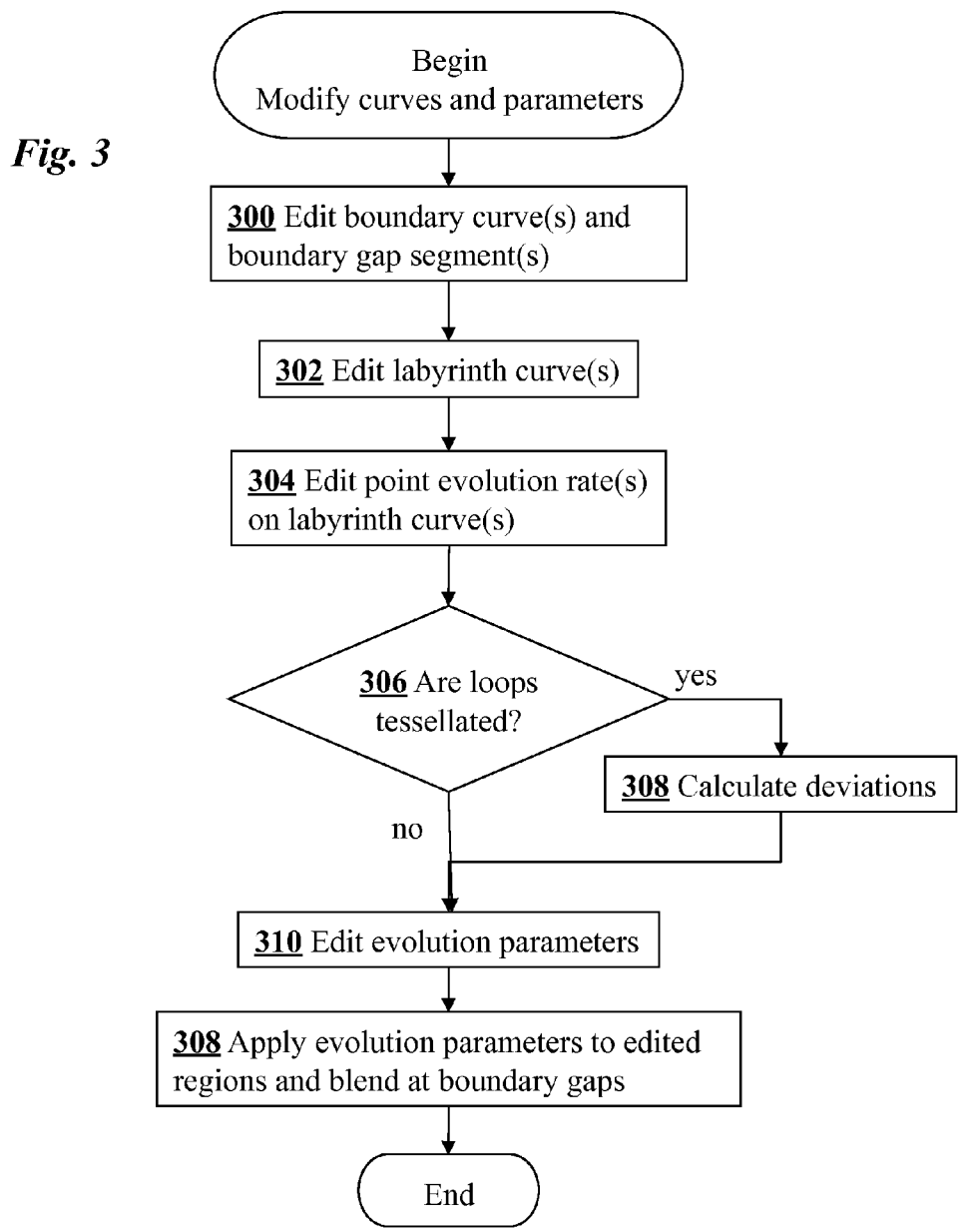
FIG. 3 is a flow chart illustrating steps of a routine to allow curves and parameters to be modified by a user, according to an embodiment of the present invention.
Figure 22:
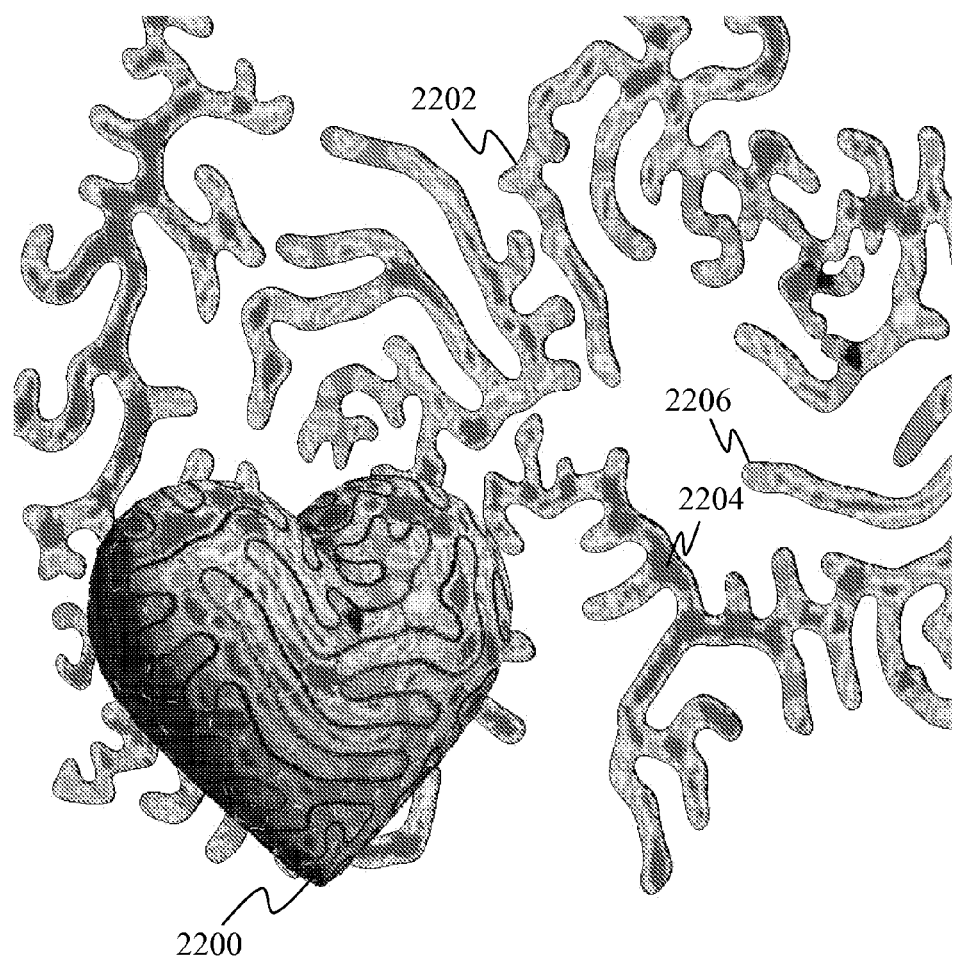
FIG. 22 is a diagram illustrating a color coding of deviation errors between an evolution surface and the developable surfaces generated according to an embodiment of the present invention.

FIG. 3 shows a detailed breakdown of step 102. Step 300-304 comprises editing of the different types of curves used in the evolution as described in US PG Publication No. 20080297514. Step 306 checks whether any curve loops have been specified and tessellated. If so, step 308 optionally calculates the deviations between each loop tessellation and the evolution surface. The deviations are calculated as the difference vector between a set of samples on the developable loop tessellations and their closest points on the evolution space. They measure how well the loop tessellations match the evolution space. FIG. 22 shows a color coding of the deviations between two loop tessellations and the evolution surface they approximate. The loop tessellations in 3D are shown in the foreground 2200, and the corresponding unfolded loop tessellations in 2D are shown in the background 2202. Note that the error tends to be higher near the center of the developable surface strips, e.g., at 2204, than at the boundaries, e.g., at 2206. The curve samples, which constitute the vertices of the loop tessellations, are constrained to lie on the evolution surface and the deviation at these points is therefore zero. If available, the deviation information is used in step 310, "edit evolution parameters", which, aside from the additional use of the deviation errors, is described in US PG Publication No. 20080297514. In areas where the error between the loop tessellations and the evolution space is high, the evolution "scale" parameter, $\delta$, is gradually modified to decrease the spacing between the curves as well as the sampling rate along the curves. Step 308 is described in US PG Publication No. 20080297514.

Figure 9:
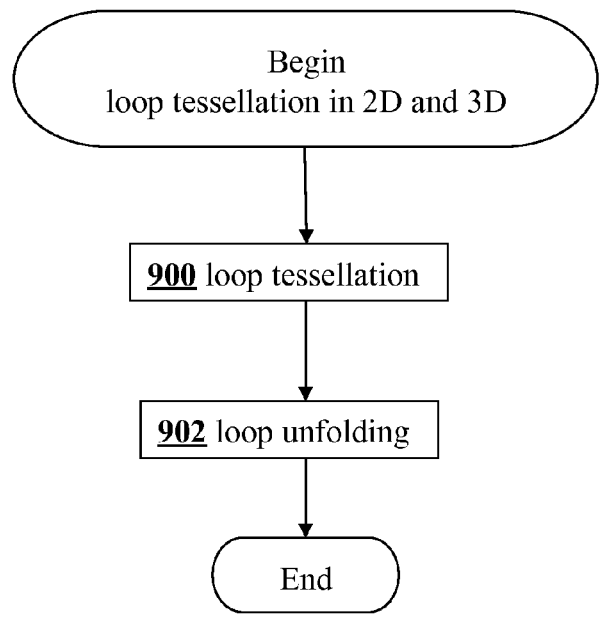
FIG. 9 is a flow chart illustrating steps of a method for tessellating curve loops in 3D and unfolding the resulting tessellations into the 2D plane, according to an embodiment of the present invention.

Step 104 in FIG. 1 is shown in more detail in FIG. 9. It includes two sequential steps, loop tessellation (step 900) and loop unfolding (step 902). Step 900 is shown in detail in FIG. 10. Step 1000-1006 comprise the construction of the loop tessellations in 3D. These steps can be performed by an automatic system or as part of an interactive process where the user provides hints to guide the aesthetics of the tessellation. In a preferred embodiment, the user interface allows the specification of tessellation constraints in the form of line segments interior to each loop (step 1000). The user interface allows the user to mark each line segment as either "flippable" or "locked". Alternatively, the constraints can be computed automatically at points of branching in the loop tessellations. The line segments specify the subdivision of the loop into sub-loops (step 1002) as explained in US PG Publication No. 20080297514. Each sub-loop is subsequently tessellated into a set of primitives such as triangles, quadrilaterals, or N-sided planar polygons in step 1004. Next, the resulting tessellations are subjected to an optimization process where edges are flipped to increase the quality of the sub-loop tessellations. Finally the union of the polygons in all the sub-loop tessellations is again subjected to edge flipping optimization, this time allowing the line segments separating the sub-loops to be flipped unless they are marked as locked, in which case they can not be flipped. User input is particularly important in areas of high surface curvature or at geometric features where the aesthetics of the tessellation is important. Step 1006, which is identical to step 308 (please see prior description), calculates deviations between the loop tessellations in 3D and the evolution surface. The resulting error measurements can guide both an automatic and a user guided embodiment of the tessellation technique by indicating where the tessellation quality may be improved by further optimization and/or editing or addition of tessellation constraints. For more details and figures, please refer to US PG Publication No. 20080297514. The loop tessellation is terminated when the quality check in step 1008 passes.

Figure 11:
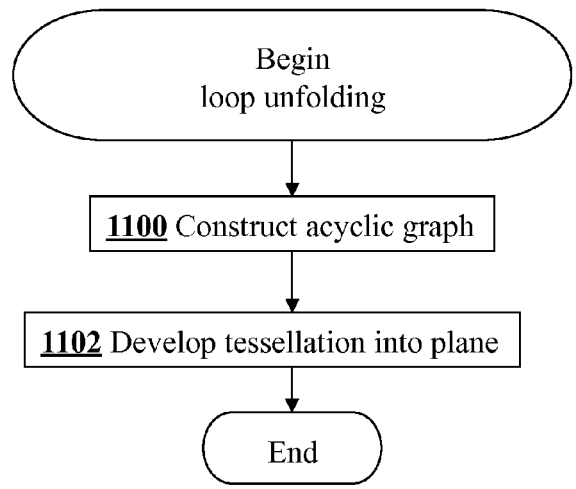
FIG. 11 is a flow chart illustrating steps of a method for unfolding loop tessellations in 3D into the 2D plane, according to an embodiment of the present invention.

The loop tessellations in 3D are designed for easy unfolding into the plane. In step 902 in FIG. 9, each loop tessellation is developed into the plane. The result of this process is a developable surface in the plane that can be manufactured. FIG. 11 shows the unfolding process in more detail. In step 1100, any cycles in the tessellation are removed by inserting a duplicate edge with two duplicate vertices for each cycle.

Figure 23A:
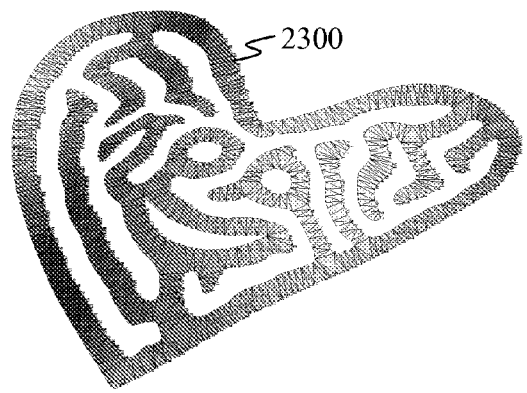
FIG. 23A-B are diagrams illustrating how cycles in a loop tessellation can be eliminated by insertion of duplicate copies of boundary points, according to an embodiment of the present invention.
Figure 23B:
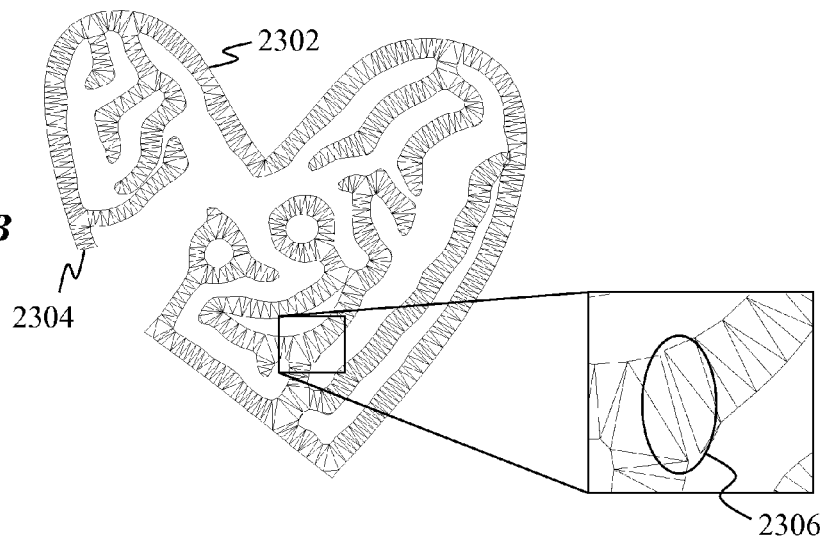
Figure 24A:
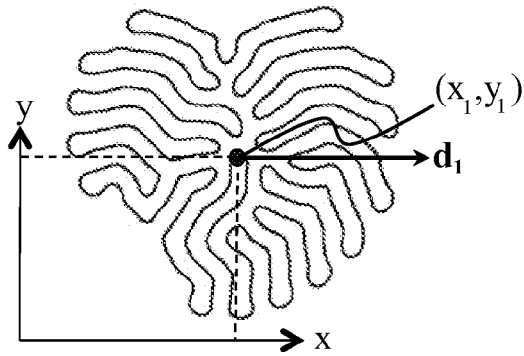
FIG. 24A-D are diagrams illustrating how translational and rotational drift can be avoided during curve evolution for a loop in material sheet coordinates, according to an embodiment of the present invention.

FIG. 23A shows a loop tessellation 2300 with multiple cycles. FIG. 23B shows the unfolded tessellation 2302 after duplicating a pair of vertices for each cycle 2304, 2306, as described in US PG Publication No. 20080297514. This process turns the axes of each loop tessellation into an acyclic graph. Here, the term "axes" will be used to describe the "spine" of the each strip, which can be defined more formally by the medial, chordal or other related axis of the loop. The chordal axis of a tessellation is the union of line segments passing between polygon centers across interior edges. It is an easy-to-calculate approximation to the medial axes of the and loops in 2D and in 3D. The chordal axis of the unfolded tessellation is, by definition, also a connected spanning tree that passes through each polygon in the tessellation exactly once. Using these properties, the unfolding algorithm (step 1102), described in more detail in US PG Publication No. 20080297514, works by picking a random polygon and letting it define the unfolding plane. The remaining polygons are unfolded onto the plane in the order in which they occur along the chordal axis. First, the polygons directly incident to the initial polygon are unfolded by rotating them into the plane of the initial polygon, then the polygons adjacent to those, etc. If a loop is assigned to a material sheet, care must be taken to prevent its position and orientation from changing abruptly or drift in material coordinates over time. As the curve evolution in step 102-120 is repeated from iteration to iteration, any existing loop tessellations change as curve points are added, deleted, or repositioned. This requires updating the loop tessellations in 2D several times during each curve evolution cycle, whenever the loop tessellations in 3D change as a result of random motion, smoothing etc. (see US PG Publication No. 20080297514 for details on all the steps involved in the curve evolution). Drifting of the loops in 2D is prevented by specifying a local coordinate system at a well defined, relatively fixed point on the loop tessellation, such as the center of area. FIG. 24A shows a loop tessellation in the 2D coordinate system that was used during the unfolding of the loop tessellation in iteration N of steps 102-120 in FIG. 1. The center of area is $$\begin{pmatrix} x_1 \\ y_1 \end{pmatrix}$$

while $d_1$ is a reference vector that rotations will be measured relative to. FIG. 24C shows the same loop in material sheet coordinates which are relative to an origin at the lower left corner of the sheet. The loop has been rotated by the angle $\beta_1$ so that reference direction $d_1$ in FIG. 24A matches $d'_1$ in FIG. 24C. The material sheet coordinates $$\begin{pmatrix} u \\ v \end{pmatrix}$$

corresponding to an unfolded loop point at $$\begin{pmatrix} x \\ y \end{pmatrix}$$

in 2D loop coordinates are $$\begin{pmatrix} u \\ v \end{pmatrix} = \begin{pmatrix} u_1 \\ v_1 \end{pmatrix} + \begin{pmatrix} \cos\beta_1 & \sin\beta_1 \\ -\sin\beta_1 & \cos\beta_1 \end{pmatrix} \begin{pmatrix} x - x_1 \\ y - y_1 \end{pmatrix}.$$

Figure 24B:
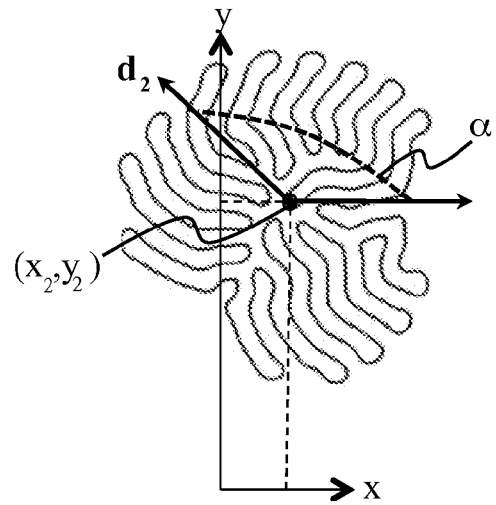
Figure 24C:
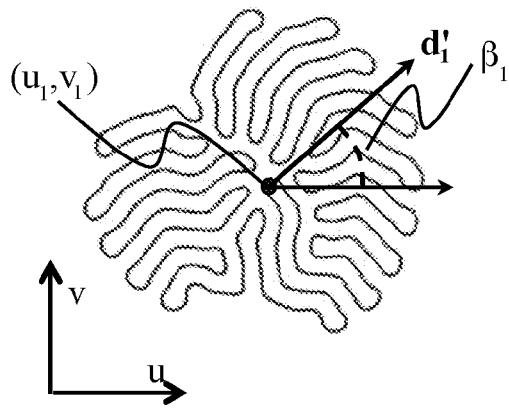

FIG. 24B shows the loop in FIG. 24A after unfolding during iteration N+1. The curve evolution in iteration N has led to resampling and repositioning of the curve points. As a result, the loop tessellation in 3D has changed slightly and the shape of the loop tessellation in 2D is thus also slightly different compared to FIG. 24A. Since the unfolding algorithm starts from a random polygon every time (polygons are not persistent since the tessellation changes during resampling and edge flipping in each iteration), the coordinates of the loop points in FIG. 24A and FIG. 24B have no inherent relation. Due to the nature of the evolution, however, the net effect of each iteration can be measured as the sum of 1) a 2D translation of the center of area and 2) a rotational drift of the loop points relative to the center of area. The rotation angle, $\alpha$, is calculated using a standard least squares fit. Given $\alpha$ and the loop tessellation in FIG. 24B, material sheet coordinates for the loop during iteration N+1 that compensate for drift can be calculated as:

$$\begin{pmatrix} u \\ v \end{pmatrix} = \begin{pmatrix} u_1 \\ v_1 \end{pmatrix} + \begin{pmatrix} \cos\beta_1 & \sin\beta_1 \\ -\sin\beta_1 & \cos\beta_1 \end{pmatrix} \begin{pmatrix} \cos(-\alpha) & \sin(-\alpha) \\ -\sin(-\alpha) & \cos(-\alpha) \end{pmatrix} \begin{pmatrix} x - x_2 \\ y - y_2 \end{pmatrix}$$

Figure 24D:
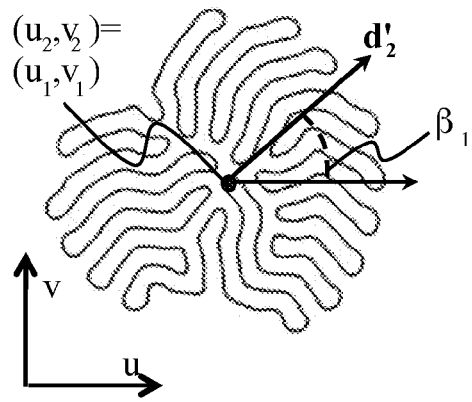

Here, $$\begin{pmatrix} x_2 \\ y_2 \end{pmatrix}$$

is the center of area of the loop tessellation in loop coordinates after iteration N+1. Using this equation compensates effectively for translational and rotational drift so the loop stays relatively fixed in material sheet coordinates between successive curve evolution iterations. FIG. 24D shows the loop in material coordinates after compensating for drift, where $d'_2$ is the result of rotating reference vector $d_2$ in FIG. 24B by $-\alpha$ followed by a rotation by $\beta_1$. The shape of the loop will obviously change over time, but these changes tend to happen at a rate that is slow enough to prevent the loops from overlapping with each other or the material sheet boundaries.

Figure 12:
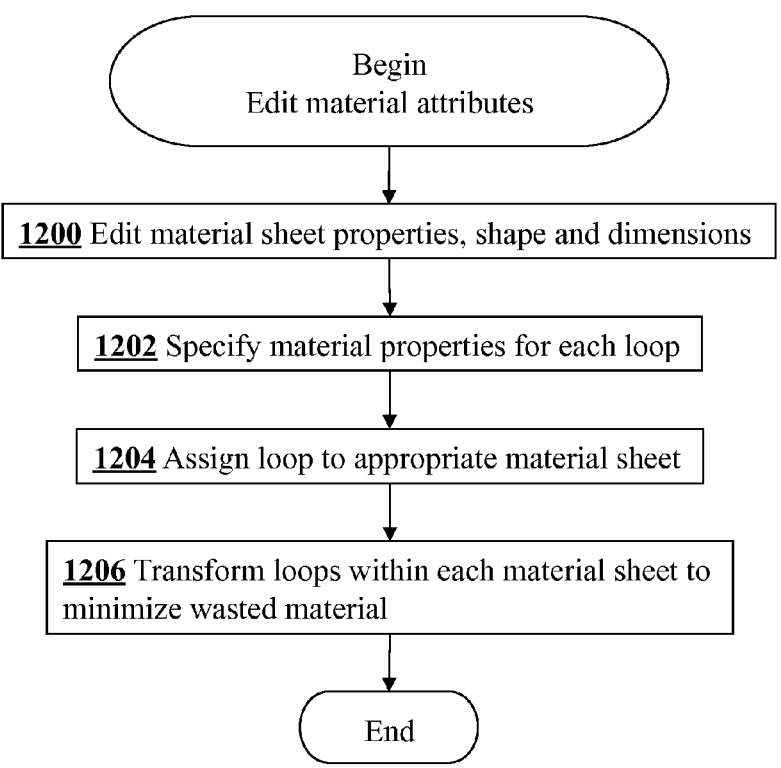
FIG. 12 is a flow chart illustrating steps of a method for editing material sheet properties and assigning loops to material sheets, according to an embodiment of the present invention.

Step 106 in FIG. 1 comprises editing of the material attributes that were specified in step 100. This step is broken into more detail in FIG. 12. Step 1200 allows the user to modify the attributes of material sheets. This allows for experimentation with manufacturing in different material thicknesses during different design cycles, for example. Step 1202 allows specifying and editing the material properties of loops. Loops can be assigned material properties even before they are tessellated. This is relevant if the evolution space contains information about requirement to the material that it is to be manufactured from. An evolution surface may have regions associated with different materials, for example. In step 1204, each loop can be assigned to a material sheet that is compatible with the specified loop material properties assigned in step 1202. Usually, one loop corresponds to one material sheet except for cases where a loop is broken into multiple loop pieces. FIG. 25 illustrates how a loop can be divided into loop pieces. FIG. 25B shows the unfolded loop tessellation 2502 corresponding to the loop tessellation 2500 shown in FIG. 25A. If a loop is broken into multiple unfolded loop pieces to remove self-intersections, each piece can be assigned to a separate material sheet. Note that the loop, which is labeled by its loop id, "11", for identification, has self-intersections 2504, 2505. Loops are split by loop separators 2506, 2507, which are line segments connecting two points on the loop boundary. In a preferred embodiment, step 1206 provides a graphical user interface (GUI) allowing the user to drag and drop 2d loops into 2d screen regions indicating different material sheets. The interaction is done by manipulating a GUI handle 2508, 2509. Such a user interface is shown in FIG. 25C-D. FIG. 25C shows a number of 2d loops distributed between two material sheets 2510, 2512 separated by a border 2514. Here, 2d loop "11" from FIG. 25B has been split into 3 pieces by two loop separators 2506. The loop pieces each have and interactive handle that allows the user to translated and rotate them interactively. They are displayed with the labels "(11/0)/0" 2516, "(11/1)/0" 2518, and "(11/2)/1" 2520. The first number in the label identifier is the loop id, the second number is the loop piece id within the loop, and the third the index of the material sheet that the loop piece is assigned to. In this case, the two first pieces 2516, 2518 are assigned to material sheet "0" and the third piece 2520 to material sheet "1". The loops and loop pieces can optionally be repositioned manually or automatically to utilize the material area as well as possible. The automatic problem is referred to as the "packing problem" and many solutions to this have been published. Our approach presents a novel angle to the packing problem: rather than packing N static 2D shapes to a constrained area, the loops can be grown dynamically to occupy the available area without overlapping.

Figure 26:
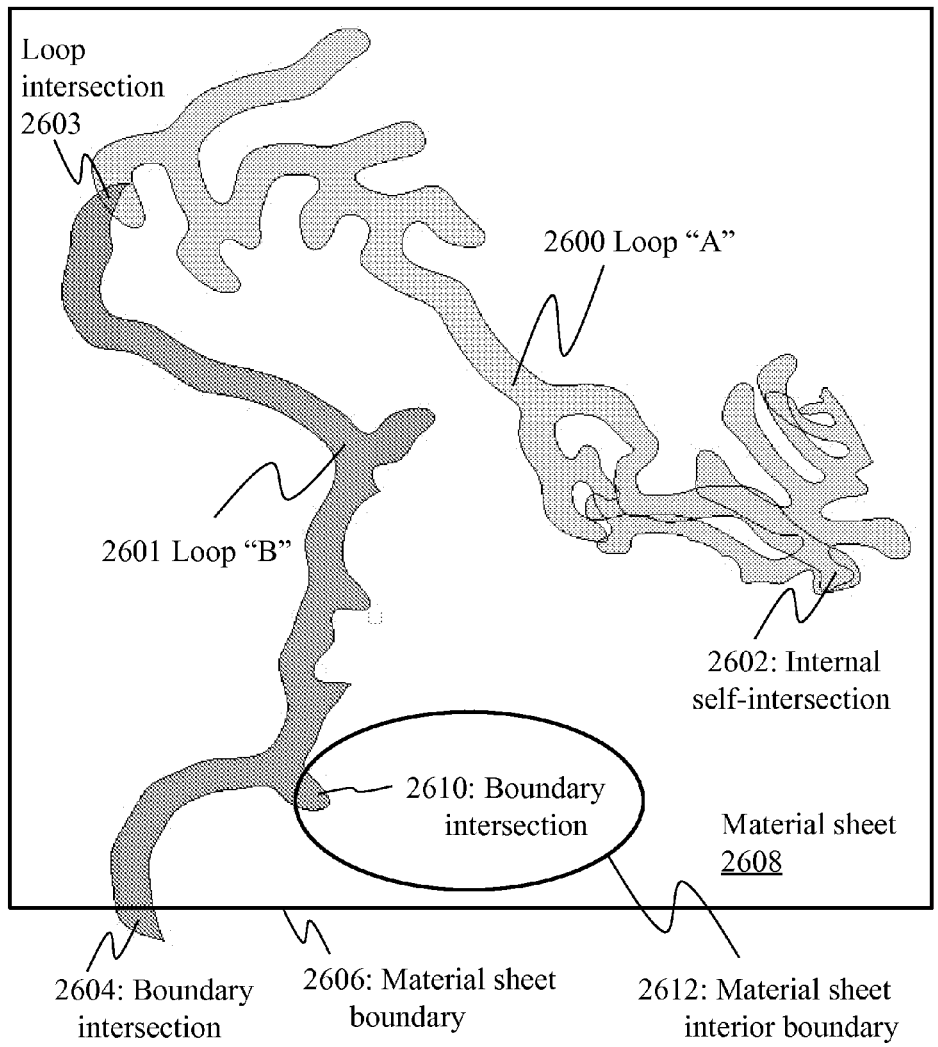
FIG. 26 is a diagram illustrating the different types of collisions that may occur for loops, according to an embodiment of the present invention.

The curve evolution technique described in US PG Publication No. 20080297514 was designed to avoid the curves from crossing each other in 3D. This was accomplished using an attraction-repulsion step where curve points attract and repel each other in a local neighborhood around each point. Even if all the loop tessellations are free of intersections, however, the loop tessellations unfolded in 2D may contain three types of intersections. FIG. 26 shows two unfolded loops, "A" 2600 and "B" 2601:

1. Self-intersections internal to each loop tessellation, e.g., 2602.
2. Intersections with other loop tessellations assigned to the same material sheet 2608, e.g., 2603.
3. Intersections, e.g., 2604 of a loop with boundaries, e.g., 2606 of a material sheet 2608.
4. Intersections, e.g. 2610 of a loop with interior boundaries, e.g., 2612 of a material sheet 2608.

Figure 8:
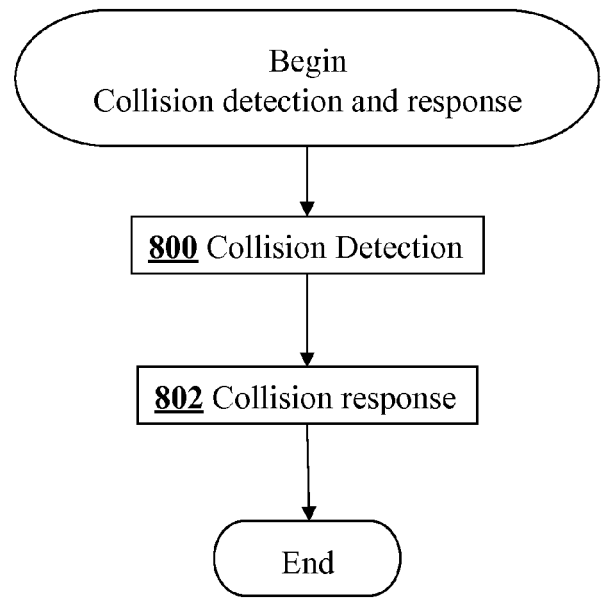
FIG. 8 is a flow chart illustrating steps of a method for detecting and resolving collisions between developable strips in 3D and 2D, according to an embodiment of the present invention.
Figure 13:
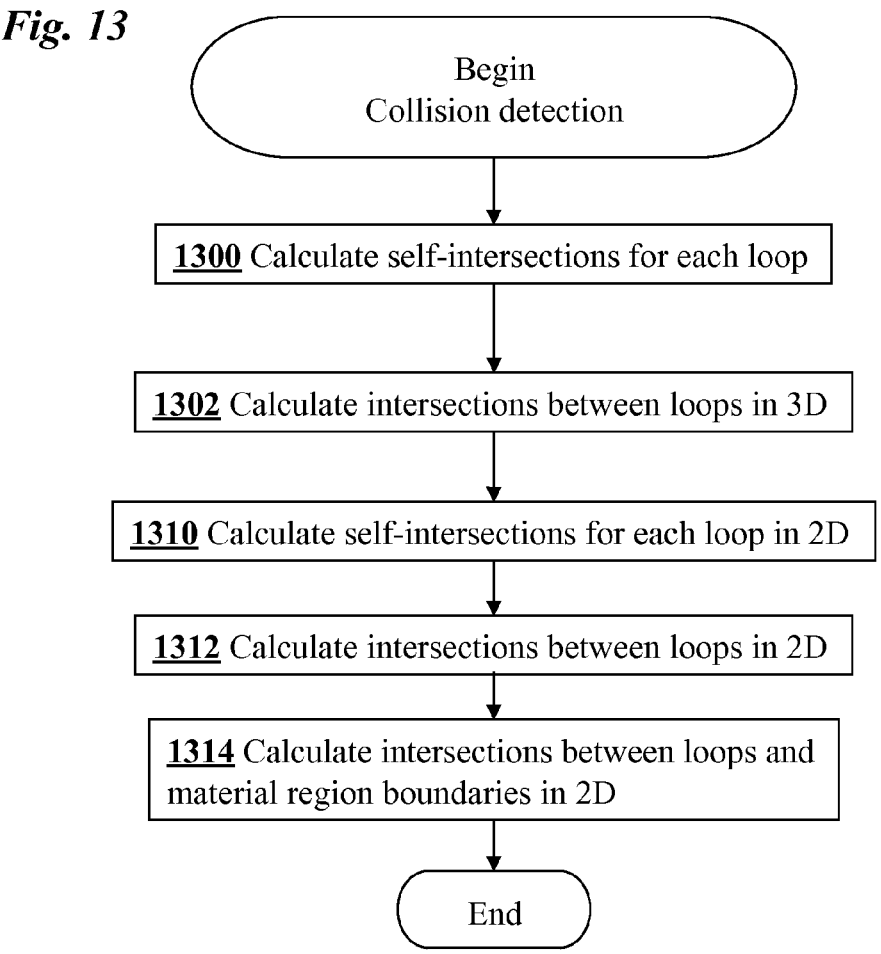
FIG. 13 is a flow chart illustrating steps of a method for detecting collisions between developable surface strips in 3D and collisions between the corresponding unfolded surface strips in the 2D plane, according to an embodiment of the present invention.

Step 108 in FIG. 1 comprises collision detection and collision response for identifying and avoiding such intersections. FIG. 8 shows how collision detection (step 800) is performed prior to collision response in step 802. FIG. 13 shows the steps involved in collision detection in more detail. Step 1300 and step 1302 calculate intersections for loop tessellations in 3D. Steps 1310, 1312, and 1314 calculate self-intersections within individual unfolded loop tessellations in 2D, intersections between different unfolded loop tessellations in 2D, and intersections between unfolded loop tessellations and material sheet boundaries, respectively. Given a set of curves embedded in an evolution plane, surface, or volume, calculating intersections between them is a well studied problem. Almost all existing collision detection techniques use some kind of spatial hierarchy such as octrees, BSP trees, or k-d trees that speed up the calculation by efficiently narrowing in on the region where the collisions occur. Calculating intersections between unfolded loops is particularly simple since they are embedded within a plane. A preferred embodiment utilizes strip trees or k-d trees for smaller unfolded loops. For unfolded loops consisting of thousands of points or more, a preferred embodiment first samples the unfolded loops in a hierarchy of discrete 2D grids. The resolution of the grids is set to match desired tolerance of the acceptable penetration at colliding areas. The grid hierarchy can conveniently be generated using computer graphics hardware by rendering the unfolded loop tessellations into images of different resolution. Once the images are generated, the query of whether a curve sample point along the perimeter of a unfolded loop can be evaluated by a table look-up in constant time: if a pixel corresponding to a point is occupied a collision is reported, otherwise not.

The curve evolution heuristic in FIG. 1 step 110 and 112 will prevent loop intersections in 3D if the curves are sampled adequately compared to the evolution surface curvature. If a loop collision occurs, it is typically sufficient to stop the curve evolution and let the user manually edit the curves in 3D to resolve the collision using curve and/or parameter editing (step 102 in FIG. 1). Unfolded loop intersections in 2D pose a bigger problem in that they are common and that the curve evolution algorithm described so far does nothing to prevent them. The two following alternatives can be applied for resolving such collisions: 1) Split loops into multiple pieces. 2) Delete parts of loops and replace them with other parts.

Figure 14:
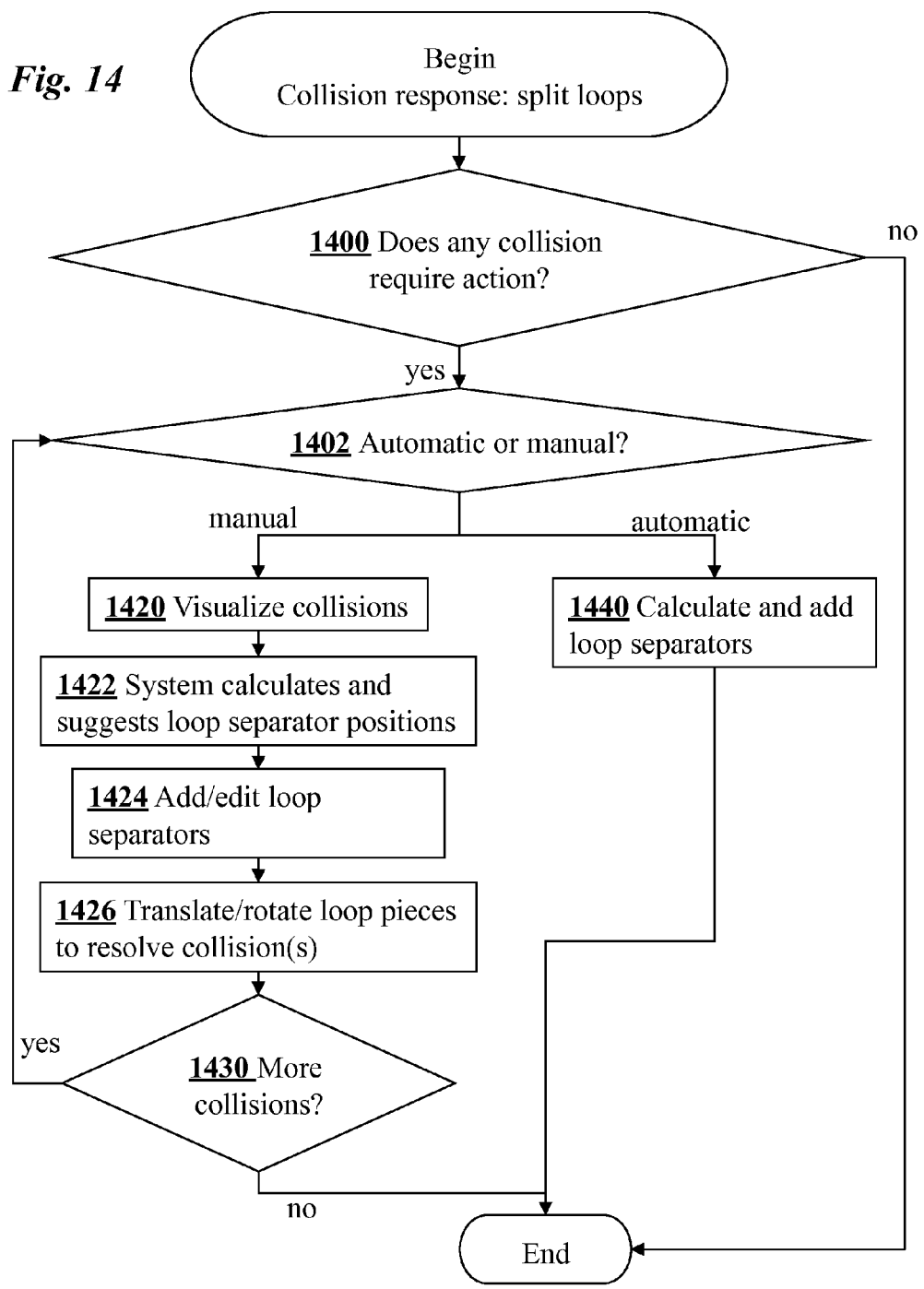
FIG. 14 is a flow chart illustrating steps of a method for resolving collisions by splitting loops into multiple pieces, according to an embodiment of the present invention.
Figure 15:
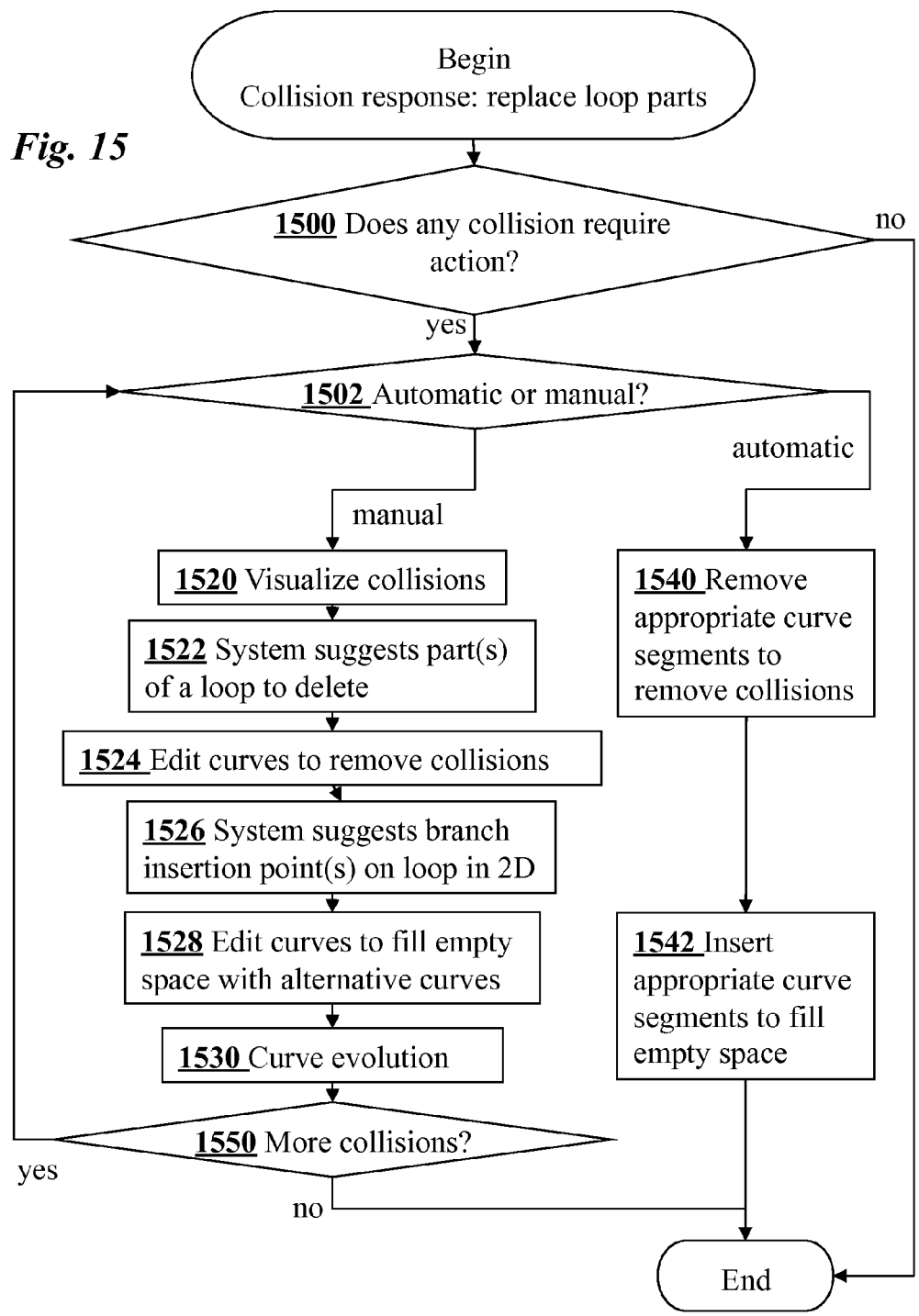
FIG. 15 is a flow chart illustrating steps of an alternate method for resolving collisions by removing parts of developable surface strips and replacing them with other, non-colliding parts, according to an embodiment of the present invention.

The first, which is shown in more detail in FIG. 14, splits a loop into multiple loop pieces. FIG. 15 shows the second, which resolves collisions by locally replacing parts of the loop. Both techniques start out with the same two steps. First, step 1400 in FIG. 14, which is identical to step 1500 in FIG. 15, checks whether any collision, either in 2D or in 3D, was found during the preceding collision detection. If not, no collision response is required. If one or more 2D or 3D collisions were found to require action, step 1402/1502 supports either manual or automatic handling of collision response. In a preferred embodiment, the system first provides the user with visual feedback on where unfolded loop collision occurred in step 1420 and 1520. The feedback shows both a 2D and a 3D view of the relevant areas in real time. The system then calculates, prioritizes, and suggests different ways to resolve each collision. A fully automatic embodiment of the system may decide on which of the alternative responses to use for each collision. Alternatively, the user may make the decision. The remaining steps in the two different approaches will now be discussed separately.

In step 1422, the first technique calculates the axis for each unfolded loop tessellation. It then analyzes the resulting acyclic graph and suggests places to split it. It is generally desirable to split each loop as few places as possible. Reducing the number of pieces usually simplifies the assembly after the unfolded loops are manufactured. Also, cuts in the 2D pieces break their soft curves and may make them appear less attractive. In a preferred embodiment, each sample point, $p_i$ along an unfolded loop is paired with the closest loop point, measured by Euclidean distance, that is not among the k neighbor points to $p_i$ in the order of the points along the loop boundary. Assuming the loop has N points, this yields N point pairs. Among these, the pair that marks the split which resolves the highest numbers of collisions is given the highest priority. The highest prioritized candidate locations for splitting are visualized to the user, who then picks where to add a loop separator in step 1424. The user does not have to choose any of the suggested locations; it is also possible to draw a loop separator by clicking on any two loop points. Likewise, the user may relocate existing separators by dragging their end points along the loop. The visual feedback in the user interface consists of visualizations of the loops involved in the collisions. Unfolded loops are visualized in one screen window and loops in 3D in another. Once the loop separators are in place, they are used to split the loop into loop pieces. N loop separators lead to N+1 loop pieces. FIG. 27A shows a loop corresponding to the unfolded loop in FIG. 27B. The unfolded loop has two self-intersections, 2700 and 2701. The close-ups show the location of a loop separator inserted to resolve the collisions on the loop 2702 and on the unfolded loop 2703. FIG. 27C shows the two corresponding unfolded loop pieces with the split corresponding to the loop separator 2703 visible on each of the two pieces 2704, 2705. Each loop piece is assigned a local coordinate frame relative to the parent loop coordinate system. In step 1426, the loop pieces are translated and/or rotated away from each other as discussed during the introduction of loop pieces (see FIG. 26). Steps 1402-1426 are repeated until no more collisions exist (step 1430). A fully automatic embodiment that does not require user input for resolving collisions is supported as shown in step 1440. The process here is as described above, except that the choices for where to insert the loop separators and how to translate/rotate the loop pieces are made by the system. Both are simple to implement by a skilled practitioner given the information above.

Figure 28A:
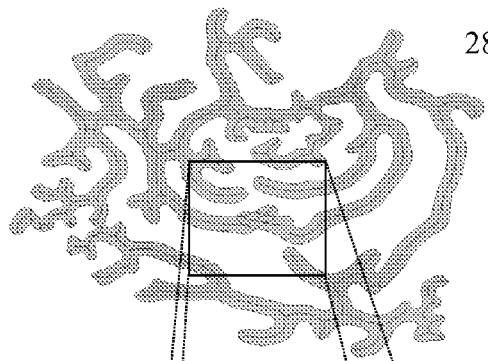
FIG. 28A-J are diagrams illustrating how collisions in the plane can be eliminated by replacing one loop branch with another, according to an embodiment of the present invention.
Figure 28B:
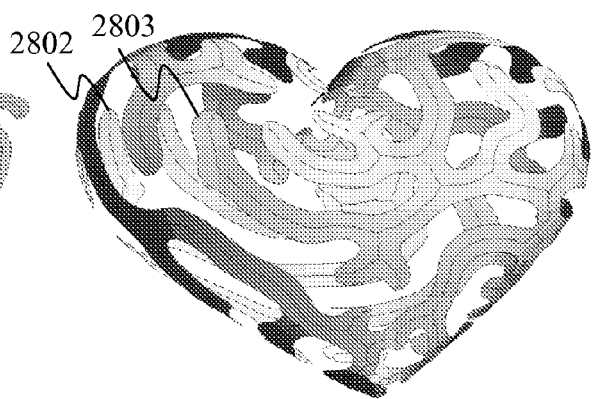
Figure 28C:
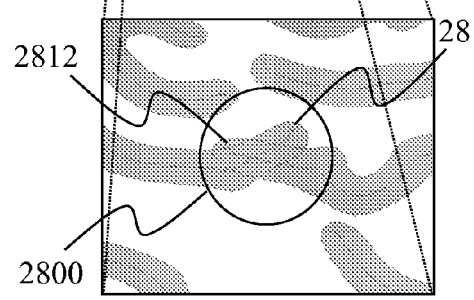
Figure 28D:
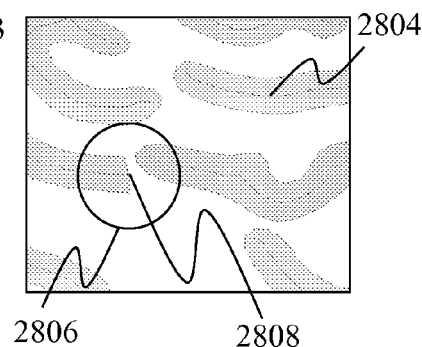
Figure 28E:
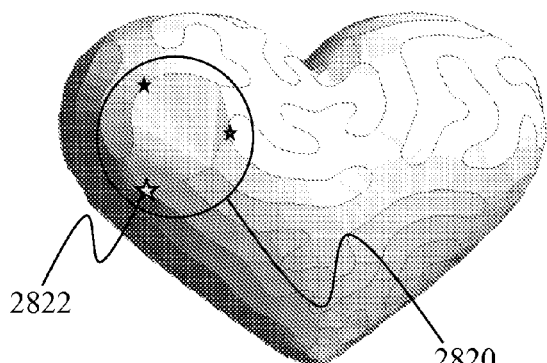
Figure 28F:
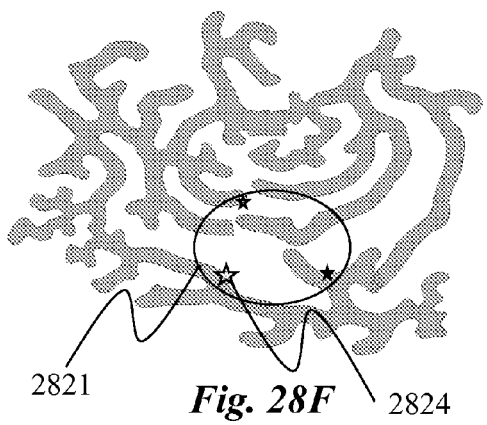
Figure 28G:
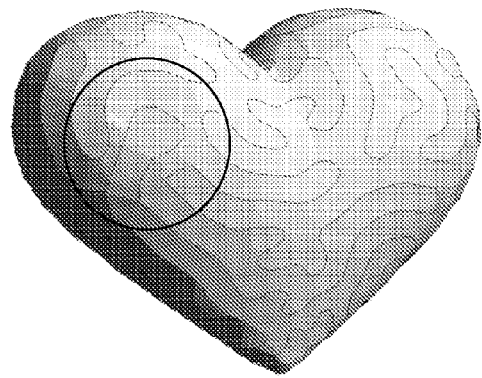
Figure 28H:
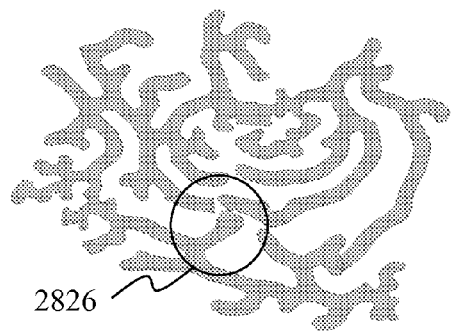
Figure 28I:
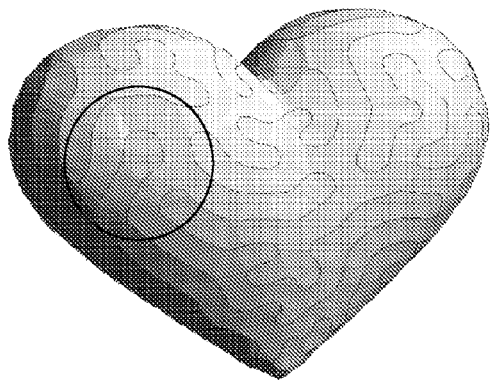
Figure 28J:
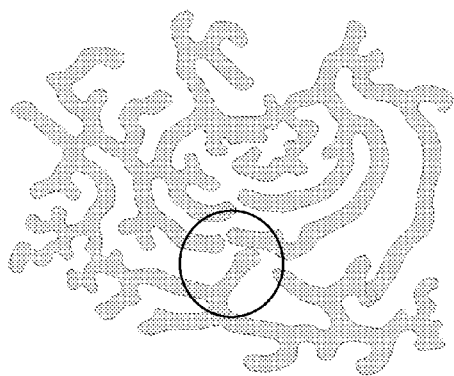

The second collision resolution technique, shown on FIG. 15, continues with step 1522 (the earlier steps are shared with the first technique as explained above). Here, the system analyzes the unfolded loops involved in collisions. FIG. 28A shows an unfolded loop corresponding to the loop in FIG. 28B. While the loop in 3D is free of self-intersections, the unfolded loop contains the self-intersection 2800 shown in FIG. 28C. FIG. 28B shows the regions 2802, 2803 on the loop corresponding to the intersecting parts 2812, 2813 of the unfolded loop in FIG. 28C. Note that these are located in completely different areas on the loop. The system first computes a graph resenting the topology of the unfolded loop. Due to the way the unfolded loop was constructed, in particular the elimination of cycles and the absence of interior vertices, the graph will be an acyclic tree with relatively few, long branches. FIG. 28A-D all show a black line, e.g., 2804, passing through the spine of both the unfolded loops in 2D and the loops in 3D. This is the axis of the strip. Next, the system determines the "least significant" part of the unfolded loop that can be deleted in order to eliminate the intersection. FIG. 28D shows the unfolded loop close-up in FIG. 28C after removal (step 1524/1540) of the tip of one of the branches 2806. The collision could have been removed by removing either of the two intersecting branches, but the system identified the least significant branch as the one with the smallest number of line segments along the chordal axis as measured starting from the earliest point before the intersection 2808. In a preferred embodiment, the system does not change the topology of the unfolded loop during the removal. It is generally possible to delete a smaller, intermediate part of the unfolded loop by only removing the overlapping polygons. However, this would be at the cost of increasing the number of unfolded loops, often unnecessarily. FIG. 28E shows the two loops in 3D comprising the complete surface after the removal of the 2D branch as shown in FIG. 28D 2806. The deletion has left an empty space between the curves that has to be filled. FIG. 28F shows the complete unfolded loop corresponding to the close-up in FIG. 28D. To fill the gap without changing the topology of either unfolded loop, the curves surrounding the gap are modified. This modification must be done without introducing any new unfolded loop intersections. Identifying curve segments near the gap is simple using a spatial subdivision to calculate the closest points to the points that were deleted. Among the resulting pool of points, the system analyzes the unfolded loop to find an appropriate unoccupied area. The 3 pairs of stars shown in FIG. 28E and FIG. 28F in regions 2820 and 2821 indicate 3 different candidate points near the gap and the three corresponding points on the unfolded loops. Among these three points, the one marked by the biggest star 2822 matches the largest unoccupied area between the unfolded loop branches 2824. The system ranks the candidate points using a hierarchical 2D quad-tree data structure. Given such a spatial subdivision, measuring open regions is a simple image processing operation. Step 1526 in FIG. 15 renders a set of prioritized branch insertion points for each collision that was visualized in step 1520. The user of the system can interactively choose which insertion point to use. Alternatively, a fully automatic algorithm would pick the highest ranked insertion point and proceed from that (step 1542). Next, the curve is modified at the points around the curve insertion point. Many well known techniques can be used for this purpose. A preferred embodiment used a combination of manual curve editing (step 1528) and the curve evolution technique from FIG. 1 step 102-120 (step 1530). Step 1550 checks whether any additional collisions need to be resolved. Steps 1502-1550 are repeated as long as this is the case. FIG. 28G shows a new branch inserted at the branch insertion point indicated by the largest star 2822 in FIG. 28E. The branch is shown on the unfolded loop 2826 in FIG. 28H. The new branch was created using a combination of manual curve editing and curve evolution, i.e. step 1528 and 1530. Note that most of the gap created by the branch deletion has been filled with no intersections in the unfolded loop. FIG. 28I shows the new branch and the surrounding curves on the loops in 3D after additional curve evolution iterations. FIG. 28J shows the corresponding unfolded loop. Note that the area where the branch was deleted now blends in naturally and that the change did not create new intersections.

The preceding discussion has focused on techniques for resolving 2D collisions after they have occurred. In addition, the system incorporates a new technique aimed at preventing unfolded loop collisions from occurring during the curve evolution. In US PG Publication No. 20080297514, all steps in the curve evolution were calculated in the evolution space. In particular, the system used attraction-repulsion forces to control the spacing between curves.

Figure 10:
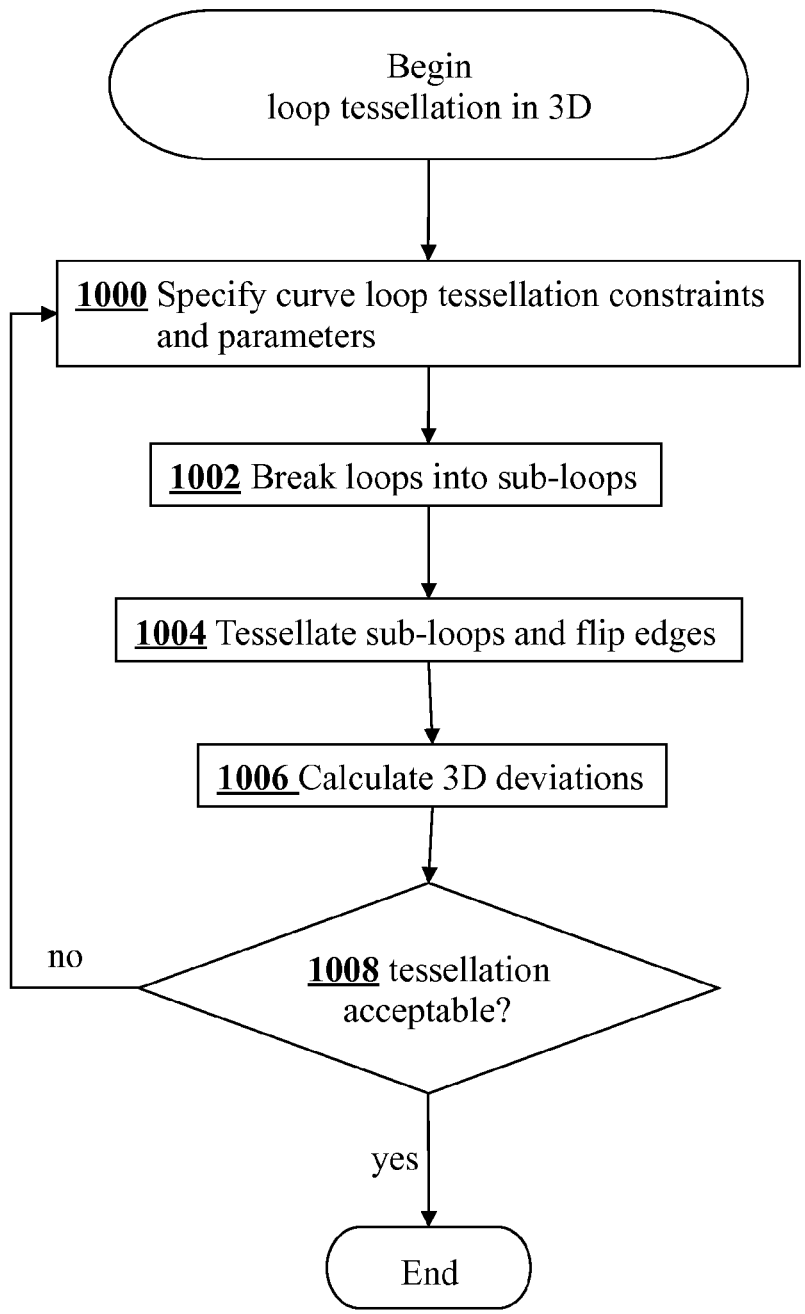
FIG. 10 is a flow chart illustrating steps of a method for tessellating curve loops, according to an embodiment of the present invention.
Figure 29:
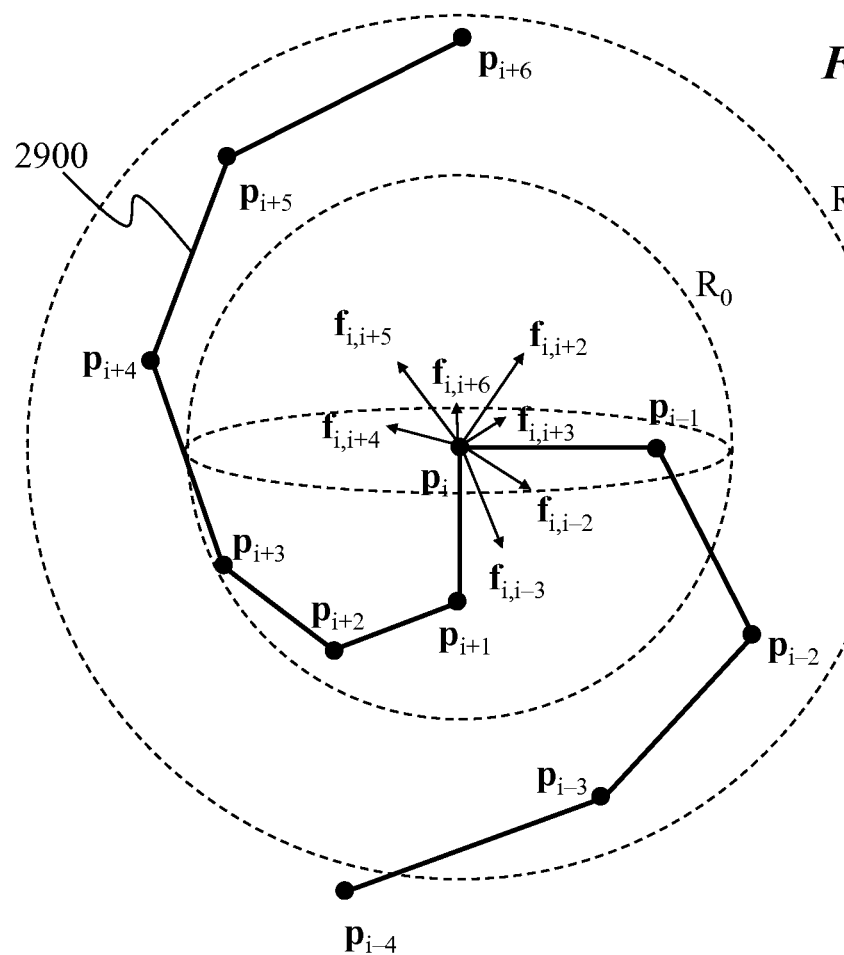
FIG. 29 is a diagram illustrating a 3D attraction-repulsion displacement of a sample point, according to an embodiment of the present invention.
Figure 30:
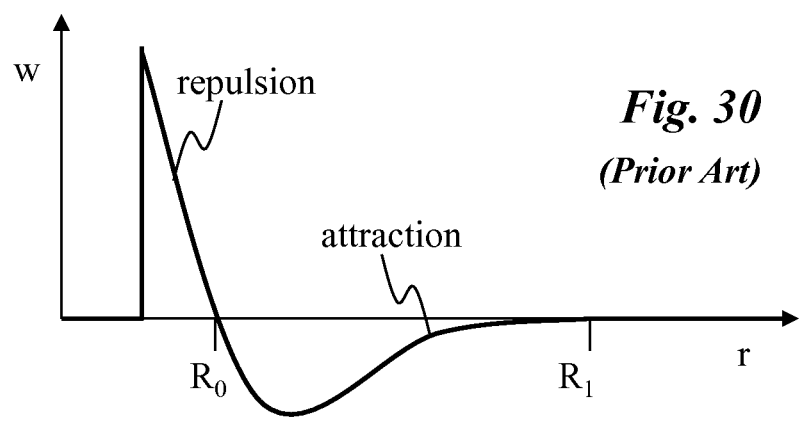
FIG. 30 is a graph of displacement w vs. point separation distance r illustrating how the strength of attraction-repulsion displacement varies with distance between points, according to an embodiment of the present invention.

FIG. 29, which is based on FIG. 10 of US PG Publication No. 20080297514, is a diagram illustrating an attraction-repulsion displacement of a sample point $p_i$ on a curve 2900. A net attraction-repulsion displacement $A_i$ for point $p_i$ is a vector sum of a set of attraction-repulsion displacements $\{f_{i,j}\}$ between $p_i$ and a set of neighboring points $p_j$ scaled by a spatially-dependent attraction-repulsion strength function $f_A$ defined on the evolution space:

$$A_i = f_A(p_i) \Sigma_j f_{i,j}$$

where the sum is over all indices $p_j$ of points $p_j$ located in a neighborhood of point $p_i$. A point $p_j$ is included in this neighborhood of $p_i$ if the distance between the two points is less than a predetermined radius of attraction $R_1$, i.e., $|p_i-p_j|<R_1$. The distance between two points on a surface is approximated by an appropriate metric, such as Euclidean or geodesic distance. Preferably, the k nearest neighbor points along the curve on each side, $p_{i-k}, \ldots, p_{i-1}$ and $p_{i+1}, \ldots, p_{i+k}$, are not included in the neighborhood so as to avoid numerical instabilities. The computed attraction-repulsion displacement $f_{i,j}$ between two points on the curve is an attraction if the two points are separated by a distance greater than a predetermined transition distance $R_0 \leq R_1$. If the two points are separated by a distance less than $R_0$, then the displacement is a repulsion. That is, if $0<r_{i,j}<R_0$ then $f_{i,j}$ is a repulsion, if $R_1<r_{i,j}$ or $i-k\leq j\leq i+k$ then $f_{i,j}$ is zero, and if $R_0<r_{i,j}<R_1$ then $f_{i,j}$ is an attraction.

US PG Publication No. 20080297514 gives details on how the application-repulsion force may be calculated. It explains how the force can be modulated across the evolution space depending on spatially varying functions, such as scale and gradients.

In the following, we will focus on the case where the curve network forms one or more loops with associated unfolded loops formed by developing the loops into the plane. If $p_i$ is a curve sample point on the perimeter of such a loop, the corresponding developed point, $p'_i$, is given by the unfolding operator $\Pi:R^3 \rightarrow R^2$ given by $p'_i=\Pi(p_i)$. The operator $\Pi$ is well defined and invertible for loops resulting from the unfolding algorithm described earlier since the axis of each input loop forms an acyclic tree.

Figure 31:
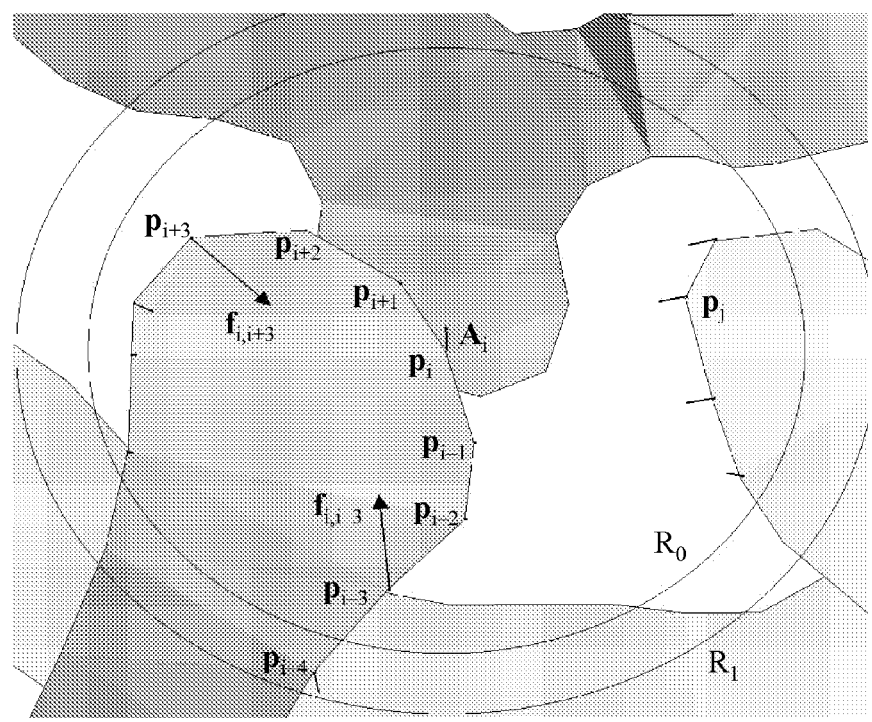
FIG. 31 is a diagram illustrating a 3D attraction-repulsion displacement calculated as the sum of contributions from nearby 3D sample points, according to an embodiment of the present invention.

FIG. 31 shows an example of how $A_i$ is calculated for a point $p_i$ along a loop indicated by shaded polygons. The two circles in the figure mark the repulsion and attraction radii for spheres centered at $p_i$. As explained in US PG Publication No. 20080297514, the k=2 neighboring points along the curve are ignored in the force calculation. In this case, k=2 so that $p_{i-2}$, $p_{i-1}$, and $p_{i+2}$ do not contribute to the equation. In the figure, points such as $p_{i-3}$ and $p_{i+3}$ are within the repulsion radius and thus contribute repelling forces. The point $p_{i-4}$ contributes a small attracting force. The sum of all the forces is the resulting force $A_i$.

If $p_i$ is a curve sample point on the perimeter of such a loop, the above equation for the attraction-repulsion force $A_i$ is changed to include additional terms $A'_i=A_i+B_i+C_i$, where $B_i$ and $C_i$ are new 3D forces given by $$B_i=\Pi^{-1}(B'_i)$$

$$C_i\Pi^{-1}(C'_i).$$

Here, $B'_i$ and $C'_i$ are 2D vectors calculated as $$B'_i=f_B(P'_i)\Sigma_j f'_{i,j}$$

$$C'_i=f_C(p'_i)\Sigma_j g'_{i,j}$$

where $f_B:R^2 \rightarrow R$ and $f_C:R^2 \rightarrow R$ are scalar functions, equivalent to $f_A:R^2 \rightarrow R$, that specify how the attraction-repulsion function changes over the unfolded loop. $f'_{i,j}$ and $g'_{i,j}$ are 2D attraction-repulsion force vectors, one of each for every sample point $p'_j$ within the radius of influence of $p'_i$, i.e., $R'_1$ for $f'_{i,j}$ and $R''_1$ for $g'_{i,j}$ (see FIG. 34 and FIG. 38, which will be explained in more detail in a moment).

Figure 32:
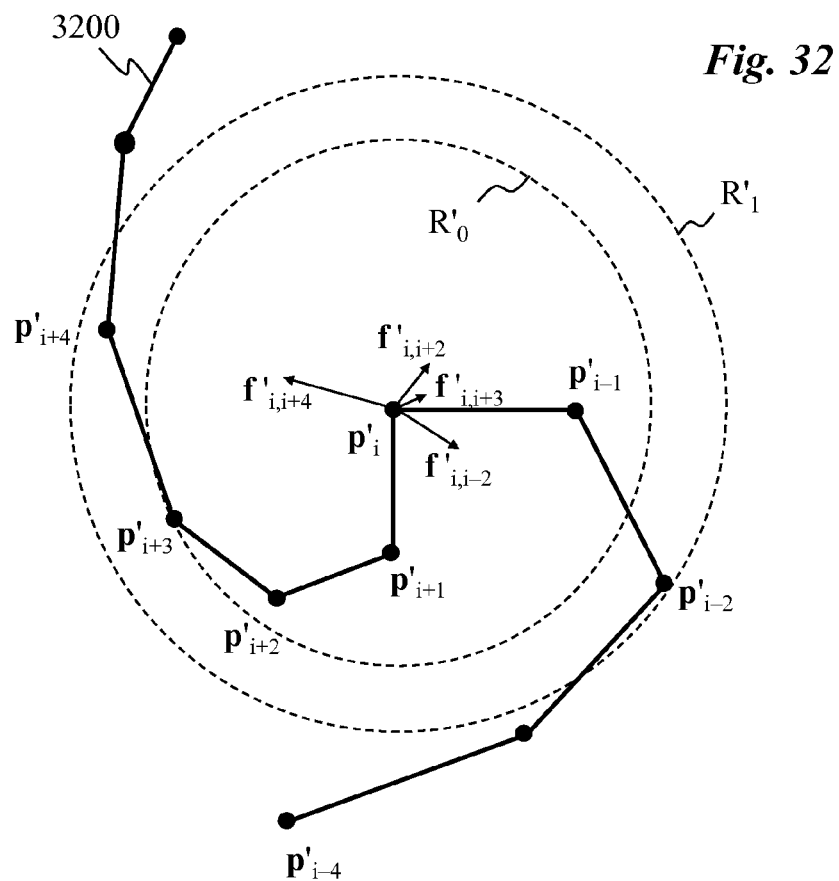
FIG. 32 is a diagram illustrating a 2D attraction-repulsion displacement of a sample point due to nearby sample points on loop boundaries, according to an embodiment of the present invention.
Figure 33:
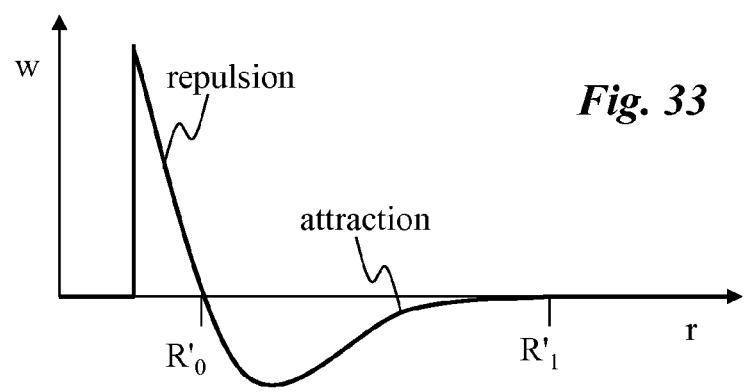
FIG. 33 is a different graph of displacement w vs. point separation distance r illustrating how the strength of attraction-repulsion displacement varies with distance between points, according to an embodiment of the present invention.
Figure 34:
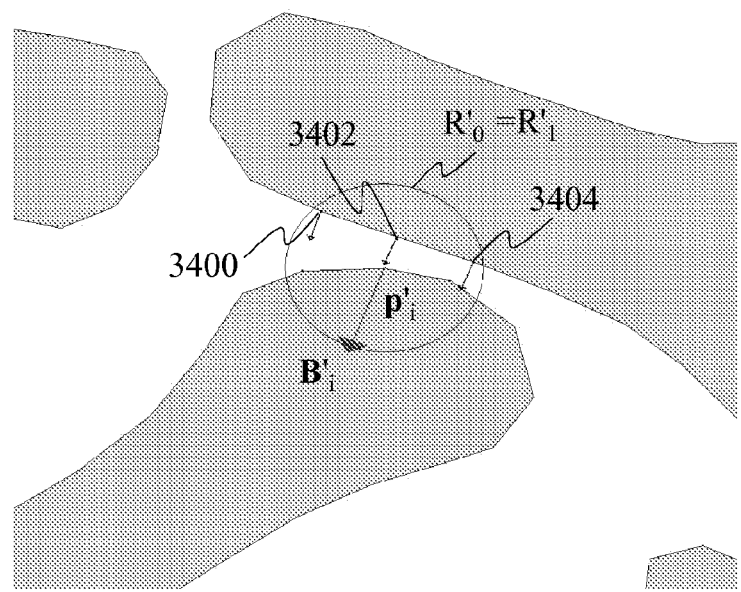
FIG. 34 is a diagram illustrating a 2D attraction-repulsion displacement calculated as the sum of contributions from nearby sample points, according to an embodiment of the present invention.

FIG. 32 shows an unfolded point $p'_i$ corresponding to point $p_i$ along with nearby points in a local neighborhood. Just like the 3D attraction-repulsion force was computed using a 3D hierarchical spatial subdivision for efficient calculation of all other curve points within a sphere centered at $p_i$ with radius $R_1$, the system uses a hierarchical 2D spatial subdivision to find all the unfolded points in a circle centered at $p'_i$ with radius $R'_1$. FIG. 33 shows an attraction-repulsion function with repulsion radius $R'_0$ and attraction radius $R'_1$. Since the primary goal is to prevent intersections among the unfolded loops, the repulsion radius is most important. $R'_1$ may in many cases be set identical to $R'_0$ (see FIG. 34). It is noted that 2D attraction provides a way to control the shape of the unfolded strips. For example, it allows the unfolded strips to match the contours of arbitrarily shaped closed curves, sometimes referred to as figurals, which can add visual appeal to individual strips used in the assembly. FIG. 26 shows an oval interior boundary 2612 that the unfolded strips will grow around. FIG. 34 shows a point $p'_i$ on an unfolded loop. The repulsion forces corresponding to nearby points 3400, 3402, 3404 contribute to the attraction-repulsion force $B'_i$.

Figure 35:
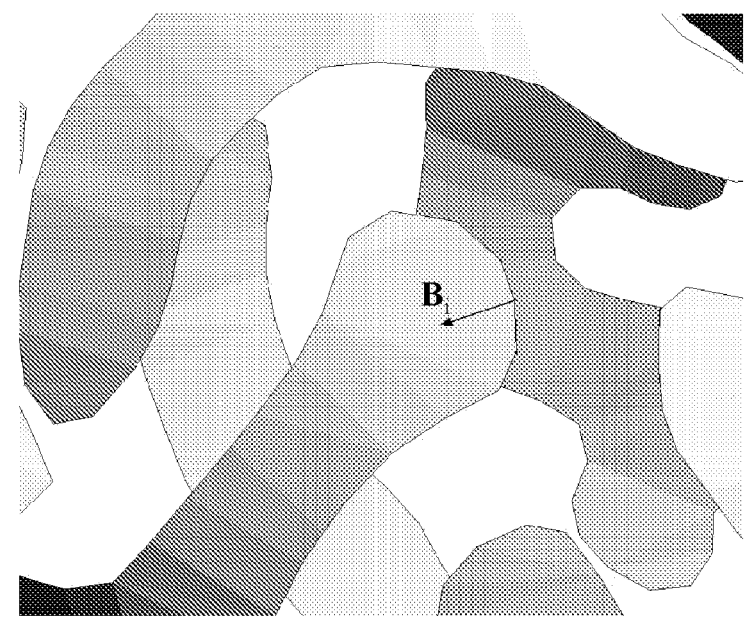
FIG. 35 is a diagram illustrating the 2D attraction-repulsion displacement shown in FIG. 34 mapped to a 3D displacement at the corresponding point in 3D, according to an embodiment of the present invention.
Figure 36:
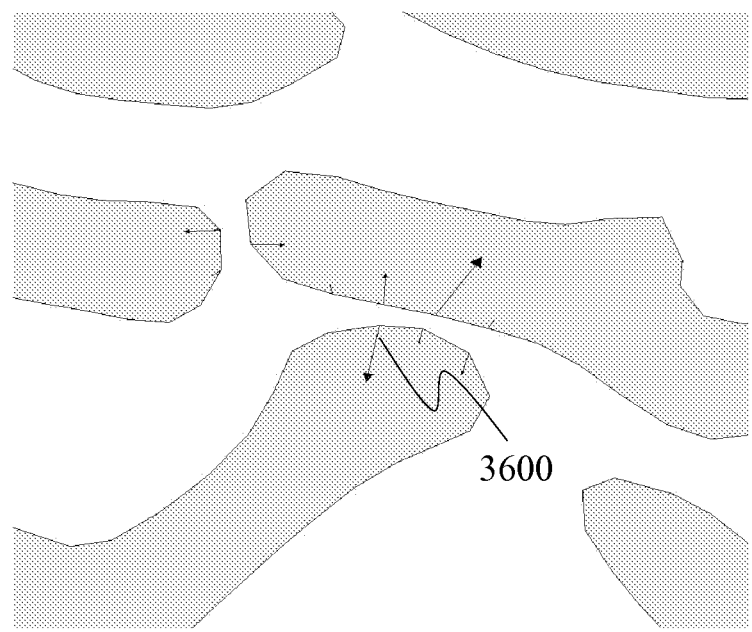
FIG. 36 is a diagram illustrating 2D attraction-repulsion displacements for sample points along a loop boundary, according to an embodiment of the present invention.
Figure 37:
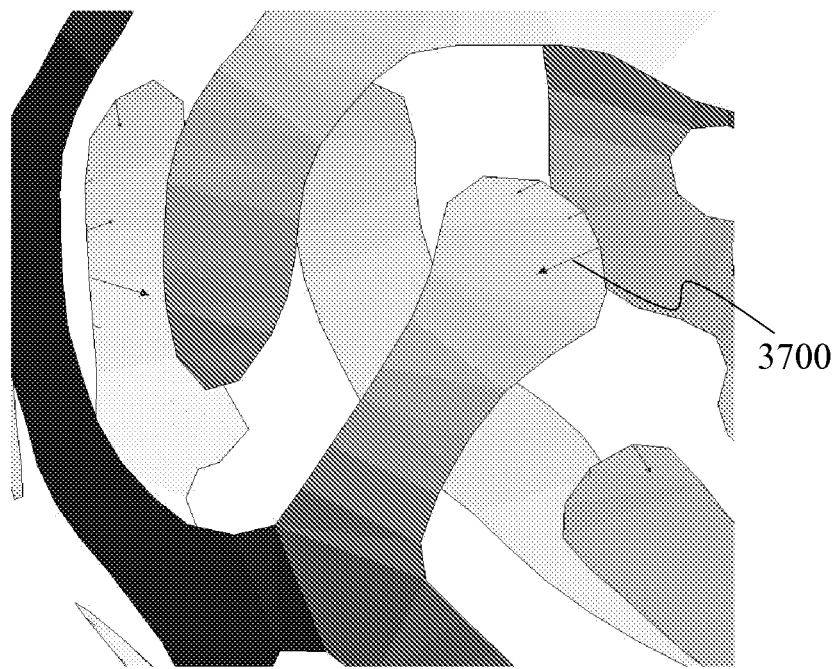
FIG. 37 is a diagram illustrating the 2D attraction-repulsion displacements shown in FIG. 36 mapped to 3D displacements at the corresponding points in 3D, according to an embodiment of the present invention.

To obtain the 3D displacement $B_i$ from the 2D displacement $B'_i$, the inverse of the unfolding operator $\Pi$ must be estimated. In differential geometry, the Frenet frame for a parameterized curve in 3D is an orthonormal basis of 3D vectors consisting of the curve tangent T, the local surface normal N, and the binormal B=T×N. A discrete approximation of the Frenet frame can be estimated at each point on the unfolded loop, setting N=(0, 0, 1) as well as at each corresponding point on the loop in 3D. The two coordinate systems yield an easy mapping of $B'_i$ to $B_i$. FIG. 35 shows the result of applying this mapping to the 2D force $B'_i$ from FIG. 34. FIG. 36 shows $B'_i$ for every sample point along an unfolded loop 3600. Note that $B'_i$ is 0 where the branches of the unfolded loop are sufficiently far apart. Thus, $B'_i$ only has an effect where there is a risk of collisions in a loop after unfolding. FIG. 37 shows the same forces shown in FIG. 36 mapped to the corresponding loop 3700. The system uses $B_i$ along with the 3D attraction-repulsion force $A_i$ in the equation for the final force $A'_i$.

Figure 38:
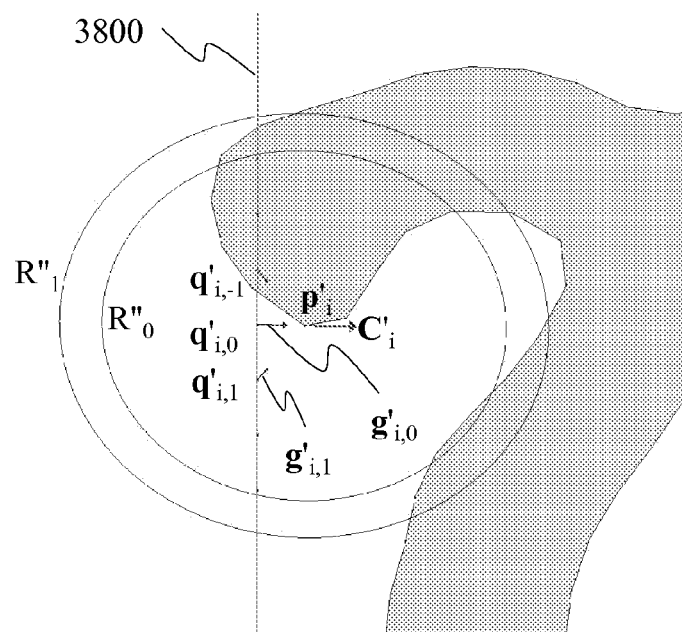
FIG. 38 is a diagram illustrating a 2D attraction-repulsion displacement calculated as the sum of contributions from nearby sample points in 2D along a material sheet boundary, according to an embodiment of the present invention.
Figure 39:
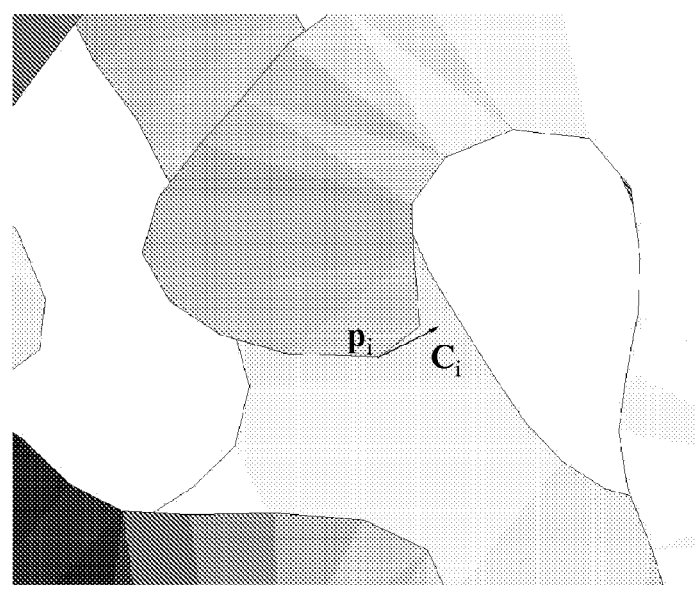
FIG. 39 is a diagram illustrating the 2D attraction-repulsion displacement shown in FIG. 38 mapped to a 3D displacement at the corresponding point in 3D, according to an embodiment of the present invention.
Figure 40:
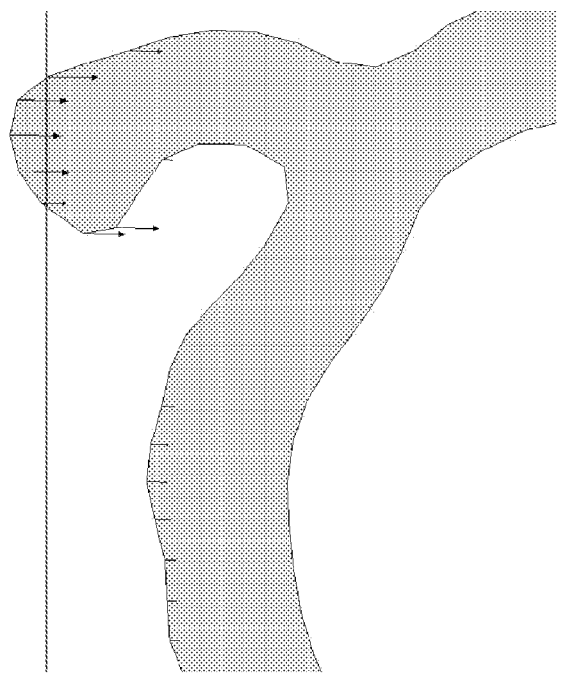
FIG. 40 is a diagram illustrating 2D attraction-repulsion displacements for multiple sample points along a material sheet boundary, according to an embodiment of the present invention.
Figure 41:
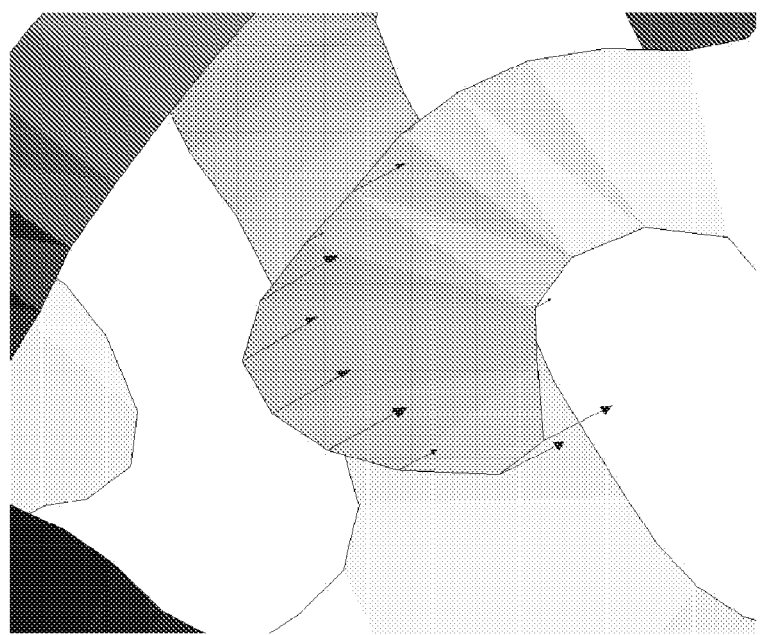
FIG. 41 is a diagram illustrating the 2D attraction-repulsion displacements shown in FIG. 40 mapped to 3D displacements at the corresponding points in 3D, according to an embodiment of the present invention.

Similar to how $B_i$ serves to reduce the risk of collisions between the unfolded loops, $C_i$ addresses collisions between unfolded loops and material sheet boundaries. FIG. 38 shows part of a unfolded loop approaching and intersecting a material sheet boundary curve 3800. An overlap like this would lead to a gap in the manufactured 3D model since only the part of the unfolded loop that falls inside the material sheet can be manufactured. For each point $p'_i$, a 2D force $C'_i$ is calculated in order to control the distance between curve and the material sheet boundaries. In a preferred embodiment, the point is first projected to nearby material sheet boundary curves. If any of the resulting projections fall within the radius of influence $R''_1$ a new sample point $q'_{i,j}$ is computed at the projected point. Additional sample points are calculated in both directions along the boundary curve using a sample distance proportional to the scale parameter $\delta(p'_i)$ as long as the samples fall inside a distance $R''_1$ of $p'_i$. These samples are then used to calculate $C'_i$ just like nearby 2D samples were used to calculate $B'_i$. Note that the nearby samples are located on the material sheet boundary rather than on the unfolded loop boundary. Where each nearby point $p'_j$ contributed a force $f'_{i,j}$ in the calculation of $B'_i$, each sample $q'_{i,j}$ contributes a force $g'_{i,j}$ in the calculation of $C'_i$. Finally, $C'_i$ is mapped back to the loop using the same process employed to calculate $B_i$ from $B'_i$. FIG. 39 shows the resulting 3D vector $C_i$ corresponding to the 2D vector $C'_i$ in FIG. 38. FIG. 40 shows the force $C'_i$ for every sample point along a segment of an unfolded loop. Note that points outside the material sheet boundary are pushed towards the interior of the material sheet and that the forces are strongest near the boundary. Sample points further from the material sheet boundary are in less danger of intersecting the boundary and thus have $C'_i=0$. FIG. 41 shows some of the forces in FIG. 40 mapped to the loop. Given $A_i$, $B_i$ and $C_i$, the final force $A'_i$ at $p_i$ can now be calculated.

Later on in the workflow, during post-evolution processing, step 130 in FIG. 1, the unfolded loop boundaries will be modified locally in order to accommodate assembly of the final surfaces. This process includes offsetting the boundaries outwards in some areas. This may lead to additional collisions that have to be resolved during the post-evolution processing. One way to prevent such collisions is to offset the loop boundaries outwards by the maximum displacement that may occur while adding the assembly mechanism. Step 108 can then be applied to the offset boundaries. In a fully automated embodiment this is preferable since resolving collisions due to the assembly mechanism is complex without user guidance.

However, offsetting the boundaries everywhere is typically too conservative and may lead to ineffective use of the material area or the need for splitting loops into loop pieces unnecessarily. A preferred embodiment thus postpones processing of collisions that occur in step 130 until the assembly mechanism is in place. How this is done will be covered in the discussion of step 130.

Figure 4:
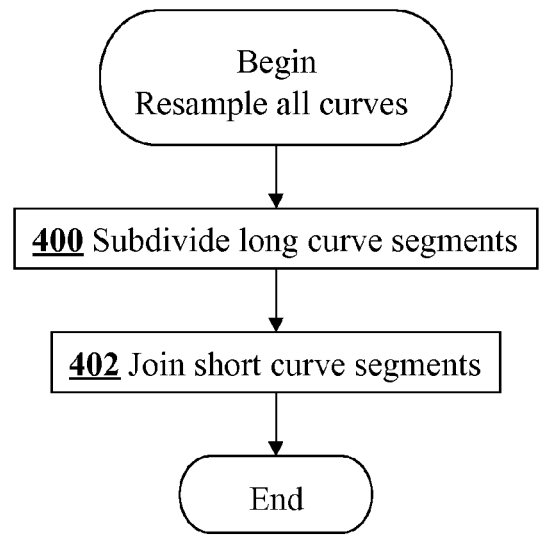
FIG. 4 is a flow chart illustrating steps of a curve resampling routine, according to an embodiment of the present invention.
Figure 5:
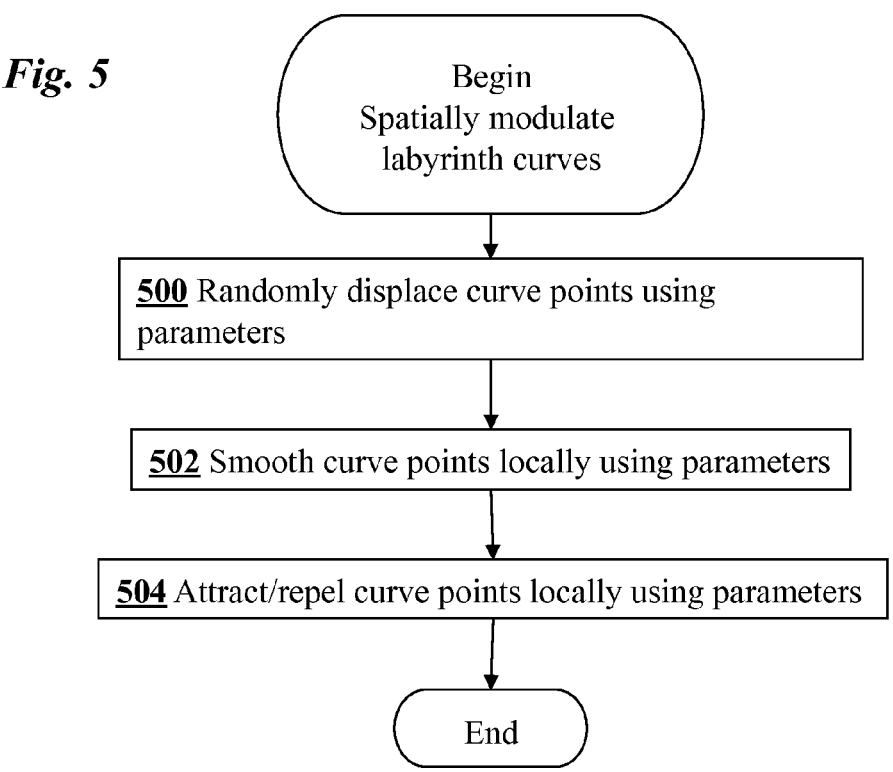
FIG. 5 is a flow chart illustrating steps of a curve evolution routine, according to an embodiment of the present invention.

After collision detection and resolution, step 110 in FIG. 1 up- and/or down-samples the curves as shown in FIG. 4. Resampling for curves in 3D is described in US PG Publication No. 20080297514, but the simultaneous evolution of loops in 3D and 2D poses an extra challenge. Since the tessellation of a loop in 3D is computationally intensive, it is not feasible to recreate this tessellation often. The curve evolution requires hundreds or thousands of iterations that have to be performed as fast as possible, quickly enough to provide useful feedback to the user. A preferred embodiment creates the tessellation once and subsequently only when specifically requested by the user, for example if he/she changes the tessellation parameters. The previously described technique for unfolding of loops into the plane was specifically chosen so that:

1. The number of points and polygons in the unfolded tessellation are the same as in the tessellation in 3D.
2. Adjacent polygons in the tessellation in 3D are also adjacent in the unfolded tessellation and vice versa.

It was to maintain these invariants that the unfolding algorithm started by duplicating loop points in 3D for loops with cycles (FIG. 23A-B). Likewise, the edge flipping optimization was only performed on the loop tessellation in 3D in order for the two tessellations to stay in sync. Under these assumptions, it is preferable to represent the loop tessellations in a single data structure that only stores the topological information once, sharing it between the tessellations in 2D and 3D. A number of existing methods for storing topological data for tessellations, such as the half-edge and the winged edge data structures, can be used. The loop sample point positions in 2D and 3D are stored in arrays with the same number of elements: one with 3D vectors (assuming the evolution space is 3-dimensional) and the other with 2D vectors. The data structure can be further optimized by sharing the 3D representation of the sample points used in the loop boundary curves and the vertices in the 3D representation of the loop tessellation. Whenever the positions of the curve samples change during the curve evolution or manual curve editing, the geometry of any loops incident to the curves is updated automatically. During the unfolding of the loops from 3D to 2D, only the array of positions in 2D has to be recomputed. The latter calculation can be performed efficiently without slowing down the curve evolution in step 120 of FIG. 1 significantly.

Figure 6:
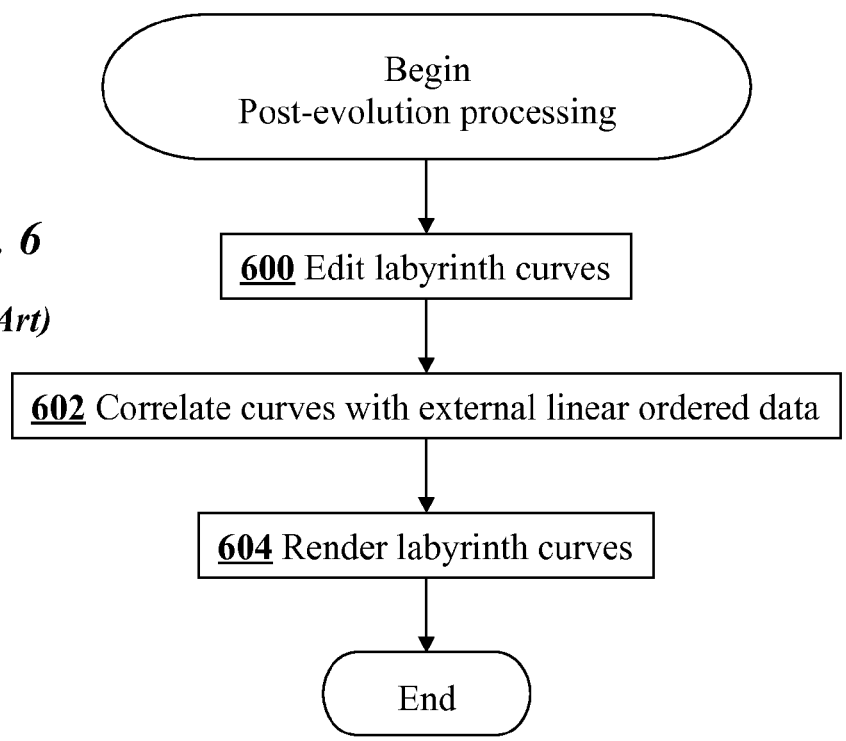
FIG. 6 is a flow chart illustrating steps of a post-evolution process, according to an embodiment of the present invention.
Figure 7:
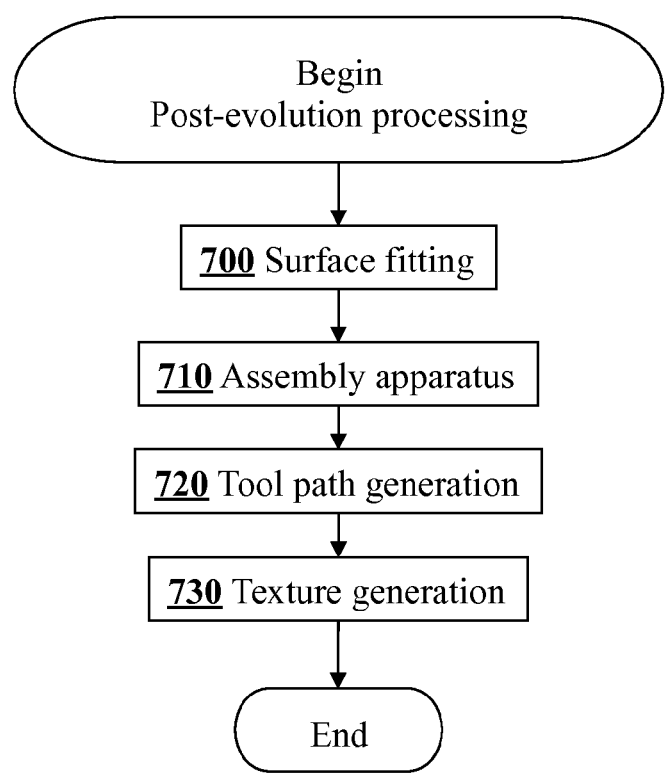
FIG. 7 is a flow chart illustrating steps of an alternate post-evolution process, according to an embodiment of the present invention.
Figure 42:
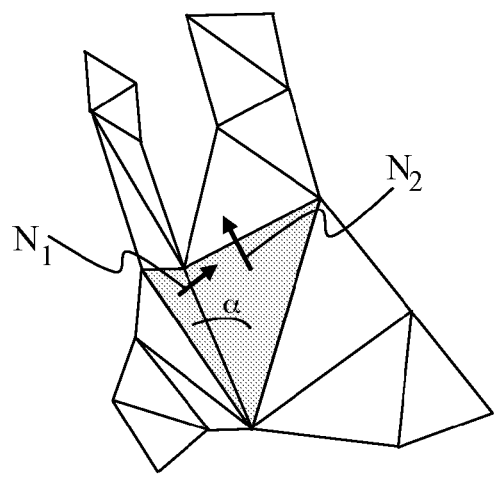
FIG. 42 is a diagram illustrating a case of two polygons with different normal vectors at a junction where four developable surface branches meet.

This concludes the presentation of the modified curve evolution technique in step 100-120. Once the output curves, loop tessellations in 3D, and unfolded loop tessellations in 2D are found to be acceptable during step 120 in FIG. 1, the first design cycle terminates and the apparatus moves on to step 130, post-evolution processing. FIGS. 6 and 7 show two different embodiments of step 130. FIG. 6 is based upon a corresponding figure in US PG Publication No. 20080297514 where it is described. FIG. 7 shows the steps used to enable assembly of the developable surface strips manufactured from the unfolded loop tessellations. First, in step 700, an alternative surface representation, such as quad-strips, i.e. tessellations consisting primarily of planar quadrilaterals, or a higher order approximation, such as cone splines, may be fitted to the unfolded loop tessellation. Unfolded loop tessellations containing non-planar polygons, incident polygons with a sharp angle between the normal vectors, or 4 or more branches meeting a common joint (see FIG. 42), must be processed since such artifacts are not suited for manufacturing in real-world materials that have a stiffness to them. As an alternative to fitting a new surface, the positions of the loop points in 3D may be perturbed using an optimization to obtain a surface better suited for manufacturing. Optimization and fitting of developable surfaces has been studied extensively due to the importance of the problem in the manufacturing of sheet metal. The preferred embodiment depends on the type of material. For manufacturing in relatively thin, easily bendable materials, such as paper, it is often possible to skip step 700 and use the unfolded loop tessellations directly in the manufacturing. US PG Publication No. 20080297514 presents a simple refinement technique that processes the loop tessellations in 3D to make them better suited for manufacturing.

Figure 16:
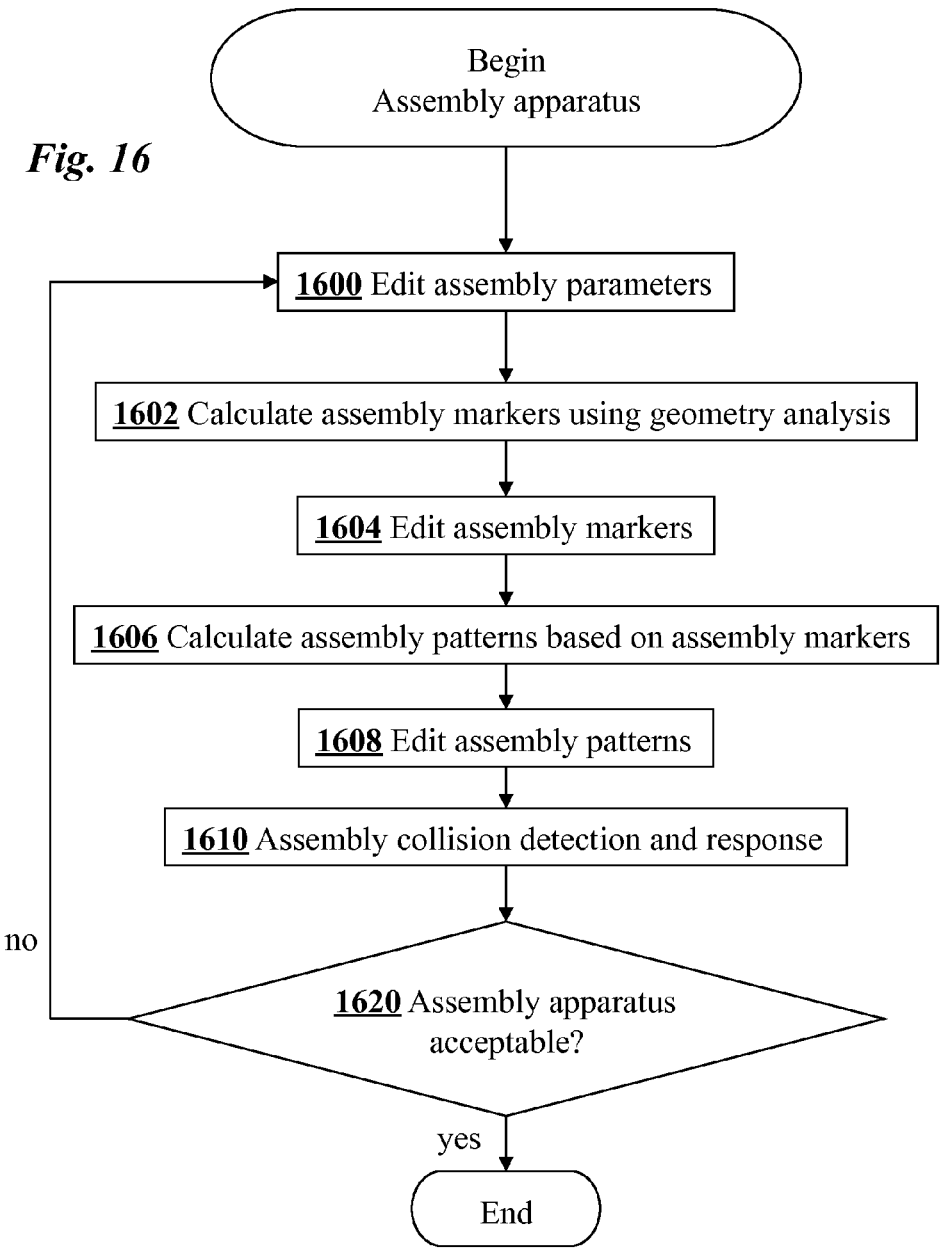
FIG. 16 is a flow chart illustrating steps of a method for modifying developable surface strips, adding interlocking pieces of geometry to their boundaries and thereby allowing the strips to be assembled, according to an embodiment of the present invention.

Step 710 in FIG. 7, "assembly apparatus", is shown in more detail in FIG. 16. The developable surfaces produced thus far comprise a set of unfolded strips, usually with a characteristic branching pattern, that, when put together at the seams, become a 3D model. For the assembly to be feasible, however, a mechanism for joining the strips easily, accurately, and robustly is required. Glue and other adhesives are costly and tedious to use. Instead, a preferred embodiment relies entirely on natural forces, in particular friction, mechanical forces acting tangentially and/or orthogonally to the strip boundaries to cancel each other out, and the strength of the material(s) employed. By design, the branching strips generated by the curve evolution have long, interlocking boundaries. In comparison with other type of developable surfaces used in traditional manufacturing, the number of developable strips is optimized to be as low as possible. The assembly techniques, which will be described in the following, are specifically targeted for adding strength to developable surfaces with these properties. Step 1600-1620 comprise an iterative loop where steps 1600 to 1610 are repeated until the assembly apparatus is completed. First, the various parameters used in the subsequent steps are initialized in step 1600. Next, in step 1602, assembly markers are created along the boundaries. The markers can be edited by the user in step 1604. In step 1606, each resulting boundary curve segment is then analyzed and a pattern comprising a set of assembly devices is calculated. The assembly markers serve to guide and constrain the locations where the assembly devices, which in a preferred embodiment comprise matching pairs of interlocking pieces of geometry, are located. There are several different types of assembly markers, all placed along loop boundaries:

1. Joint markers. These are placed at curve intersections where two or more loops meet at a sharp angle.
2. Feature markers. Placed at positions of 1) high principal surface curvature, 2) high geodesic/normal curvature along a loop boundary, or 3) abrupt changes, such as creases or corners, in the original evolution surface. The feature markers may be ordered in a hierarchy.
3. Loop separator markers. Placed where a single loop is split into multiple loop pieces as explained earlier. The markers are placed at the midpoint of each loop separator.
4. External attachment markers. Placed where an external device is to be connected, for example if the assembled 3D model is to be suspended in a wire.

Figure 43:
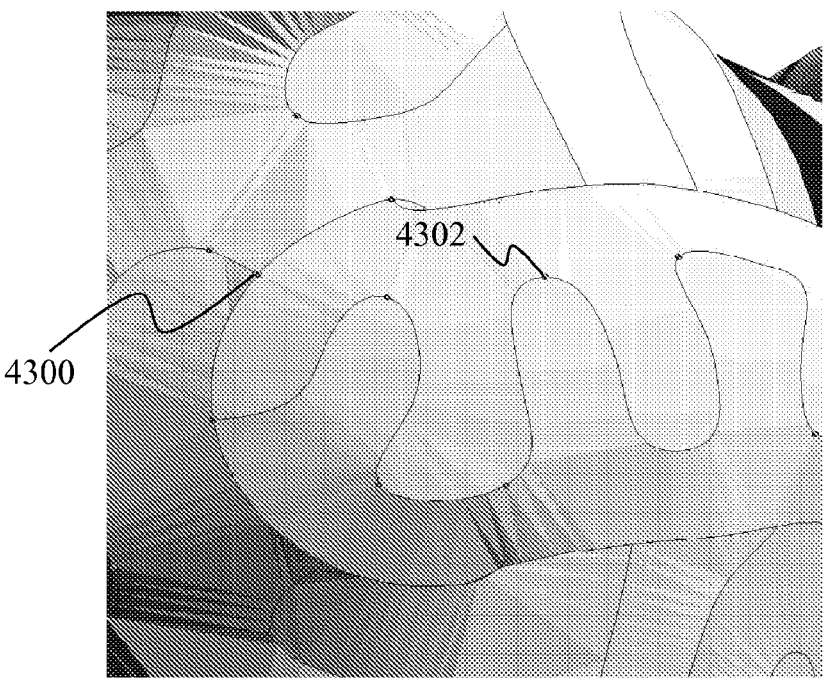
FIG. 43 is a diagram illustrating different types of assembly markers along the boundaries of several loops in 3D, according to an embodiment of the present invention.
Figure 44:
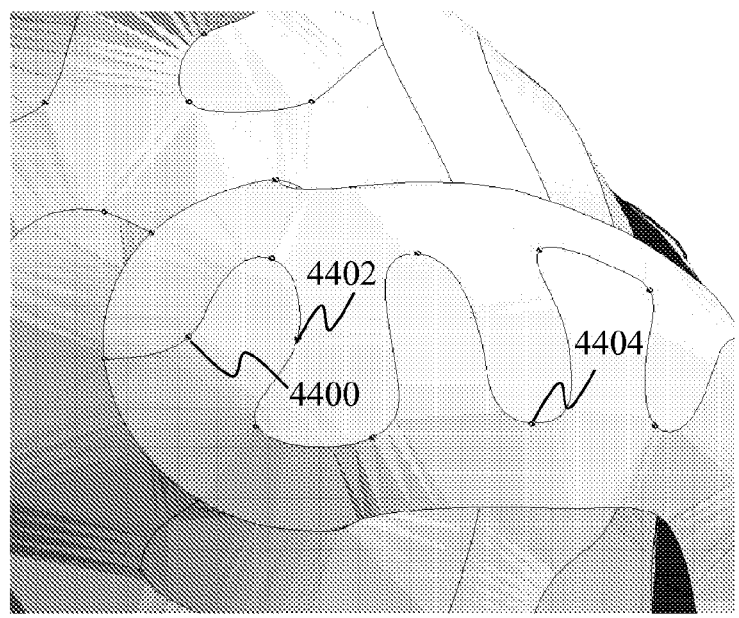
FIG. 44 is a diagram illustrating additional assembly feature markers inserted along the loop boundaries shown in FIG. 43, according to an embodiment of the present invention.
Figure 45:
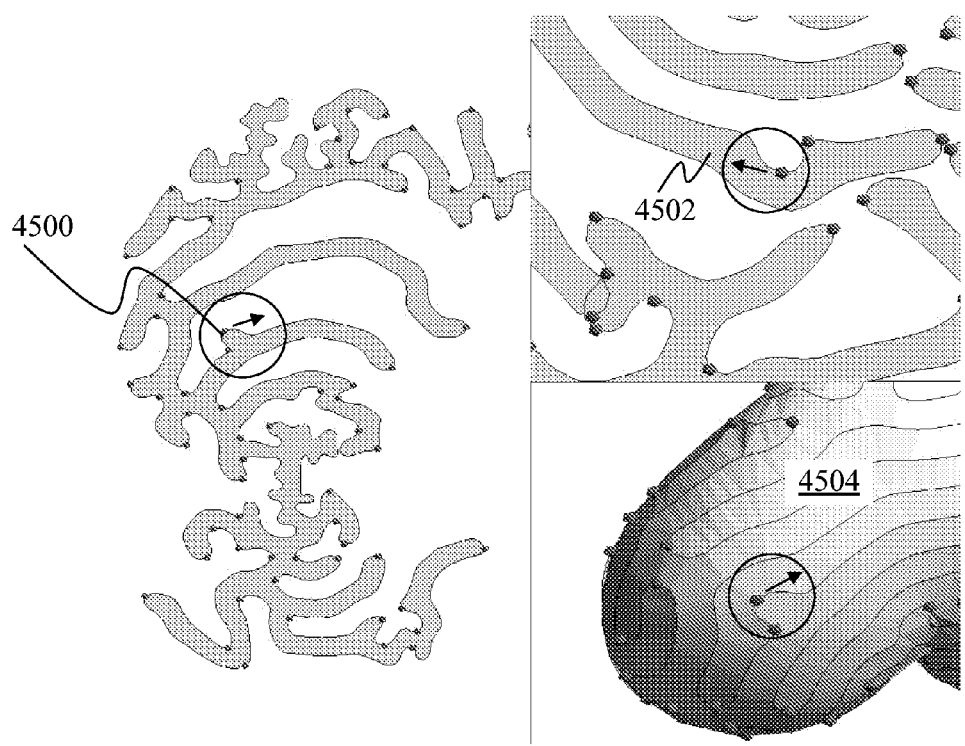
FIG. 45 is a diagram illustrating a user interface for editing assembly markers, according to an embodiment of the present invention.

FIG. 43 shows part of a 3D model comprised of developable surface strips. Joint markers, e.g., 4300, and feature markers, e.g., 4302, are indicated. To calculate the feature markers, the principal curvature of the strips and the geodesic curvature of their boundaries are estimated everywhere. This data is sorted and used to calculate the positions of the assembly markers which divide the boundary of each strip into shorter curves. Since developable surfaces always have a 0 Gaussian curvature everywhere, i.e. at least one of the two principal curvatures is 0, the system uses the mean curvature (i.e. the average of the two principal curvatures) when calculating optimal assembly marker positions. Specifically, the following functional is optimized:

$$a_1 \left( \delta \frac{k_1 + k_2}{2} \right)^2 + a_2 (\delta \cdot k_g)^2 + a_3 (\delta \cdot k_N)^2$$

where $\delta$ is the scalar scale function over the evolution space (explained in US PG Publication No. 20080297514), $k_1$ and $k_2$ are the principal curvatures of the developable surface, $k_g$ is the geodesic curvature along the loop boundary, and $k_N$ is the normal curvature along the loop boundary. The coefficients $a_1$, $a_2$, $a_3$ are constants that are set by the user. The calculation of feature markers is hierarchical and breaks the boundaries into a level-of-detail hierarchy where the lengths of the boundary curve segments get progressively smaller. FIG. 44 shows additional feature markers 4400, 4402, 4404 corresponding to the next level of detail relative to the feature markers in FIG. 43. A preferred embodiment provides a user interface allowing interactive editing of the aforementioned types of assembly markers. FIG. 45 shows how multiple windows allow the user to see the effect of dragging a marker along a unfolded loop boundary 4500 on the adjacent unfolded loop 4502 as well as the surface 4504. The user can interact with any of these views and follow the changes in real-time in the other views. The camera is automatically oriented and framed to show a region around the moving marker in each view. For the 3D view, the camera is oriented orthogonal to the local surface normal at the marker position.

Once the assembly markers are in place, they divide each loop boundary into a hierarchy of curve segments. Each segment, starting with the coarsest level in the hierarchy, is analyzed to determine which pattern matches the geometry of the curve best. The analysis is performed by a subsystem, the pattern generator, which takes a boundary curve segment with corresponding assembly markers as input and selects an appropriate strategy for generating a pattern of assembly devices. It is important to note that the assembly devices are not generated by optimizing a single objective function, but rather result from a higher level, multi-resolution analysis of the loop boundaries. The selected strategy determines the type, shape, and position of the assembly devices along the curve segment. Pattern generators may produce any types of assembly devices that allow for locking the developable surface together. In the special case where the boundary segment contains 0 or 1 assembly marker(s), the boundary segment is cyclic and spans the entire loop boundary. The choice of assembly devices for a pattern depends on several factors, including:

Material properties, such as stiffness, flexibility, and strength.

Appearance, such as color, reflectance, and texture.

Perceptual criteria for artifacts related to the assembly, such as gaps between the developable strips and capture of important geometric features (blends, darts, creases).

Figure 46:
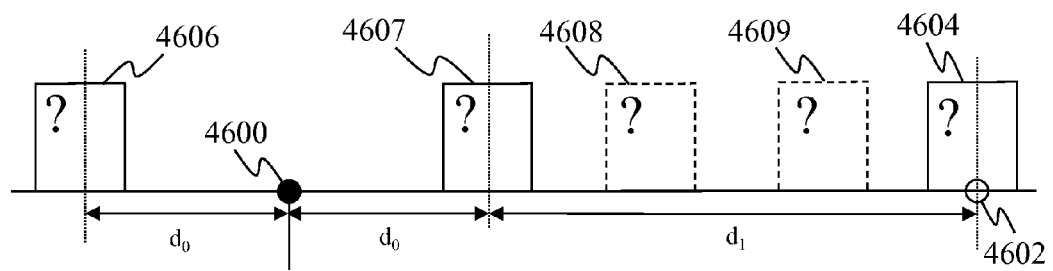
FIG. 46 is diagram illustrating the placement of assembly devices at different types of assembly markers, according to an embodiment of the present invention.

A pattern generator starts by generating assembly devices corresponding to assembly markers along the input boundary segment. FIG. 46 shows a boundary segment defined between an assembly joint marker 4600 and an assembly feature marker 4602. The pattern generator calculates the position of an assembly device at the location of each feature marker along the segment. In this case, only one feature marker is present. A corresponding assembly device will be created at this location 4604, but the type of the device is yet to be determined, indicated by question marks in FIG. 46. For assembly joint markers 4600, it is preferable to create assembly devices 4606, 4607 at a distance $d_0$ from the joint on each incident boundary segment. In a special case, $d_0$ may be 0 for more complex joint markers dedicated to holding together N different loops (not shown). For boundary segments divided into a hierarchy of smaller curve segments, assembly devices are generated at each marker in the hierarchy. After assembly devices have been generated for all markers, the pattern generator moves on to creating assembly devices along the curve segments between the markers 4608, 4609.

Figure 47:
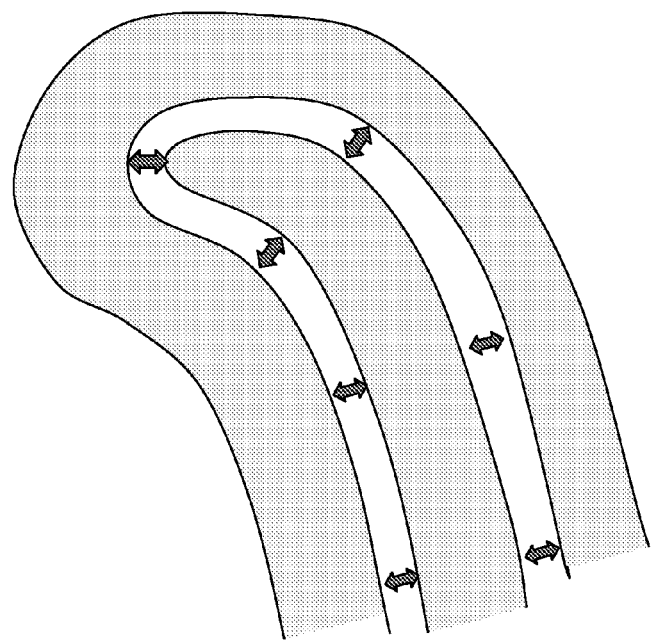
FIG. 47 is a diagram illustrating multiple locations in 3D where pairs of assembly devices will bind two developable surface strips together, according to an embodiment of the present invention.

The pattern generator is responsible for choosing the types of the assembly devices created at each assembly marker. FIG. 47 shows a part of two developable strips sharing a boundary. The mechanism for holding the strips together consists of pairs of interlocking assembly devices. Here, the locations of the assembly devices have been calculated but the types still remain to be chosen.

Figures 48A, 48B:
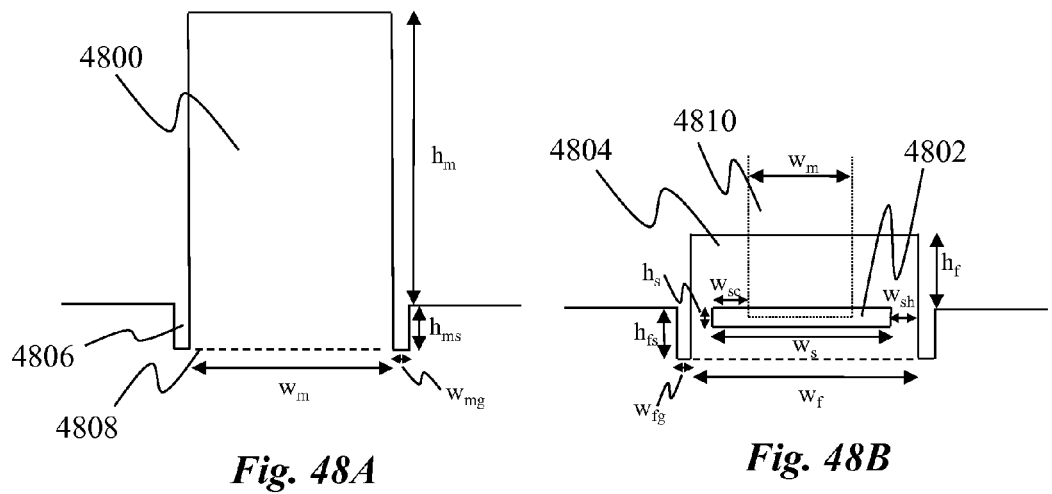
FIG. 48A-B are diagrams illustrating preferred male and female assembly devices, according to an embodiment of the present invention.
Figure 49:
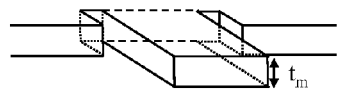
FIG. 49 is a diagram illustrating a 3D view of the male attachment device shown in FIG. 48A, according to an embodiment of the present invention.
Figures 50A, 50B:
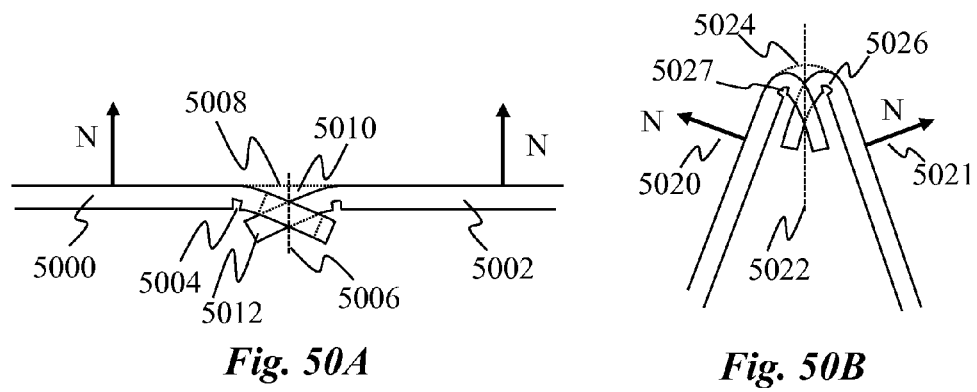
FIG. 50A-B are diagrams illustrating a side view of the attachment devices in FIG. 48A-B after assembly, according to an embodiment of the present invention.

FIG. 48A-B show a preferred pair of matching assembly devices. FIG. 48A shows a male device comprising a tab 4800 that fits into a slit 4802 in the matching female device 4804. FIG. 49 shows a 3D view of the male device in FIG. 48A. The material thickness for the device $t_m$ is the thickness of the material sheet that the unfolded loop resides in. Since the two unfolded loops, which the two devices are to connect together, may belong to different material sheets, the thicknesses of the male and female devices will generally be different. FIG. 50A shows a side view of the two assembly devices locked together. Although the two strips 5000, 5002 are coplanar, the assembled part will not be completely flat. As the figure shows, a triangular cavity 5010 compared to the theoretical surface 5008 is present at the seam 5006. Note that the protruding parts, e.g., 5012, of the two devices, which both are bent at a score line 5004 for increased accuracy, are hidden on the interior of the surface so they are out of view. Further, as shown in the top view in FIG. 51A, there will be a gap 5100 between the two developable strips due to material thickness unless care is taken in the design of the assembly devices. FIGS. 48A and 48B show a number of parameters that specify the detailed shape. Of particular importance are the small cuts 4806 and the score line 4808 at the base of both devices. The cuts allow the two devices to bend in a narrow region around the seam. The lengths of the cuts depend on material thickness and stiffness. The score lines specify areas where the material is weakened rather than cut completely, either by cutting partly through it or by punching tiny holes along the score line. They serve to guide the bending of the assembly devices so the placement and shape of the bends are as accurate as possible. Note in FIG. 51B that there are still artifacts where the male and female devices join, primarily due to the cuts 5104, 5106 which should therefore be as short as the material allows. But the strip boundaries now line up accurately along seam 5102 with a smaller impact on visual appeal. FIG. 50B shows an example where the angle between the local surface normal vectors 5020, 5021 along the two strips varies substantially compared to FIG. 50A. A cavity 5024 at the seam 5022 will be present due to the non-zero thickness of the material. The artifacts due to is reduced by setting the width and depth of the cuts at the score lines 5026, 5027 appropriate without weakening the material so much that the tabs may break off. The figure shows how the tab and slit in FIGS. 48A and 48B still allow the strips to be joined.

However, the cuts 4806 should be longer and the score lines 4808 deeper in this case. The parameterization of the material devices thus depends on both material properties, such as thickness, and the angle between adjacent strips. The system provides a table of default values determined empirically for different combinations of angle and material thickness. It allows the user to override the values depending on the specific material(s) used in the assembly. Other important parameters in FIG. 48A-B and FIG. 49 are as follows:

$h_s$: the height of the slit. This must be greater than the material thickness $t_m$ of the loop that the male device belongs to for the two devices to fit together. However, since the 3D model is held together in part by static friction between the male and female devices, $h_s$ and $t_m$ must match within a narrow tolerance. For some materials, such as paper, the preferred tolerance can be as low as 0.1 mm or less.

$w_{sh}$: the slit hinge width for the female device. If this is too small, the hinge may break during manufacturing or assembly and make the devices useless.

$w_{sc}$: the horizontal slit clearance. The slit width $w_s$ should be marginally greater than the tab width $w_m$ to make the assembly of the devices easy. An excessive slit clearance may lead to an inaccurate assembly, however, which will result in misaligned geometry and textures.

$w_f$: the width of the female tab.

$w_{fg}$: the width of the cut on each side of the female tab.

$w_{mg}$: the width of the cut on each side of the male tab.

$h_f$: the length of the female tab measured from the strip border.

$h_{fs}$: the length of the female tab measured from the bottom of the cut on each side of the tap to the strip border. $h_f + h_{fs}$ is the total length of the female tab.

$h_m$: the length of the male tab measured from the strip border.

$h_{ms}$: the length of the male tab measured from the bottom of the cut on each side of the tap to the strip border. $h_m + h_{ms}$ is the total length of the female tab.

FIG. 52 shows an alternative assembly device that may be employed to join developable strips. Its shape allows it to hook up with an identical mirror copy along the opposite strip boundary (noting that the slit height may vary if the two material thicknesses are different). Parameters shown in the figure are defined as follows:

$h_t$: the length of the part of the device that lies above the horizontal slit.

$h_b$: the length of the part of the device that lies below the horizontal slit.

$w_1$: half the width of the tab.

FIGS. 53A-B and 54A-B outline examples of generalized tabs and slits based on those in FIG. 48A-B. In both cases, two slits add strength to the locking mechanism at the expense of a more complex assembly. Such assembly devices may be used sparingly in locations where extra strength is required. Parameters shown in the figure are defined as follows:

$w_{m2}$: the width of the slit in the male tab.

$w_{f2}$: the width of the top part of the female tab. This is slightly smaller than $w_{m2}$ to allow sufficient clearance for the former to be inserted into the slit in the male tab.

$w_{s1}$: the width of the slit in the female tab. This is slightly larger than $w_m$ in order to allow enough clearance for the male tab to be inserted into the slit.

Figure 58:
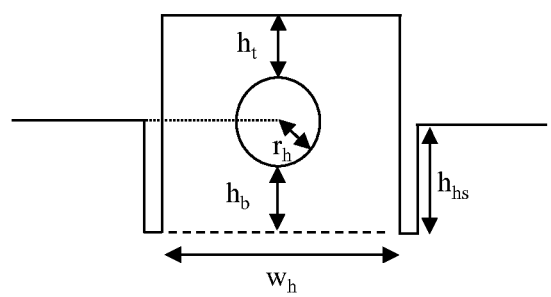
FIG. 58 is a diagram illustrating an alternative assembly device that matches a mirrored copy of itself, according to an embodiment of the present invention.
Figure 59:
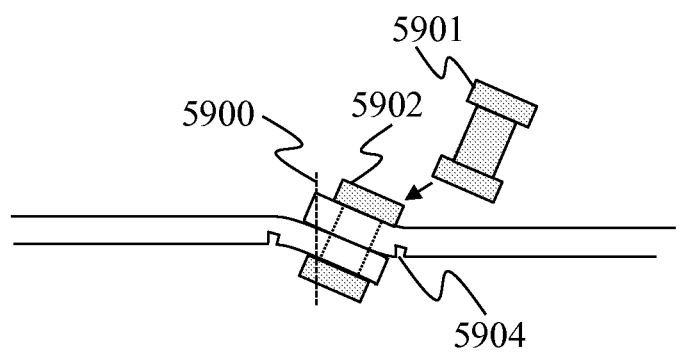
FIG. 59 is a diagram illustrating a side view of the assembly device shown in FIG. 58, according to an embodiment of the present invention.

FIGS. 55A-B show an alternative pair of matching assembly devices. Here, a hole is lined up so that the devices lock together when an external pin or bolt 5601 is inserted 5602. Two optional score lines 5500, 5510 may be present to help guide the bending of the material during the assembly. FIG. 56 shows a cross section view of the mechanism. The two score lines 5603, 5604 correspond to those shown in FIG. 55A 5500, 5510. Textures, which will be covered later, are calculated to line up at the visible seam 5600 between the two strips 5606, 5607. FIG. 57 shows a variation of the assembly devices in FIG. 55-56 designed for soft materials such as textiles or leather. Here, instead of using tab-shaped assembly devices, one or both strips are extended with a narrow band, e.g., 5700, that either can be sewn together or joined with an external pin-shaped device analogous to that shown in FIG. 56. While adhesives are not recommended with the other assembly devices mentioned so far, glue or cement may be used as an alternative to joining the devices shown in FIG. 57A-B. Velcro®, zippers, or similar existing mechanisms for joining textiles at a seam may also be used to bind the strips locally or globally. It is noted that the devices in FIGS. 57A and 57B may be used together or either type may be used with a mirrored copy on the other side of the boundary. FIG. 58 shows a final variation of an assembly device with an external pin and a hole. In this case, the device is mated with an identical device on the opposite boundary as shown in FIG. 59. The assembly devices are placed so that the indentation at the seam at the border of the upper strip 5900 is minimal. Optional score lines 5904 may be placed on each side of the external pin shown before 5901 and after 5902 inserting it into the slot.

As mentioned, it is the responsibility of the pattern generator to calculate not only where assembly devices should be added (see FIG. 47), but also which type assembly devices should be used at each location. Several considerations must be made in the choice of devices:

1. Maximum strength of the assembled 3D model.
2. Prevention of self-intersections, intersections due to the assembly devices overlapping with each other, with the developable strips, or with material sheet boundaries.
3. Optimal matching of developable strip boundaries to avoid gaps and misaligned textures.
4. Ease of assembly.

Figure 60:
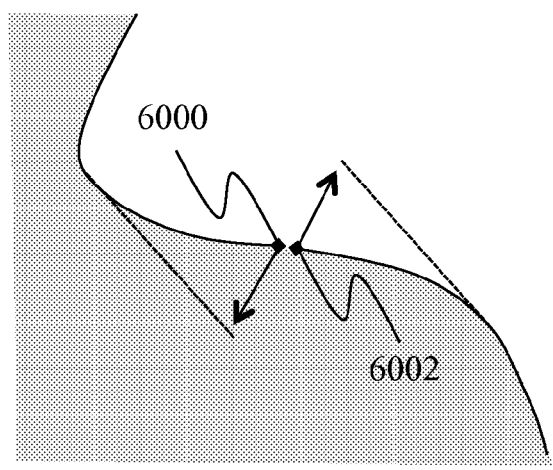
FIG. 60 is a diagram illustrating how developable surface strips in concave and convex surface regions will tend to move towards their planar rest shape unless the branches are restrained.
Figure 61A:
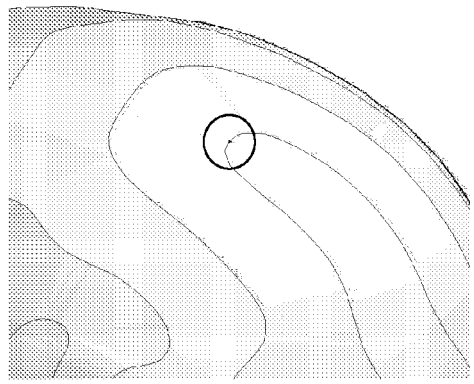
FIG. 61A-F are diagrams illustrating how the system decides on which side of a loop boundary to place male vs. female assembly devices based on curvature analysis, according to an embodiment of the present invention.
Figure 61B:
Figure 61C:
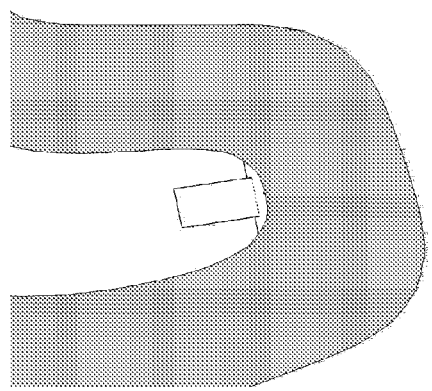
Figure 61D:
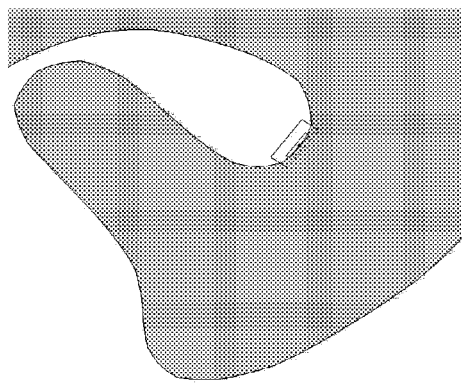
Figure 61E:
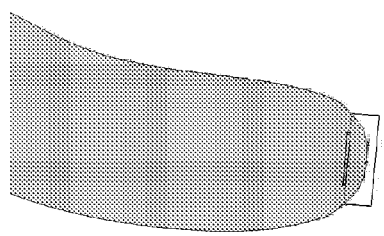
Figure 61F:
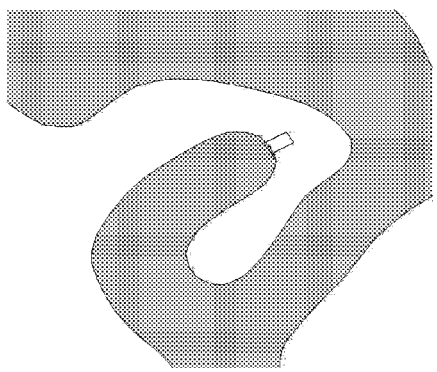

The strength of the resulting 3D model is optimized by analyzing the physical forces acting on the strips at each position along the boundary. In engineering mechanics, there is a large body of literature that deals with bending of structural elements based on their material properties. For simplicity, the following discussion will be limited to the case where the developable surface can be approximated by a thin, elastic plate which will return to its planar rest shape when any external forces acting on it are removed. It is thus not applicable to plastic materials or elements that have a non-negligible thickness. FIG. 60 shows a cross section of two developable surface strips 6000, 6002 meeting at a point. Due to the characteristic branching nature of the loop boundaries generate by the curve evolution, the bending moment of the element will, if the external forces that led to the bending are removed, result in a force at the tip of the strip towards the planar rest shape. If the strip geometry is concave, the tip of the strip will tend to move into the surface 6000. If the geometry is convex, the tip of the strip will move away from the surface 6002 unless it is held in place. FIG. 61A shows the tip of a strip in a convex surface region. FIG. 61B shows a corresponding 3D view of a concave strip. In each case, an assembly marker (circled) is located at the tip of the strip. The pattern generator analyzes curvatures associated with each feature marker and determines that, in this case, the most appropriate assembly device is the tab/slit pair shown in FIG. 48A-B. The preceding discussion on the different assembly devices explained the scenarios where each type is most appropriate. For the convex case in FIG. 61A, the pattern generator places a male device (FIG. 48A) along the opposite boundary of the tip of the branch as shown FIG. 61C. A matching female device (FIG. 48B) is assigned to the tip as shown in FIG. 61E. Since the tab is inserted into the slit towards the interior of the surface, it will lock the tip in place, exerting a force in the opposite direction (i.e., inward) than that due to the bending moment illustrated in FIG. 60. Conversely, FIG. 61D shows how a female device is selected for the marker opposite the branch tip in the concave case shown in FIG. 61B. Here, the matching male device on the tip of the branch (FIG. 61F) will be held in place by the slit, preventing the branch from moving inward.

Figure 62:
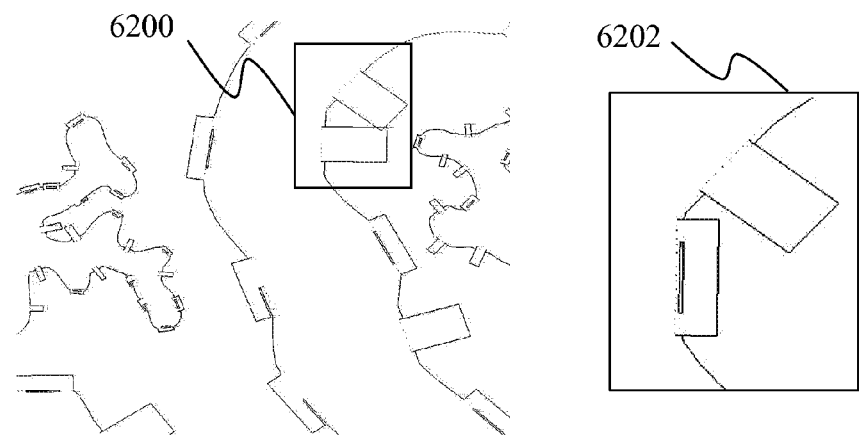
FIG. 62 is a diagram illustrating a loop boundary processed to include the contours of assembly devices as well as score lines, according to an embodiment of the present invention.
Figure 63:
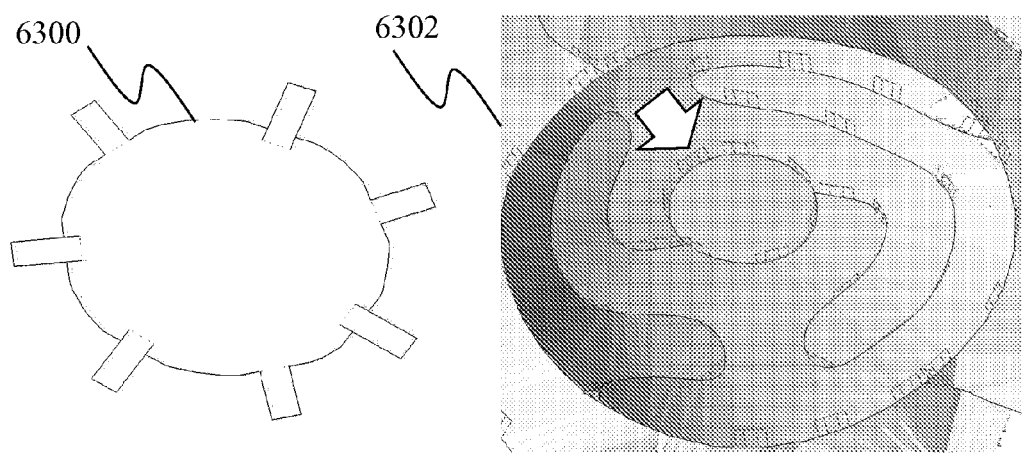
FIG. 63 is a diagram illustrating an unfolded loop with only male assembly devices and its placement on the corresponding 3D object, according to an embodiment of the present invention.

Once assembly devices have been generated for all the assembly markers, the pattern generator analyzes the curve segments between the markers and generates assembly devices along these. The devices are spaced based on the geodesic and normal curvatures along the strip boundaries such that the density of the devices is higher in regions of higher curvature(s). In particular, since both curvatures depend on the scale parameter, $\delta$, defined on the evolution space, the density of the devices will be higher in more detailed parts of the boundaries. For stiff materials, the default choice for the assembly devices is the pair shown in FIG. 48A-B. In regions of low curvature, alternative devices that can be assembled more quickly, such as the example shown in FIG. 52, may be utilized. Along boundaries where multiple male-female style assembly devices are created, such as those shown in FIG. 48A-B, a preferred embodiment alternates between the male and female devices along each boundary when possible. FIG. 62 shows parts of several unfolded loop boundaries, each with multiple assembly devices. Note that two tabs are intersecting 6200. The pattern generator can often eliminate such intersections by swapping the male and female devices 6202. FIG. 63 shows another unfolded loop boundary 6300 where all the assembly devices are of the male type. This may be preferable in areas of the surface that are obscured or otherwise difficult to reach. The loop corresponding to the unfolded loop on the left is shown on the right 6302. Note how the selection of the (male) assembly devices makes it easier to insert the manufactured piece at the end, after all the surrounding pieces have been put in place. This would have been more difficult if the loop boundary had contained female assembly devices like the one shown in FIG. 48B. The mechanical analysis for determining the optimal patterns of assembly devices can be far more elaborate. Standard techniques from finite element analysis can be used to calculate the 3D shape that will result from a given configuration of assembly devices attached to developable strips of various thickness and materials. In a simplified implementation, each pair of assembly devices can be modeled as a point-to-point constraint. A finite element solver can be used to determine the deformation of the developable strips that minimizes the bending energy subject to these constraints. More complex solvers can calculate sagging due to gravity. Given the ability to calculate the surface that will result from a given configuration of assembly devices, the final step necessary towards optimizing the assembly devices is a discrete optimization technique for selecting the types and positions of the devices. A simple error metric for this optimization is the width of the gap between adjacent strips, which ideally should be zero everywhere. This leads to an iterative process where patterns of assembly devices are chosen based on heuristics to minimize the error, such as inserting additional devices where the error exceeds a threshold. The chosen configuration of assembly device patterns is then formulated as constraints for the finite element solver, and the resulting deformation of the developable strips is passed to the next iteration.

Figure 64A:
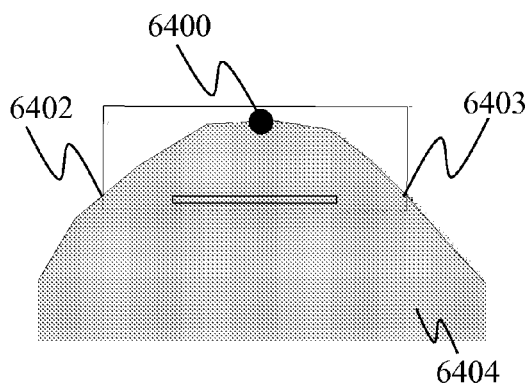
FIG. 64A-D are diagrams illustrating how to create tool paths from loop boundaries in 2D, according to an embodiment of the present invention.
Figure 64B:
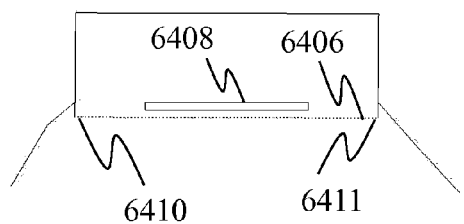
Figure 64C:
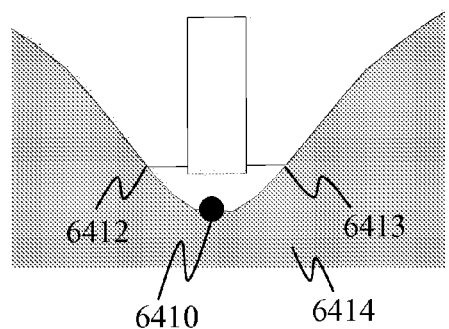
Figure 64D:
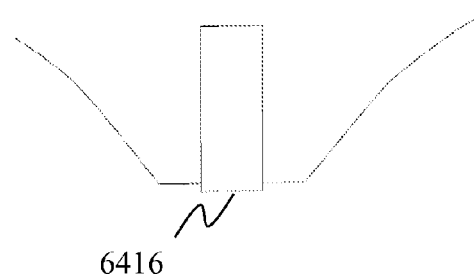
Figure 65:
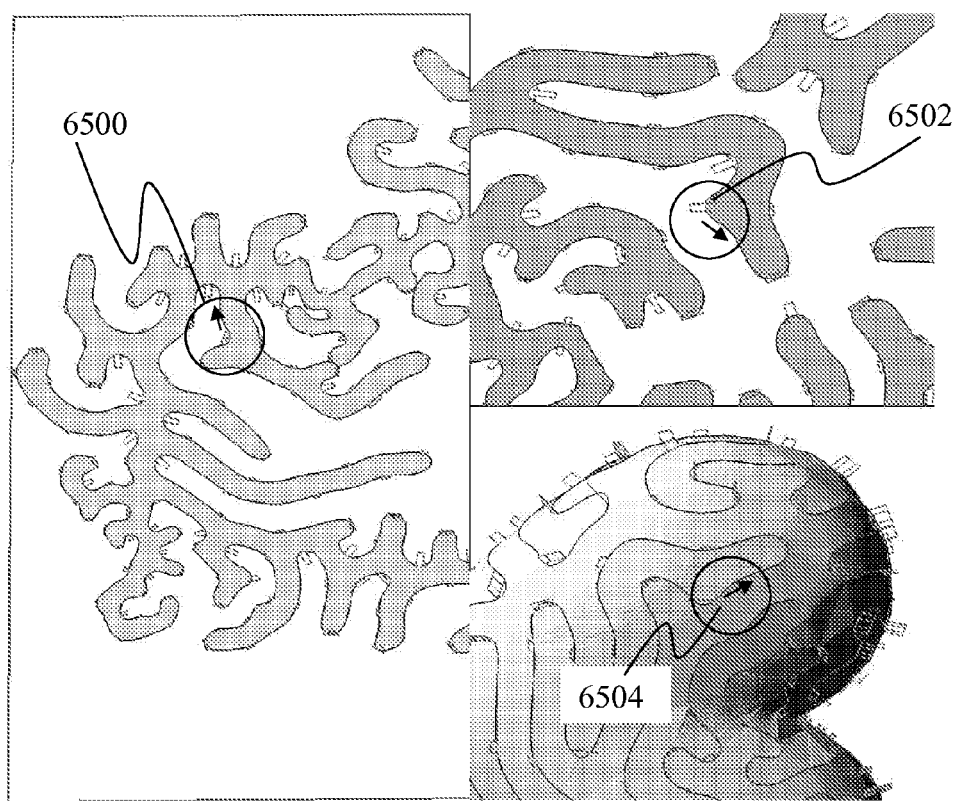
FIG. 65 is a diagram illustrating a user interface for editing assembly devices in 2D and in 3D, according to an embodiment of the present invention.
Figure 66:
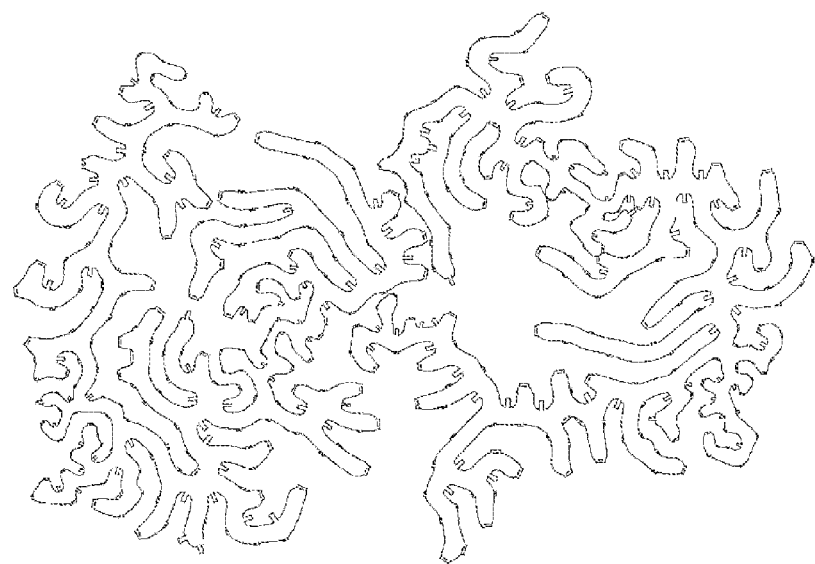
FIG. 66 is a diagram illustrating cutting tool paths corresponding to two loops placed in the same material sheet, according to an embodiment of the present invention.
Figure 67:
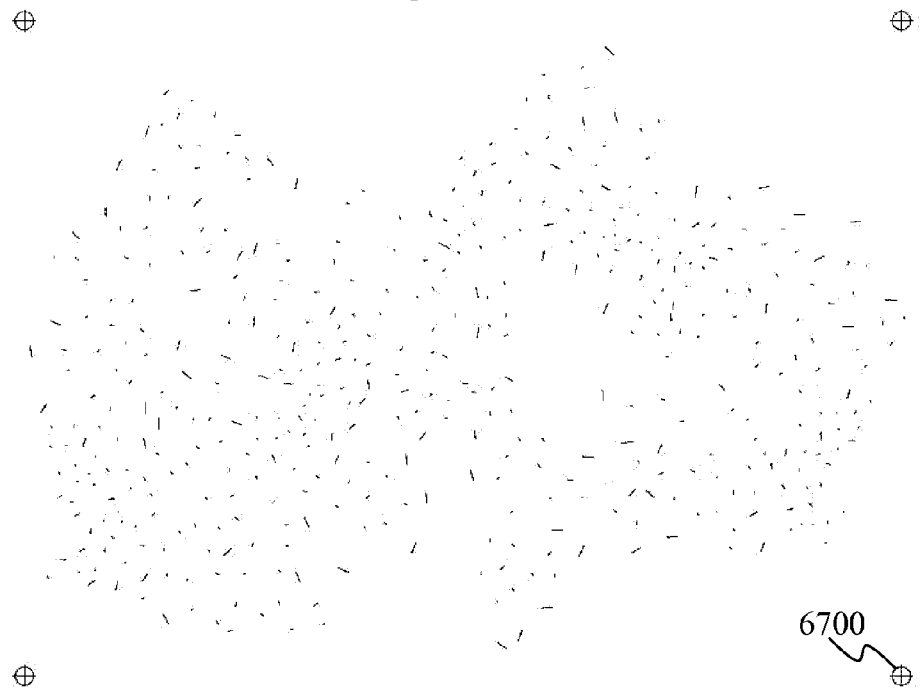
FIG. 67 is a diagram illustrating scoring tool paths and registration marks corresponding to the two loops shown in FIG. 66, according to an embodiment of the present invention.

When all assembly devices have been created by the pattern generator, step 720 in FIG. 7 generates tool paths for the unfolded loop boundaries, score lines, slits, holes etc. that are required to manufacture the physical parts. In order to minimize machine time during the manufacturing, a preferred embodiment calculates a closed curve for each loop boundary and outputs the line segments in the order they appear in the resulting curve. FIG. 64 illustrates the process of calculating adjusted unfolded loop boundaries that include assembly devices. The input consists of assembly device locations represented as sample points on the loop boundaries, the type of the assembly device (male, female, . . . ), and all parameters necessary to specify the shape. The geometry of the device is scaled using the curve evolution scale parameter, $\delta(p_i)$, defined in US PG Publication No. 20080297514. The effect of the scale parameter can be seen in FIG. 62. Note the varying strip width and the variable scaling of the assembly devices along the boundary. Assembly device parameters that depend on material thickness, such as tab and slit height and clearance, should not be scaled since material thickness is constant across each material sheet. In a preferred embodiment, the system takes the assembly device position 6400 and calculates two sample points 6402, 6403 by moving a distance d along the boundary of the unfolded loop 6404 in both directions. FIG. 64A shows the calculation of the two offset points for a convex loop region. The resulting boundary segment is shown in FIG. 64B. Note that part of the original boundary curve was removed in the process. Line segments representing a score line 6406, a slit 6408, and two cuts 6410, 6411 are generated as well. FIGS. 64C and 64D show the analogous boundary creation for an assembly device located on a concave section of the unfolded loop boundary. In FIG. 64C, the points 6412, 6413 along the boundary of the unfolded loop 6414 correspond to the offset points in FIG. 64A 6402, 6403. In FIG. 64D, the tab 6416 corresponding to the slit 6408 in FIG. 64B is shown. Just like the system supports interactive editing of assembly markers as shown in FIG. 45, step 1608 in FIG. 16 provides a UI for adding, deleting, moving, and changing type and/or parameters of one or more assembly devices. FIG. 65 shows how the UI allows the user to see how editing an assembly device on a loop in 2D or 3D affects all other loops. When the device is dragged along the boundary of one unfolded loop in the direction of arrow 6500 in the left view, the other views show the corresponding 2d motion of the matching assembly device in the opposite loop 6502 and the 3d motion of the pair of assembly devices along the boundary of the two loops 6504. This is particular important because moving or reshaping an assembly device on one loop inadvertently may cause the matching device to intersect other geometry on the material sheet that the incident unfolded loop belongs to. Likewise, assembly devices may intersect the material sheet boundaries unless care is taken. In step 1610 of FIG. 16, any such collisions are detected and resolved by adding, deleting or modifying assembly markers and/or assembly devices as necessary. In a preferred embodiment, the system performs as much of this process as possible by making the pattern generators responsible for generating collision free patterns of assembly devices. There are cases, however, where it is not possible to create assembly devices that add sufficient support and strength to the 3D model without introducing collisions. The user interface allows one or more devices to be selected and have their parameters overridden from the global default values. FIG. 66 shows the final tool path output by the system for cutting the material. FIG. 67 shows the corresponding tool path for score lines where the material only is partly cut through. The cutting and score lines are output in separate layers in the output file since they require different machine settings during the manufacturing. Tool paths for etching or engraving decorative artwork can be saved in a third layer. Registration marks, e.g., 6700, are output in a fourth layer. These allow for registration of any textures on the material sheets. As will be explained in the section on generating textures, matching registration marks are added to the texture data in the same locations. In a preferred embodiment, the score lines (FIG. 67) and decorative artwork are applied prior to the cutting lines (FIG. 66) during the manufacturing since the cutting is more likely to cause the material to shift unintentionally.

For 3D models that have geometric features such as sharp edges, creases, darts, or corners, it is possible to use border curves, i.e., curves where all sample points are constrained, as described in US PG Publication No. 20080297514, to align the developable strip boundaries with the features. In many cases, however, this approach is too restrictive. For a cube, for example, every strip would have to be constrained to one of the six faces of the cube and all loops would thus be planar. Further, aligning the strip boundaries with all 12 edges would lead to many straight lines among the loop boundaries, reducing the organic appearance that is a key feature of our approach. Our goal is to cover surfaces with as few, visually appealing strips as possible. In order to accomplish this, the strips will be allowed to flow across geometric features.

FIG. 94A shows a single strip whose portions 9400, 9410, 9420 span three faces of a cube. FIG. 94B shows the same strip unfolded into the plane 9430, 9440, 9450. The two dashed lines 9460, 9462 mark where the strip crossed a feature boundary, i.e., the edges of the cube. During the manufacturing of the physical 2D strips, score lines will be generated along these lines 9460, 9462 by cutting away material or pre-bending the strip in order to allow the strip to be bent at exactly the right position and angle. These score lines are output to the same tool path that was used to describe bends for assembly devices as shown in FIG. 67.

Figure 2:
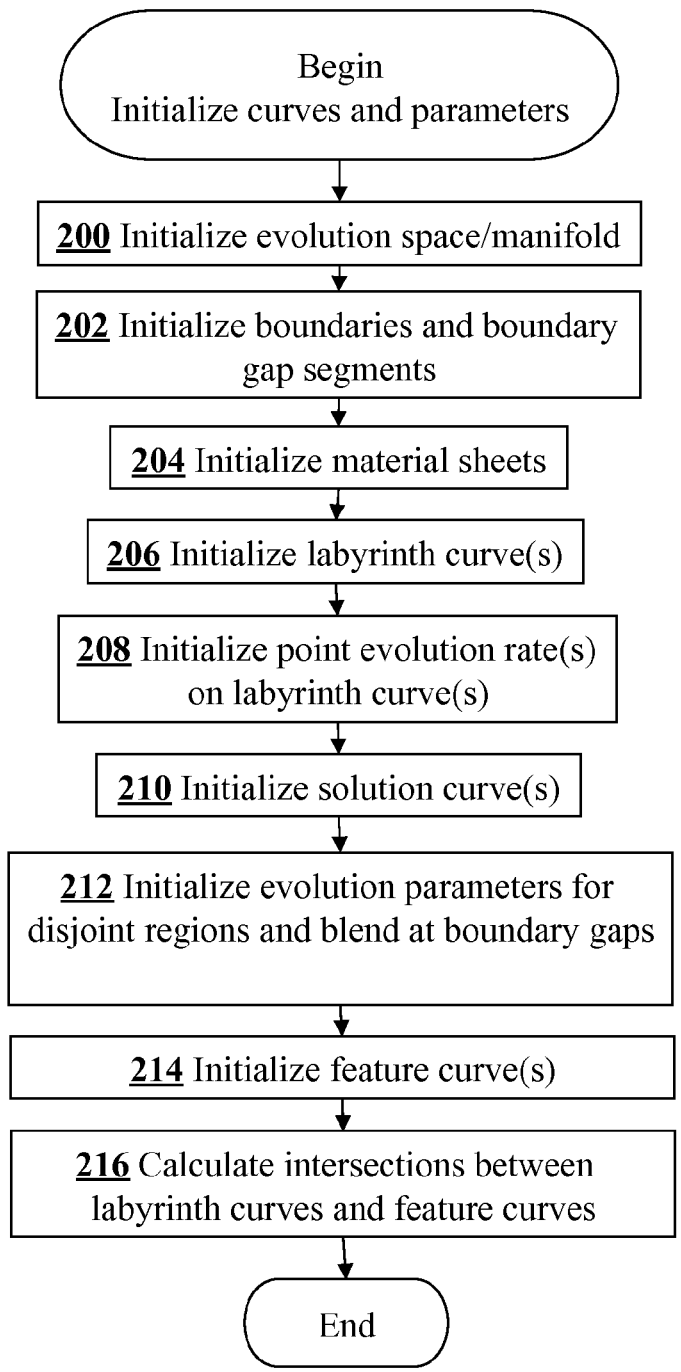
FIG. 2 is a flow chart illustrating steps of a curve and parameter initialization routine, according to an embodiment of the present invention.

The first step of this technique is to create a set of feature curves on the evolution surface as shown in step 214 of FIG. 2. These curves can be generated automatically using feature detection or specified by the user with curve editing tools. The process is analogous to the specification of boundary and other types of curves in US PG Publication No. 20080297514, illustrated as step 202, 206, and 210 in FIG. 2. FIG. 95A shows a side view of a point sampled curve across an edge of a cube. The curve fails to sample the edge of the curve at 9500. As a result, the strips will not represent the shape of the 90 degree corner correctly when assembled. It is necessary to insert an additional sample point 9510 for each feature curve crossing as shown in FIG. 95B. Conceptually, the change to the approach is simple. For each pair of sample points along a labyrinth curve where the connecting line segment crosses one or more feature curves, new sample points are inserted at intersections between the connecting line segment and each feature curve. This is shown as step 216 in FIG. 2. In a preferred embodiment, the calculation of the labyrinth curve line segments that cross a feature boundary is done efficiently. First, a quick test is required to estimate whether each labyrinth curve line segment intersects one or more feature curves as shown in step 224 in FIG. 100. Since the number of labyrinth curve line segments can be large, the estimation generally requires pre-computed data structures to be feasible. Step 220 checks if these data structures have already been computed. If not, they are calculated in step 222. Without loss of generality, it will be assumed that each feature curve corresponds to a vertex path on the evolution surface mesh:

1. the sample points along each feature curve coincide with vertices of the mesh and
2. each pair of sample points is connected by an edge of the evolution surface mesh.

Step 222 starts by creating a mapping between feature curve sample points and evolution mesh vertices and a mapping between feature curve segments and evolution mesh edges. At most one feature curve point can correspond to a mesh vertex and at most one feature curve segment can correspond to a mesh edge. FIG. 96 shows a feature curve comprising points $p_{N-6}$, $p_{N-5}$, . . . , $p_N$ coincident with mesh vertices. Two mesh regions are marked to the left and right of the curve. The region on the left corresponds to mesh points, such as $q_1$, 9600, for which the closest point on the feature curve is not an end point and the path between $q_1$ and its projection crosses a face that lies to the left of the feature curve. Likewise, the region on the right corresponds to points, such as $q_2$, 9610, that meet the same criteria from the opposite side. For points outside these regions, such as $q_3$, 9620, for which the closest point on the feature curve is an end point, no information about their position relative to the feature curve is known. The two regions can be pre-computed for each feature curve and the corresponding signs can be stored with the vertices and/or faces of the mesh. In practice, the regions form narrow bands around the feature curves since the separation between any two sample points on the labyrinth curves is bounded. The positive and negative distances within the regions can be calculated as the shortest geodesic distance from each vertex to the feature curve, which is feasible with known techniques from computational geometry. The calculation starts at the feature curve points and propagates outwards in both directions. Once the distance fields are available, the heuristic test whether the line segment between two sample points, such as $q_1$ and $q_2$, crosses a feature curve is to check whether the two points have opposite signs in the distance field for that feature curve. This heuristic may miss intersections or report intersections that do not actually exist, but it is computationally efficient and sufficient for our purposes.

Figure 97:
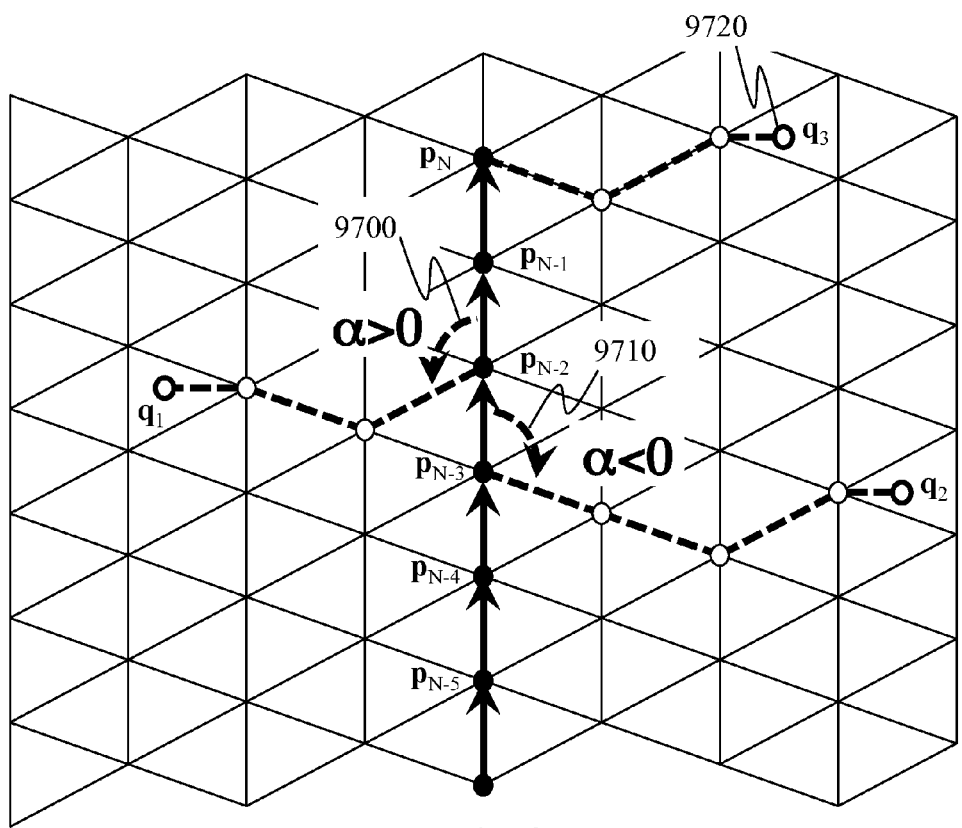
FIG. 97 illustrates a feature curve heuristic that can be combined with the one shown in FIG. 96, according to an embodiment of the invention.
Figure 98:
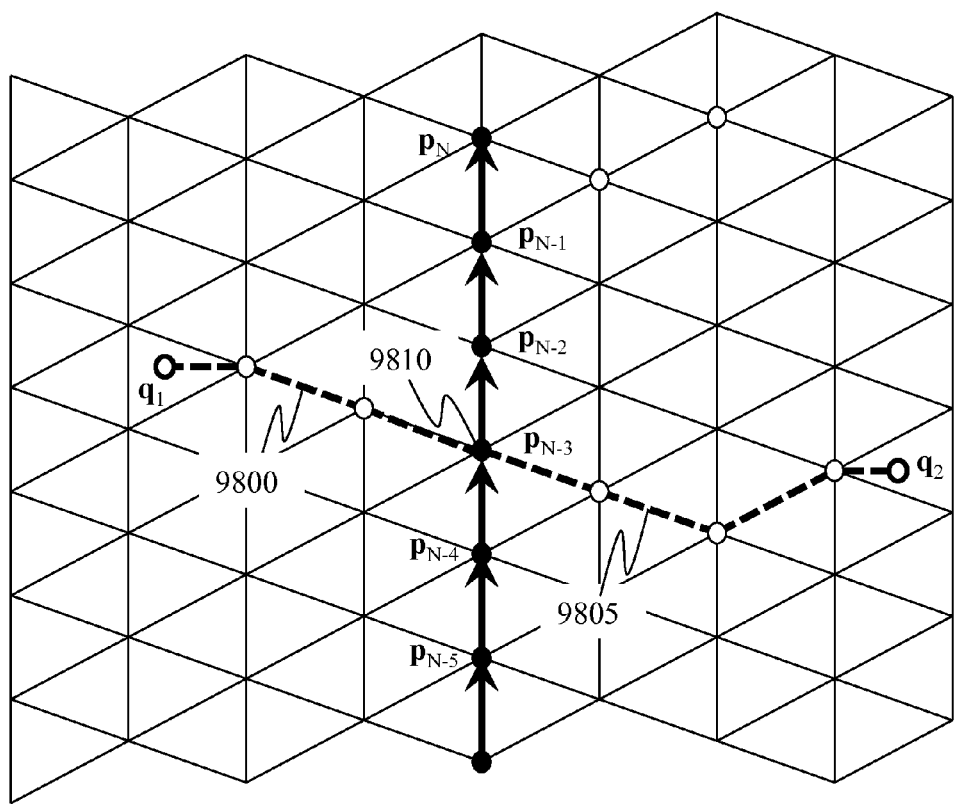
FIG. 98 shows the shortest vertex path between two points, according to an embodiment of the invention.

FIG. 97 illustrates a second heuristic that can be combined with the one shown in FIG. 96. Here, no pre-computed distance fields are required. Instead, the shortest discrete vertex paths from the two points $q_1$ and $q_2$ to the feature curve are calculated using a graph algorithm such as Euler's discrete shortest path. The sign for the two distances are estimated by considering the angle between the projected point and the last edge in the vertex path 9700 and 9710. For points, such as $q_3$ 9720, where the last point on the vertex path is an end point of the feature curve, the intersection tests fails. Analogous to the test described in the previous paragraph, the segment-feature curve intersection test heuristic succeeds if the distances for $q_1$ and $q_2$ have opposite signs. A third variation of this test is to calculate the shortest vertex path between $q_1$ and $q_2$ and check whether any point along this path lies on the feature curve. FIG. 98 shows the shortest vertex path 9800, 9805 between two points $q_1$ and $q_2$. Since this vertex path contains the vertex corresponding to feature curve point $p_{N-3}$ 9810, a potential intersection is reported. Any combination of heuristics such as those above can be used to guess whether labyrinth curve segments intersect feature curves. For example, all three heuristics can be applied and a potential intersection reported if any of the tests succeed.

Figure 100:
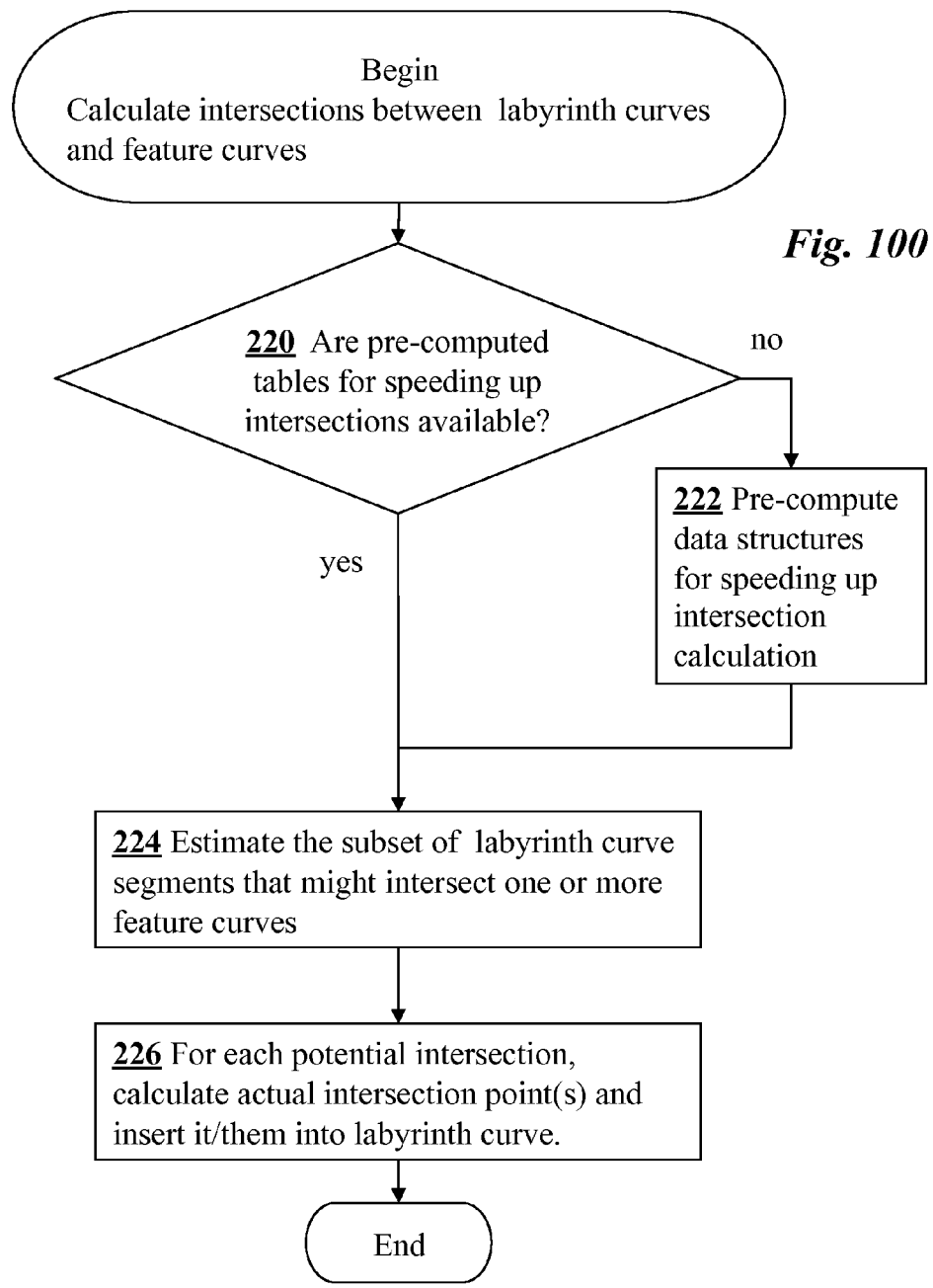
FIG. 100 is a flowchart showing steps in a technique for determining an actual intersection point between feature curves and curve segments, according to an embodiment of the invention.

If it is found that a labyrinth curve segment may intersect a feature curve, a more accurate algorithm is used in step 226 of FIG. 100 to determine the actual intersection point. FIG. 99A shows a common solution to this problem. Here, the line segment 9900 between the labyrinth curve points $q_1$ and $q_2$, positioned on adjacent sides of a cube seen in a cross section, was found to intersect a feature curve positioned at the edge 9910 between the two faces. FIG. 99B shows a 3D view of the same example seen from a different angle. A plane 9920 is fitted to $q_1$, $q_2$ and the evolution surface normals $N_1$, $N_2$ at the two points. The intersection between the plane and the evolution surface is calculated, resulting in a planar curve 9930, 9935 consisting of two straight line segments. By definition, the feature curve 9910 passes through vertices and edges of the evolution surface mesh. Since the planar curve also lies on the mesh, it is now easy to determine if the two curves intersect: an intersection exists if any feature curve edge is encountered along the planar section between $q_1$ and $q_2$. If not, the intersection test returns failure. If one or more intersections, in FIG. 99B shown as $q_{intersect}$, intersect, are found, all the intersection points are returned as the result. FIG. 99C shows an alternative way to calculate the intersection point(s). Here, $q_{min}$ 9600 is defined as the point on the feature curve 9910 that minimizes the sum of the distances $d_1 = |q_1 - q|$ 9950 and $d_2 = |q_2 - q|$ 9955 for points q along the curve. If multiple points minimize the functional, all such points are returned as the solution. In a preferred embodiment, the intersection point is calculated by an appropriate combination of heuristics such as these. If one heuristic fails, another can be attempted.

The flowchart in FIG. 100 shows the overall process of efficiently calculating all intersections between labyrinth and feature curves. The intersection points are inserted into the labyrinth curves by splitting the corresponding labyrinth curve segments. During the 3D loop tessellation, step 900 in FIG. 9, edges connecting matching pairs of feature curve intersection points (see FIG. 94, 9430) are used as constrained edges in the triangulation, i.e., these edges must be present in the resulting tessellation. The loop tessellation captures the shape of the geometric features represented by the feature curves better and the unfolded tessellation resulting from step 902 in FIG. 9 thus allows for more accurate assembly. The constrained edges in the unfolded tessellation are recorded and saved as a tool path or other information used to generate score lines, indentations, etc. during the manufacturing of the unfolded strips.

While running the system, the sample points along the labyrinth curves are constantly moving. Every time a sample point moves, it may cause feature curve intersections to be added, deleted, or moved. In a preferred embodiment, the system maintains a list of all current or potential intersections. Every operation that causes points to move on the evolution surface mesh results in the point moving along a path (usually planar) of adjacent faces by crossing mesh edges. As mentioned in the description of step 222 in FIG. 100, the system keeps a mapping between mesh edges and feature curve line segments. As a labyrinth sample point is moving across mesh edges, it is therefore trivial to determine if the move causes the point to cross a feature edge. If this is the case, the labyrinth curve segments incident to the curve are added to the list of potential intersections. After all points have moved, the list of potential intersections is traversed and intersection points added, deleted, and moved accordingly.

In a preferred embodiment, feature curve intersection points can be used in two different ways. In the first, the points only play an active role in the 3D loop tessellation and unfolding (steps 900 and 902 in FIG. 9). They are ignored in other steps in curve evolution, such as force calculations and subdivision. In the second approach, the intersection points are processed the same as all other labyrinth curve sample points. They attract and repel other points, for example, and are also affected by the various forces acting on other points, such as random motion and dampening. There are two differences, however: 1) The feature curve intersection points cannot be deleted during resampling of the labyrinth curves. 2) When moving feature points, for example during random motion or when applying attraction-repulsion forces, their motion is constrained to the feature curve that they lie on. Only the tangential component of the desired velocity vector has any effect.

Figure 94C:
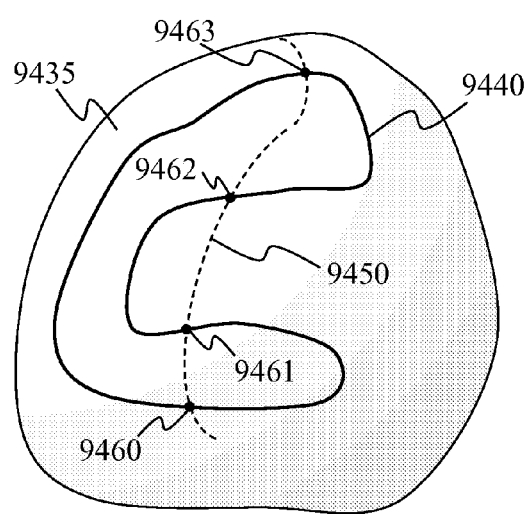
FIGS. 94C-F show a strip on its surface and the unfolded strip, illustrating the handling of sample curves with feature curves, according to an embodiment of the invention.
Figure 94D:
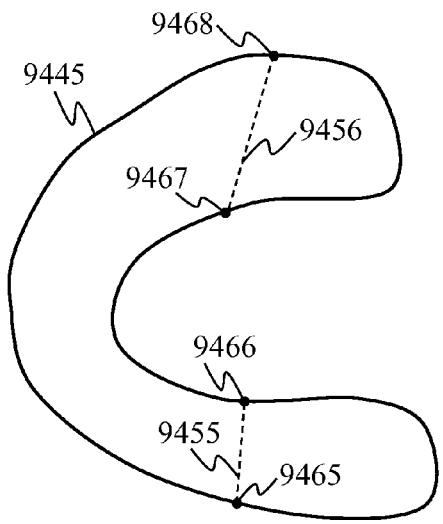

When all the feature curve intersection points are updated by adding, deleting, and moving these as described above, the result is a set of feature curve intersection points along the boundaries of the loops. FIG. 94C shows a surface 9435 in 3D with an embedded loop 9440 and a feature curve 9450 that crosses the loop boundaries four times 9460, 9461, 9462, 9463. The unfolded loop 9445 in 2D is shown in FIG. 94D. Straight line segments 9455, 9456 are added for each pair of boundary intersection points 9465, 9466 and 9467, 9468 along the unfolded loop. Note that a single feature curve 9450 may contribute multiple lines 9455, 9456. The lines are chosen to be straight to ensure that the loop tessellation is developable. They have two functions. First, they are used as curve loop tessellation constraints as described in FIG. 10. Specifically, the line segments are constrained edges in the loop tessellation. If a loop tessellation already exists, edge constraints can be added by edge flipping. All existing edges that cross the constrained edge are flipped until all such crossings have been eliminated. The edge constraints ensure that the loop tessellation will flow naturally along the feature curve and that the approximation error will be minimal. Second, the line segments can act as score line in the tool path. This makes it easier to fold the developable strips accurately during the assembly of the physical article.

Figure 94E:
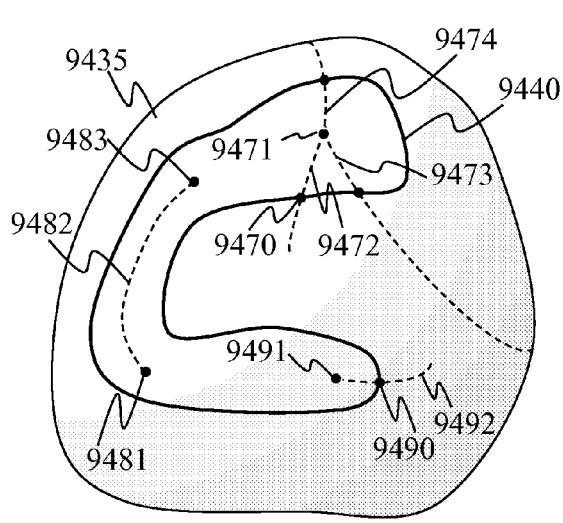
Figure 94F:
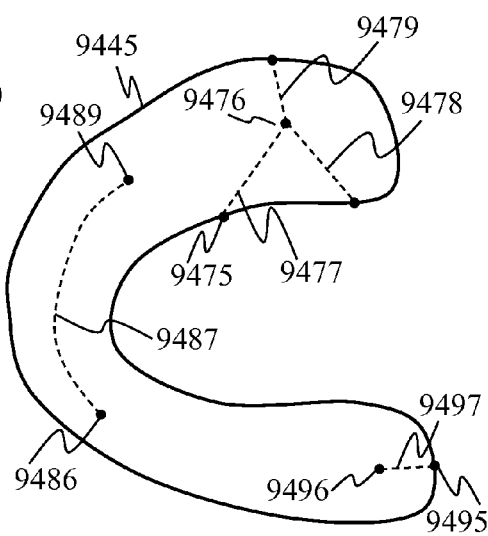

Feature curves may not always divide loops neatly as shown in FIG. 94C. FIG. 94E shows several special cases. First, if two or more feature curves 9472, 9473, 9474 meet at a point 9471 in the interior of a loop, connecting the intersection points, e.g., 9470, between the feature curves and the loop boundary with straight line segments is not always feasible. As an alternative, the shared feature curve end point may be projected to the loop tessellation. The corresponding point 9476 in the unfolded loop may be connected with a straight line segments 9477, 9478 9479 to each corresponding intersection point, e.g., 9475. These line segments are not suited to serve as edge constraints during the loop tessellation since the resulting surface may not be developable, but the lines may be output to the tool path as score lines to indicate where the feature curves meet. Second, if a feature curve 9482 is entirely embedded within a loop, the end points of the curve 9481, 9483 may be projected to the loop tessellation and mapped to corresponding points 9486, 9489 in the unfolded loop. These may be connected by a piecewise linear curve 9487 resulting from sampling the interior of the feature curve 9482 and mapping the projections of these samples to the unfolded loop. Again, such curves are not suited for edge constraints but they may be output to the tool path for decorative purposes, such as engraving of line art on sheet metal, or to form score lines representing more complex folds. Third, a feature curve 9492 may have one end point 9491 inside a loop and also intersect the loop boundary 9490. Similar to the aforementioned cases, the point 9496 in the unfolded loop corresponding to the projection of the end point onto the loop tessellation may be connected to the mapping of the intersection point 9495 to the unfolded loop by a line segment 9497. This can be output to the tool path as a score line to indicate where the feature curve ends.

Step 150 of FIG. 1 allows the system to go back to step 102 to continue the curve evolution, reposition loops in material coordinates, and iterate on all the other steps between step

102 and 150. This concludes the second type of design cycle in the workflow (the first comprised the curve evolution from step 102-120).

In a preferred embodiment, the system supports persistence of all information added in prior design cycles. The geometric positions all the various separators, markers, and devices are represented in barycentric coordinates along the relevant loop boundaries rather than in absolute coordinates. Thus, when curve points are moved, whether in 2D or 3D, all the objects that refer to the corresponding curve(s) follow along. Curve points that are referred to by one or more other objects are marked so that they can not be deleted during the resampling step of the curve evolution. If such points are deleted at any other stage, any dependent objects that refer to them are deleted as well. This approach allows the reuse of as much work as possible between manufacturing cycles due to step 150 in FIG. 1.

Figure 68:
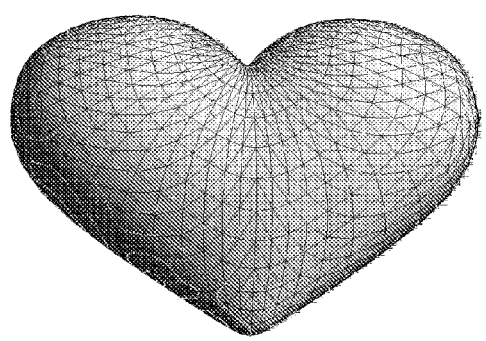
FIG. 68 is a diagram illustrating an evolution surface in 3D with curves generated by curve evolution, according to an embodiment of the present invention.
Figure 69:
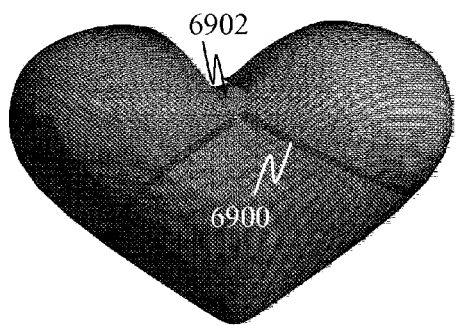
FIG. 69 is a diagram illustrating multiple texture surfaces.
Figure 70:
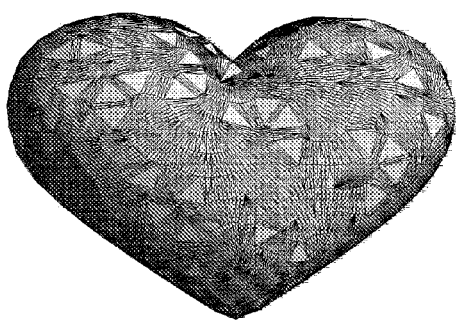
FIG. 70 is a diagrams illustrating two developable surface strips forming a 3D heart model.
Figure 71:
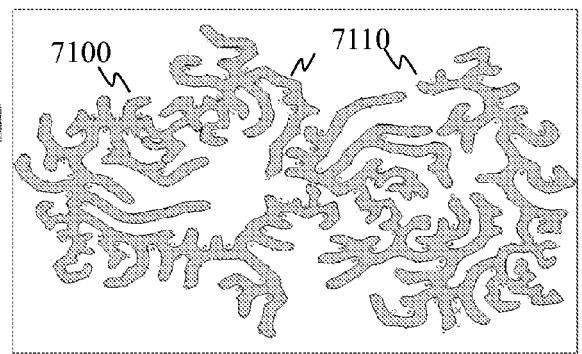
FIG. 71 is a diagram illustrating the unfolded loops in 2D corresponding to the two loops in 3D as shown in FIG. 70, according to an embodiment of the present invention.
Figure 72:
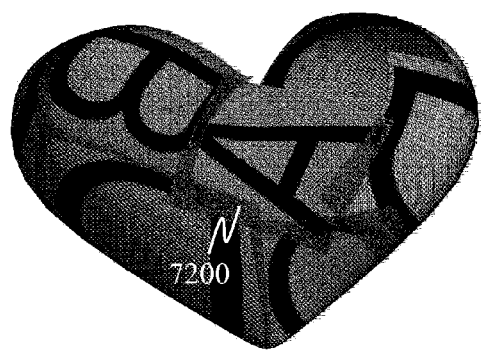
FIG. 72 is a diagram illustrating the texture surfaces shown in FIG. 69 with the texture maps shown in FIG. 73.
Figure 73:
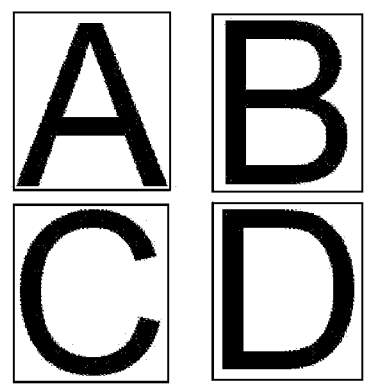
FIG. 73 is a diagram illustrating the texture maps shown on the texture surfaces in FIG. 72.

Step 730 in FIG. 7 comprises the generation of textures matching the tool paths generated in step 720. The texture generation process is shown in more detail in FIG. 17. FIG. 68-73 show the various geometry and texture data that serve as input to the texturing process. The evolution space, in this case a mesh comprised of triangles, and the curves resulting from the curve evolution are shown in FIG. 68. FIG. 69 shows a set of independent geometric surfaces which will be referred to as the texture surfaces. The texture surfaces may overlap, e.g., as shown at 6900, and/or may not cover the entire evolution surface, e.g., as shown at 6902. Their purpose is to cover all or part of a developable surface model with different textures. FIG. 70 shows a developable surface created by the system. The surface consists of two developable strips 7100, 7110 positioned in a material sheet 7120 as shown in FIG. 71. The strips have assembly devices along their boundaries. FIG. 72 shows the texture surfaces from FIG. 69 with the texture images in FIG. 73. In this example, each texture surface has exactly one parameterized patch that corresponds to exactly one image, but texture surfaces may consist of multiple patches and multiple texture images. Texture surfaces may also refer to textures that are not represented as images, such as 3D solid textures that are defined in a volumetric region or vector artwork parameterized in the (u,v) coordinates of the geometry of the texture surface. The primary goal of the texturing part of the system is to make it easy to create customized textures for a fixed developable surface. For example, it makes it possible to take digital images from a camera, position them on the developable surface, and map the image pixels from the texture surfaces to a 2D texture map lined up with each material sheet. As an alternative to digital photos, 3D surface models are often provided with texture maps. Typically, such models break up the surface into multiple patches each of which map to an irregularly shaped and/or cyclical region in a texture map. In this case, the geometry of the texture surface is identical to the evolution space and the texture mapping is discontinuous, consisting of multiple charts. Since the texture surfaces can be added, deleted, or repositioned while the developable surface remains constant, texturing can be implemented as a separate module for which the user does not require any knowledge about the developable surface creation. In a preferred embodiment, the texturing is done through a simple user interface that allows uploading of images, create, delete, and modify texture surfaces, and assign the images to the texture surfaces. Further, any overlapping texture surfaces, such as those shown in FIG. 72 7200, are assigned a partial order specifying which of the two textures should take precedence at overlaps. Given this data, the system automatically generates 2D material sheet texture maps at a desired resolution and outputs them. The textures are lined up with the tool paths using registration marks present in both the textures and the tool paths.

Figure 17:
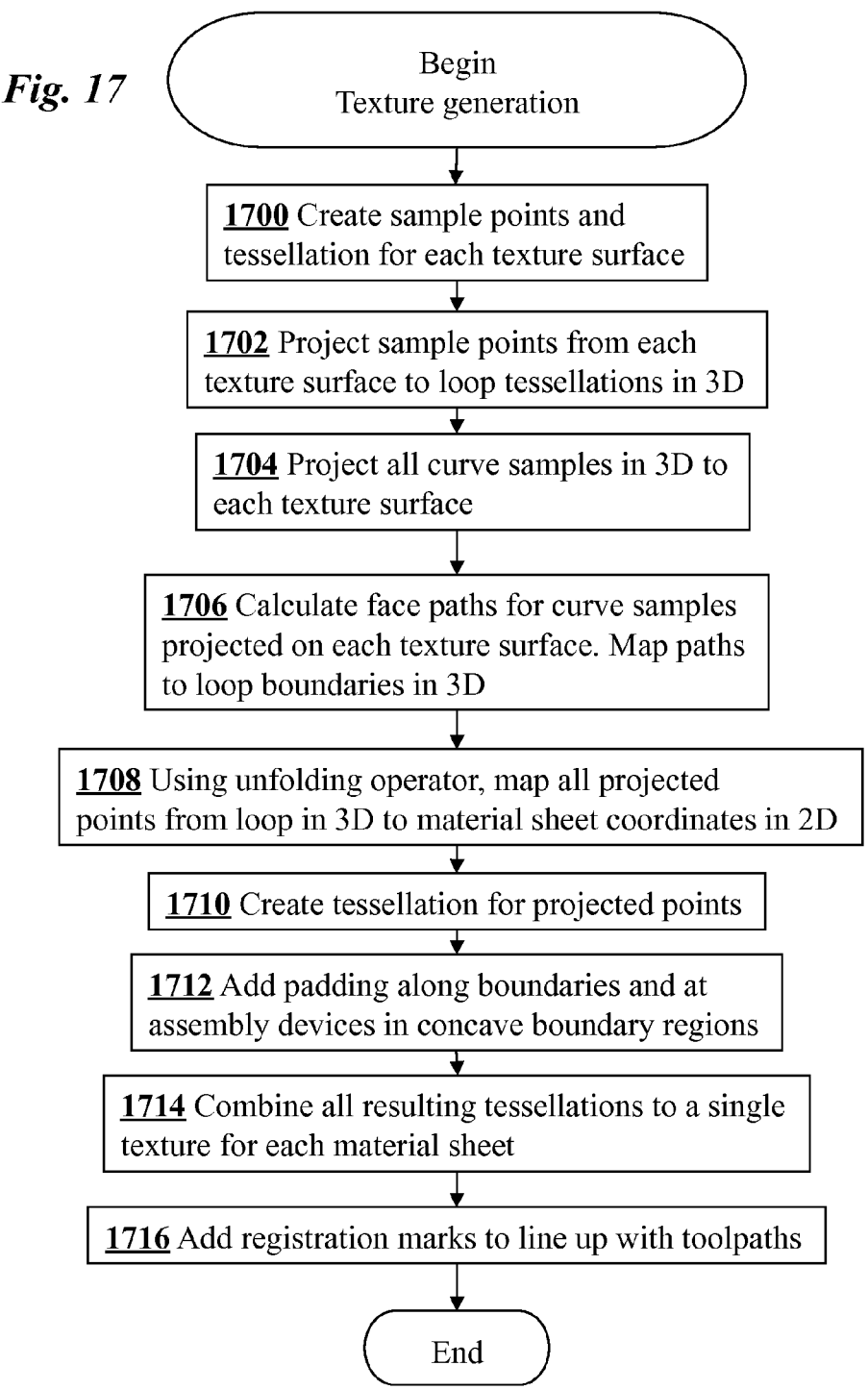
FIG. 17 is a flow chart illustrating steps of a method for generating texture maps for the 3D developable surface models, according to an embodiment of the present invention.
Figure 74:
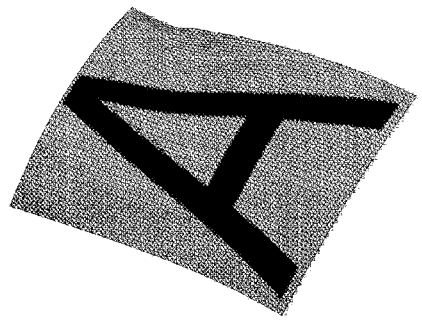
FIG. 74 is a diagram illustrating a single texture surface sampled in a regular grid of points with a corresponding texture map.
Figure 75:
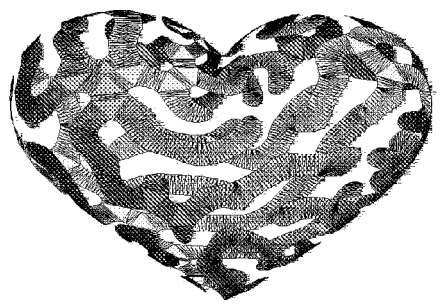
FIG. 75 is a diagram illustrating a single loop tessellation in 3D generated by an embodiment of the present invention.
Figure 76:
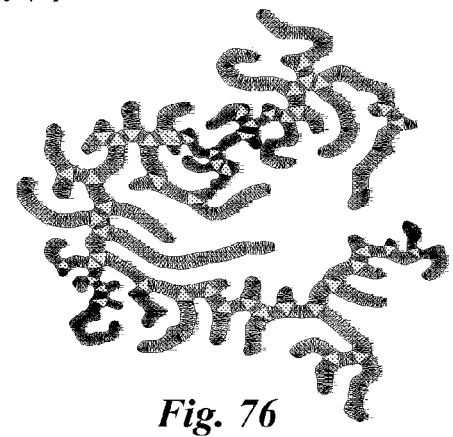
FIG. 76 is a diagram illustrating the loop tessellation in 2D obtained by unfolding the loop tessellation shown in FIG. 75, according to an embodiment of the present invention.
Figure 77:
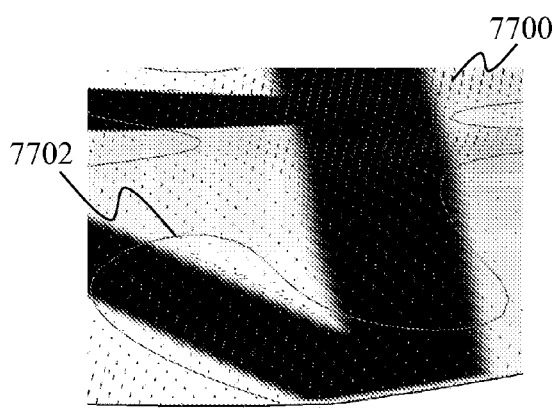
FIG. 77 is a diagram illustrating deviation errors obtained by ray casting from samples on a single texture surface to all loop tessellations in 3D, according to an embodiment of the present invention.

Step 1700 in FIG. 17 comprises sampling of the texture surfaces. FIG. 69 shows a number of texture surfaces, each of which has been sampled in a dense, regular grid of points in 3D. The points within each grid have been connected by triangles. If the evolution surface, shown in FIG. 68, is associated with texture information, it too can be sampled or re-sampled and serve as an additional texture surface. The system now processes all combinations of texture surfaces and developable surface strips. If there are N texture surfaces, possibly including the evolution surface, and M developable loop pieces (noting that each loop per definition comprises one or more loop pieces) NM such pairs are considered. FIG. 74 shows a single texture surface and FIG. 75-76 a single developable strip in 3D and 2D, respectively. In step 1702, each sample point on each texture surface is projected to the developable strips. In a preferred embodiment, the projection is done using ray casting, i.e. by calculating the intersection between the developable surface strips and a ray emanating from each texture surface sample point and pointed in the direction of the local normal for the texture surface. FIG. 77 shows a close-up of part of the texture surface shown in FIG. 74. Each sample point is shown along with a 3D deviation vector, e.g., 7700, that illustrates the deviation between the texture surface and the matching projected point on a developable surface strip. The figure shows how the deviations generally are smaller near the loop boundaries 7702 and larger near the axes of the developable strips, e.g., at 7700. Step 1704 marks of an equivalent projection in the other direction: from each sample point along the loop boundaries towards the texture surfaces. Since, per design, the loop boundaries are geometrically identical to the curves that were subjected to curve evolution, and since the sample points along these curves are embedded within the evolution space, the local surface normal of the evolution surface can be used as the ray casting direction. Note that the ray casting is done from each curve sample point to all texture surfaces, not just the geometrically closest texture surface intersection. For some curve sample points, there may be no intersection with any texture surface. For other sample points, there may be up to N projections, one for each texture surface (possibly including the evolution surface if it has texture data), all of which are recorded.

Figure 78:
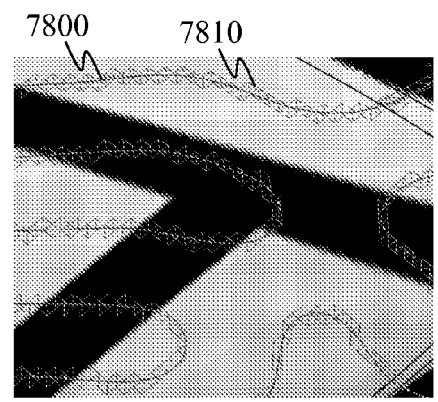
FIG. 78 is a diagram illustrating the creation of face paths on a texture surface corresponding to the projection of loop boundaries onto the texture surface, according to an embodiment of the present invention.
Figure 79A:
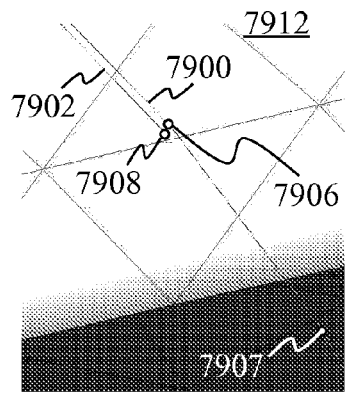
FIG. 79A-B are diagrams illustrating the creating of face paths on a texture surface by projection of loop boundary curves onto the texture surface, according to an embodiment of the present invention.
Figure 79B:
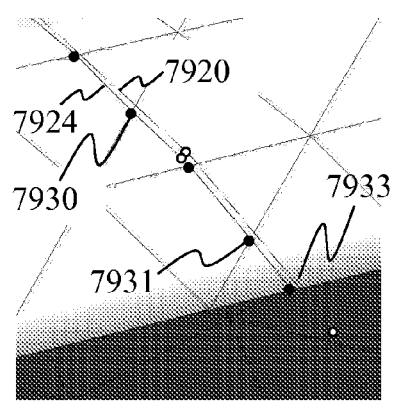

Steps 1706 to 1712 are performed for each pair of texture surfaces and developable surface strips. In step 1706, the subset of loop boundary points along the developable strip that had a projection on the texture surface is determined. This yields a set of curve segments between successive curve point projections on the texture surface. FIG. 78 shows several such curve segments 7800 on the texture surface shown in FIG. 74. Each curve segment consists of a series of line segments between two points on the texture surface. FIG. 79A shows a 3D view of a curve 7900 with sample points 7906, 7907 on the evolution surface (not shown). The projection 7902 of the curve on the texture surface 7912 starts at the first point 7908 corresponding to a valid projection. Next, each line segment is projected to the texture surface by calculating a face path between the two points. FIG. 78 shows a path of texture surface polygons 7810 obtained by such a projection. For each texture surface polygon edge that is crossed while moving from one curve sample point to the next, a new sample point is inserted. The resulting projected curve thus consists of all the points in the original curves with intermediate points inserted at each face edge crossing. FIG. 79B shows the face path 7924 obtained by adding such points 7930, 7932, 7933 to the projected curve 7920 in FIG. 79A 7902. Note that a point 7933 is inserted at the boundary of the texture surface. Calculating such a projected face path is a standard and widely used geometric calculation. The face path will be used in step 1710 to be described below.

Figure 80:
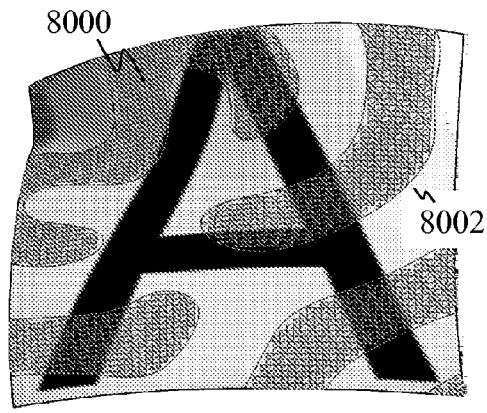
FIG. 80 is a diagram illustrating the subset of triangles in a single texture surface tessellation where all three points project to the same loop tessellation, according to an embodiment of the present invention.
Figure 81:
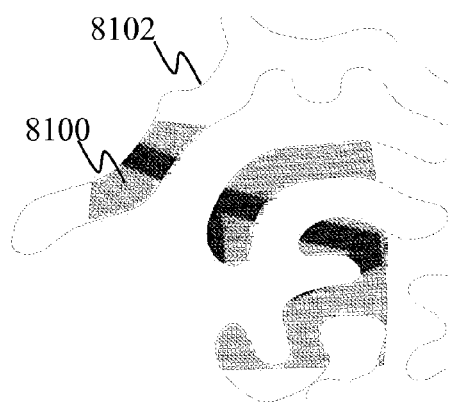
FIG. 81 is a diagram illustrating the texture surface tessellation triangles shown in FIG. 80 after mapping to the corresponding loop, according to an embodiment of the present invention.
Figure 82:
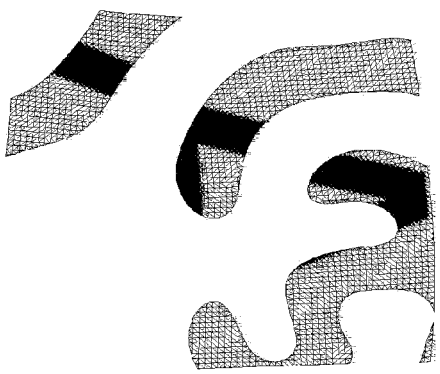
FIG. 82 is a diagram illustrating an unfolded tessellation with texture information obtained from projecting sample points from a single texture surface to single loop, according to an embodiment of the present invention.
Figure 83:
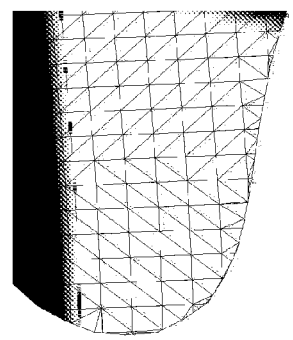
FIG. 83 is a diagram illustrating a close-up of the unfolded tessellation shown in FIG. 82.

In step 1708, the unfolding operator Π is used to map all the projected sample points from the loop tessellation to the unfolded loop in material sheet coordinates. FIG. 80 shows the subset of triangles 8000 in the texture surface tessellation where all 3 points projected to the same loop. The loop is indicated by its boundaries 8002. Since the projection maps points from the texture surface to the loop tessellation, and since the unfolding operator maps points from the loop tessellation to the unfolded loop tessellation in material sheet coordinates, the projection and unfolding operators can be combined to map points from the texture surface to 2D material sheet coordinates. FIG. 81 shows the result of mapping the texture surface triangles 8100 from FIG. 80 to material sheet coordinates. The unfolded loop boundaries 8102 are shown for reference. The texture is associated with the texture surface by storing a pair of (u,v) texture coordinates with each sample point. To map the texture from the texture surface to the material sheet, the (u,v) texture coordinates are simply copied from the texture surface samples to the corresponding points mapped to material sheet coordinates. FIG. 82 shows the complete triangulation corresponding to the example in FIG. 80. The triangulation was obtained by first adding all the aforementioned triangles where all 3 points projected to the interior of the loop tessellation (i.e. the triangles highlighted in FIG. 81). This left missing polygons at the boundaries where the 3 points of the texture surface triangles did not project to the same loop. A preferred embodiment fills in the missing polygons by processing the triangles in the texture surface tessellation one by one. The face path curves generated in step 1706 specify which projected loop boundary curve segment(s) pass through each texture surface triangle. From this information, the part(s) of each projected triangle that map to the interior of the unfolded loop can now be determined and a correct tessellation of the triangle calculated. Adding the union of these border triangle tessellations to the projected triangles that fell completely inside the unfolded loop yields a new tessellation that covers the entire unfolded loop. FIG. 82 shows the final tessellation, a close up of which is shown in FIG. 83. The same edge flipping optimization used during the tessellation of the loops in 3D is employed to obtain a high quality tessellation.

Figure 84:
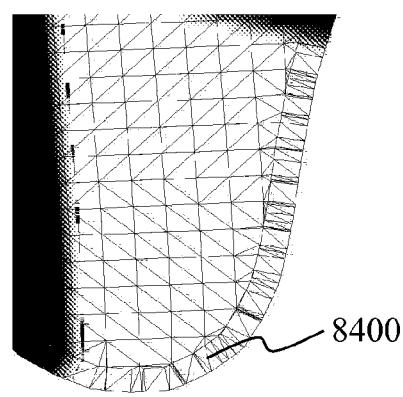
FIG. 84 is a diagram illustrating a band of padding polygons with texture information added to the unfolded tessellation shown in FIG. 83 in order to prevent visual artifacts due to alignment errors, according to an embodiment of the present invention.
Figure 85:
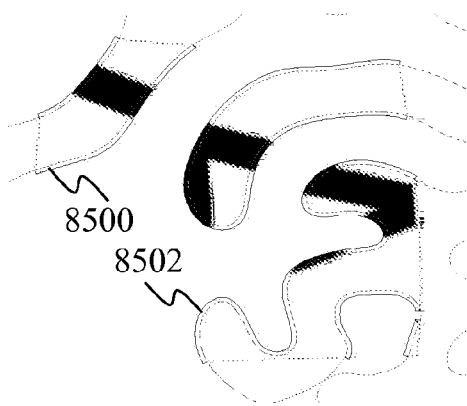
FIG. 85 is diagram illustrating the unfolded tessellation shown in FIG. 82 with a band of textured padding polygons added along all edges corresponding to loop boundaries, according to an embodiment of the present invention.

The NM unfolded tessellations with textures, obtained by applying step 1706-1710 for N texture surfaces and M loops, will be synthesized to the final material sheet texture maps in step 1714. Before that, however, a couple of practical issues related to the assembly must be addressed. First, the new unfolded tessellations are aligned exactly with the loop boundaries. In the process of manufacturing the texture on the physical material sheet and subsequently cutting the developable surface strips out of it, small alignment errors may occur. If left as is, these will lead to long, blank streaks of missing texture at the seams between the developable strips. FIG. 84 shows the unfolded tessellation from FIG. 83 with a narrow band of polygons 8400 added at the loop boundary segments by extrusion. This band was created by offsetting the boundary outwards by a small distance corresponding to the maximum expected alignment error. For the points added in the process, a new set of (u,v) texture coordinates are created. In a preferred embodiment, level set methods allow such coordinates to be calculated from the (u,v) coordinates of the existing points by analyzing the gradient. Alternatively, in a simple and sufficient embodiment, the (u,v) coordinates from the boundary points may simply be copied (see FIG. 84) to the new, offset points. FIG. 85 shows such a band of padding polygons 8500, 8502 around the unfolded tessellation shown in FIG. 82.

Figure 86:
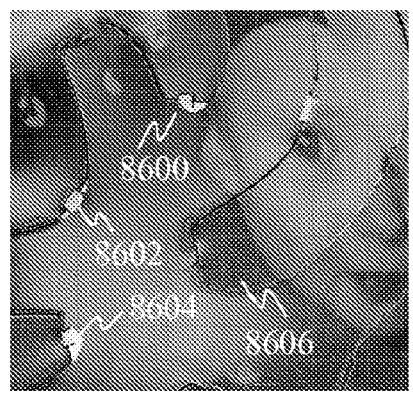
FIG. 86 is a diagram illustrating visual artifacts that may be present near concave regions of loop boundaries after assembly of the 3D model.
Figure 87:
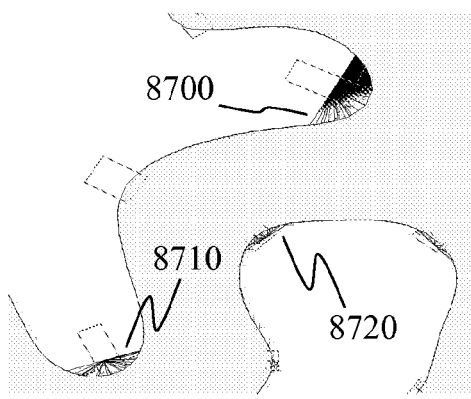
FIG. 87 is a diagram illustrating textured padding polygons added to concave regions along the boundary of the tessellation shown in FIG. 82 in order to eliminate the artifacts shown in FIG. 86, according to an embodiment of the present invention.
Figure 88:
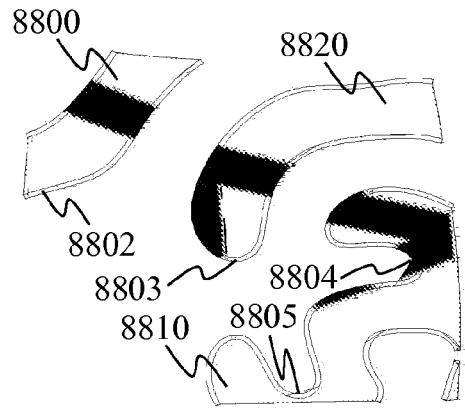
FIG. 88 is a diagram illustrating the unfolded tessellation shown in FIG. 82 with textured padding polygons in a band along the loop boundaries as well as in concave regions, according to an embodiment of the present invention.

FIG. 86 points out a second type of artifacts due to assembly. The white spots 8600, 8602, 8604 are caused by the way assembly devices were added along the loop boundary as shown in FIG. 64C-D. For assembly devices added to convex loop boundary segments e.g., 8606, i.e. the tips of strip branches as shown in FIG. 64A-B, there is usually no problem since the boundary was shifted inwards towards polygons with valid texture data. For assembly devices at concave boundary segments, however, the boundary was moved outwards as shown in FIG. 64C. Since the tessellation with texture information was created relative to the original unfolded loop boundary, a blank area 8600 with no texture may be present where assembly devices are located at concave parts of the loop boundary. In a preferred embodiment, the artifacts are eliminated by inserting additional padding polygons near the problematic areas as shown in FIG. 87. The padding polygons 8700 are calculated to cover the blank area between the original unfolded loop boundary and the line segment 6402 at the base of the tab in FIG. 64C. The shapes of the padding polygons are less important as long as they cover the blank area. One option is to add a fan of triangles centered at the base of the tab 8700, 8710, 8720. FIG. 88 shows the projected tessellation 8800, 8810, 8820, the band of padding boundary polygons 8802, 8803, and the padding polygons in concave areas 8804, 8805. The union of all these polygons with their associated texture information will be used in the synthesis of the final, composite material sheet texture map.

Figure 89:
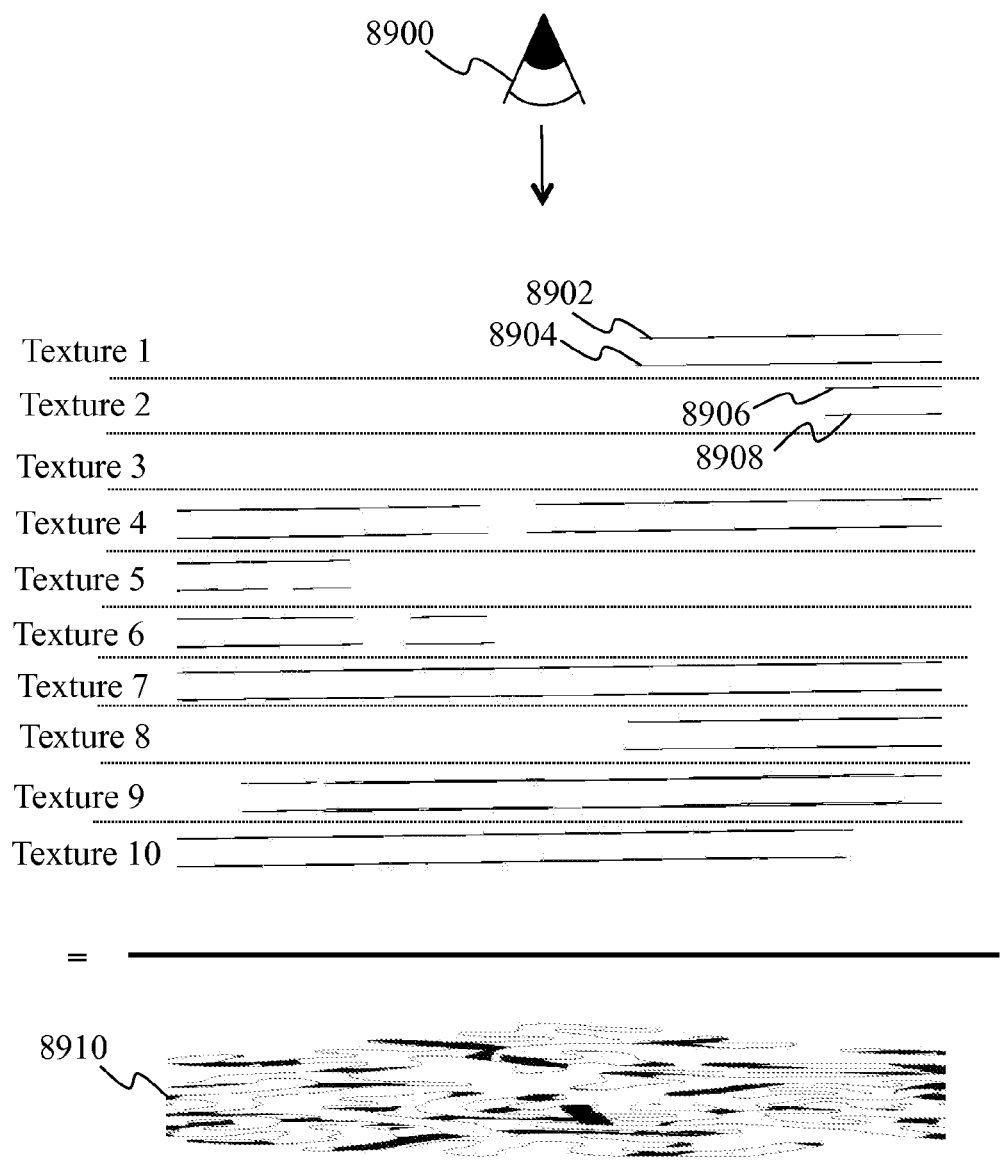
FIG. 89 is a diagram illustrating a side view of the creation of material sheet texture maps by compositing images of texture tessellations for all combinations of texture surfaces and developable surface strips, according to an embodiment of the present invention.
Figure 90:
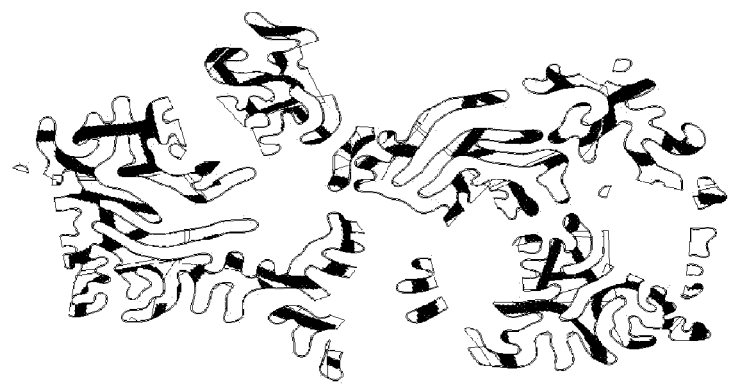
FIG. 90 is diagram illustrating a top view of unfolded texture tessellations for all combinations of texture surfaces and developable surface strips, according to an embodiment of the present invention.
Figure 91:
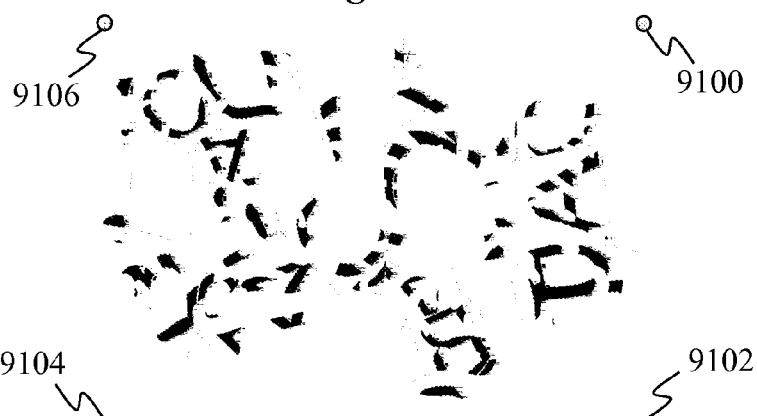
FIG. 91 is a diagram illustrating a final material sheet texture map with registration marks, according to an embodiment of the present invention.
Figure 92:
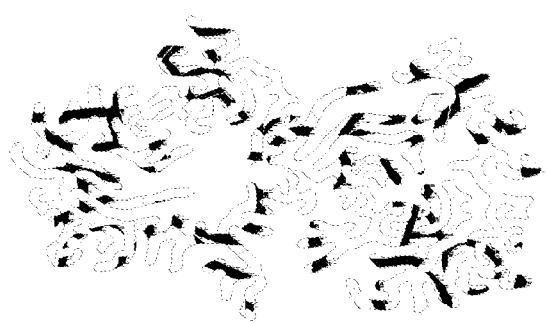
FIG. 92 is a diagram illustrating the material sheet texture map shown in FIG. 91 mapped to the corresponding unfolded loop tessellations, according to an embodiment of the present invention.
Figure 93:
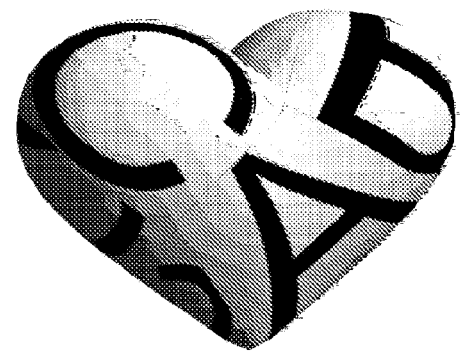
FIG. 93 is a diagram illustrating the material sheet texture map shown in FIG. 91 mapped to the corresponding loop tessellations in 3D, according to an embodiment of the present invention.

FIG. 89 illustrates step 1714 in FIG. 17, the compositing of the textured polygons calculated for each combination of texture meshes and unfolded loops in steps 1706-1712. With N texture surfaces and M unfolded loops (or loop pieces if the loops have been divided by loop separators), there will be N*M such tessellations. First, the unfolded loops are grouped together based on the material sheet they belong to. For each material sheet, all the corresponding textured tessellations are rendered front to back based on the user specified partial ordering that defines which texture surface is visible in regions where 2 or more texture surfaces overlap. In a preferred embodiment, the rendering is done using computer graphics hardware. The textured tessellations are rendered in individual layers so that tessellations corresponding to the same texture surface are rendered in the same layer. The layers are slightly offset in the z-direction so that the depth buffer, which is provided by the graphics hardware API, takes care of resolving visibility correctly based on the partial ordering on the texture surfaces. This compositing operation is illustrated for 10 texture surfaces in FIG. 89. The side view shows the orthographic camera 8900 at the top, looking down in the direction of the z-axis. For each layer, the corresponding tessellations of the interior unfolded loops 8902, 8906 and the associated padding polygons 8904, 8908 are rendered together. In a preferred embodiment, the padding polygons are rendered slightly behind the interior loop polygons within each layer in order to avoid the need for detecting collisions where the padding polygons might intersect the unfolded loops unintentionally. After all the tessellations have been rendered, the resulting image 8910 is saved as the final texture map for the material sheet. All the material sheets are processed this way, yielding one 2D texture map for each material sheet. Finally, step 1716 adds registration marks matching the registration marks that were generated for the tool paths in step 720. FIG. 90 shows all the textured tessellations generated for the material sheet shown in FIG. 71 as they would appear to the camera shown in side view in FIG. 89. FIG. 91 shows the resulting 2D texture map with registration marks 9100, 9102, 9104, 9106. This texture map may have upwards of 10,000 pixels along each dimension depending on the desired resolution. FIG. 92 shows the material sheet texture map mapped to the unfolded loop tessellations. Finally, FIG. 93 shows the material sheet texture map mapped to the loop tessellations. It is noted that two separate texture maps can be added to each side of the material sheet yielding two alternative textures for the 3D model depending on which side is chosen as exterior.

The invention claimed is:

1. A computer-implemented method for generating a developable surface, the method comprising:
    a) initializing by a computer curve evolution parameters and a curve network, wherein the curve network comprises a curve embedded in an evolution space, wherein the initializing comprises defining a set of 2D textures defined on the evolution space, wherein the evolution space is a 2D non-Euclidean space embedded in a 3D Euclidean space, wherein the curve comprises a linearly ordered set of sample points in the evolution space, and wherein the curve evolution parameters comprise real-valued functions defined on the evolution space;
    b) evolving by the computer the curve using an iterative process, wherein the curve evolves in accordance with the curve evolution parameters and user input during the iterative process to produce an evolved curve having an increased geometric complexity, wherein the evolved curve represents a model for the construction of a stylized three dimensional sculpture, wherein the evolved curve forms loops separating regions of the evolution space; and wherein each iteration of the iterative process comprises:
    tessellating the loops with polygons to generate tessellated strips in 3D;
    unfolding the tessellated strips onto a 2D plane;
    applying attraction-repulsion forces between the unfolded tessellated strips in 2D and between the loops in 3D;
    resolving collisions between the unfolded tessellated strips in 2D and between the loops in 3D;
    rendering by the computer the evolved curve and tessellated strips;
    displaying simultaneously on a display the rendered evolved curve in 3D and tessellated strips in 2D; and
    providing a graphical user interface allowing the curve network, tessellated strips, and the curve evolution parameters to be modified by a user;
    c) mapping the 2D textures to the unfolded tessellated strips; and
    d) outputting a set of tool paths lined up with the 2D textures for creating a 2D material shaped to the unfolded tessellated strips.

2. The method of claim 1 wherein the evolved curve is attracted to feature markers during the iterative process.

3. The method of claim 1 further comprising automatically cutting with a machine a 2D material in accordance with the set of tool paths to produce an article of manufacture.

4. The method of claim 1 further comprising, prior to evolving by the computer the curve using an iterative process, analyzing by the computer a geometry and topology of the curve network using a set of heuristics, and predicting locations where assembly of the developable surface is likely to be difficult.

5. The method of claim 1 further comprising evaluating an error metric between an evolution mesh and tessellated strips; and, when an error is larger than a predetermined threshold, automatically refining loops corresponding to the tessellated strips.

6. The method of claim 1 wherein the curve evolves using a 2D attraction force that attracts the unfolded tessellated strips to shape of a predetermined figural curve.

7. The method of claim 1 further comprising creating assembly devices along boundaries of the unfolded tessellated strips, and automatically optimizing placement of the assembly devices along the boundaries of the unfolded tessellated strips through the use of a mechanical analysis.

8. The method of claim 7 further comprising providing a graphical user interface by which a user may edit the assembly devices.

9. The method of claim 1 further comprising adding textured polygons outside the unfolded tessellated strip to avoid blank spots in a texture on the developable surface.

10. The method of claim 1 wherein mapping the 2D textures to the unfolded tessellated strips comprises mapping the 2D textures using a map generated by compositing ordered layers of textures.

11. The method of claim 1 wherein resolving collisions between the unfolded tessellated strips in 2D and between the loops in 3D comprises breaking an unfolded tessellated strip by creating a separator joining two sample points along a boundary of the unfolded tessellated strip.

12. The method of claim 1 wherein resolving collisions between the unfolded tessellated strips in 2D and between the loops in 3D comprises removing intersecting parts of boundaries of the unfolded tessellated strips.

13. A computer-implemented method for generating a developable surface, the method comprising:
    a) initializing by a computer curve evolution parameters and a curve network, wherein the curve network comprises a curve embedded in an evolution space, wherein the initializing comprises defining a set of 2D textures defined on the evolution space, wherein the evolution space is a 2D non-Euclidean space embedded in a 3D Euclidean space, wherein the curve comprises a linearly ordered set of sample points in the evolution space, and wherein the curve evolution parameters comprise real-valued functions defined on the evolution space;
    b) evolving by the computer the curve using an iterative process, wherein the curve evolves in accordance with the curve evolution parameters and user input during the iterative process to produce an evolved curve having an increased geometric complexity, wherein the evolved curve represents a model for the construction of a stylized three dimensional sculpture, wherein the evolved curve forms loops separating regions of the evolution space; and wherein each iteration of the iterative process comprises:
    tessellating the loops with polygons to generate tessellated strips in 3D;
    unfolding the tessellated strips onto a 2D plane;
    resolving collisions between the unfolded tessellated strips in 2D and between the loops in 3D;
    applying attraction-repulsion forces between the unfolded tessellated strips and material boundaries in 2D;
    rendering by the computer the evolved curve and tessellated strips;
    displaying simultaneously on a display the rendered evolved curve in 3D and tessellated strips in 2D; and
    providing a graphical user interface allowing the curve network, tessellated strips, and the curve evolution parameters to be modified by a user;

c) mapping the 2D textures to the unfolded tessellated strips; and
d) outputting a set of tool paths lined up with the 2D textures for creating a 2D material shaped to the unfolded tessellated strips.

\* \* \* \* \*